United States Patent
Buchalter

(10) Patent No.: US 11,521,218 B2
(45) Date of Patent: *Dec. 6, 2022

(54) SYSTEMS AND METHODS FOR DETERMINING COMPETITIVE MARKET VALUES OF AN AD IMPRESSION

(71) Applicant: MediaMath, Inc., New York, NY (US)

(72) Inventor: Yehuda Ari Buchalter, Forest Hills, NY (US)

(73) Assignee: MEDIAMATH, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/453,318

(22) Filed: Nov. 2, 2021

(65) Prior Publication Data

US 2022/0122094 A1 Apr. 21, 2022

Related U.S. Application Data

(63) Continuation of application No. 17/313,614, filed on May 6, 2021, now Pat. No. 11,195,187, which is a
(Continued)

(51) Int. Cl.
*G06Q 30/02* (2012.01)
(52) U.S. Cl.
CPC ......... *G06Q 30/02* (2013.01); *G06Q 30/0242* (2013.01); *G06Q 30/0275* (2013.01)
(58) Field of Classification Search
CPC ............... G06Q 30/02; G06Q 30/0242; G06Q 30/0275; G06Q 30/0207–30/0277
See application file for complete search history.

(56) References Cited

U.S. PATENT DOCUMENTS

| 5,923,902 A | 7/1999 | Inagaki |
| 5,983,227 A | 11/1999 | Nazem et al. |

(Continued)

FOREIGN PATENT DOCUMENTS

| JP | 2007535687 | 12/2007 |
| KR | 20020028238 | 4/2002 |

(Continued)

OTHER PUBLICATIONS

"Online Customized Ads Move a Step Closer" printed Sep. 6, 2007.
(Continued)

*Primary Examiner* — Thuy N Nguyen
(74) *Attorney, Agent, or Firm* — Knobbe, Martens, Olson & Bear, LLP

(57) ABSTRACT

The present disclosure is directed to methods and systems for determining competitive market values for an ad impression on an advertiser exchange. An engine executing on a device may receive a candidate set of inputs associated with ad impressions. The engine may determine competitive market values for an ad impression on an advertiser exchange. The engine may determine candidate clearing prices based on the candidate set of inputs and history of clearing prices on the advertiser exchange. The engine may generate, based on the candidate clearing prices, a competitive market value prediction for the ad impression on the advertiser exchange. The competitive market value prediction may comprise a distribution function of predicted clearing prices on the advertiser exchange. The engine may generate, based on the competitive market value prediction, a fair market value bid for the ad impression in the context of a specific ad campaign.

20 Claims, 19 Drawing Sheets

Related U.S. Application Data continuation of application No. 16/773,053, filed on Jan. 27, 2020, now Pat. No. 11,049,118, which is a continuation of application No. 16/222,519, filed on Dec. 17, 2018, now Pat. No. 10,592,910, which is a continuation of application No. 13/185,236, filed on Jul. 18, 2011, now Pat. No. 10,223,703.

(60) Provisional application No. 61/365,623, filed on Jul. 19, 2010.

(56) References Cited

U.S. PATENT DOCUMENTS

| | | | |
|---|---|---|---|
| 6,269,361 B1 * | 7/2001 | Davis | G06Q 30/02 707/999.005 |
| 6,285,983 B1 | 9/2001 | Jenkins | |
| 6,327,574 B1 | 12/2001 | Kramer et al. | |
| 6,430,539 B1 | 8/2002 | Lazarus et al. | |
| 6,766,327 B2 | 7/2004 | Morgan et al. | |
| 6,938,022 B1 | 8/2005 | Singhal | |
| 6,941,376 B2 | 9/2005 | Mitchell et al. | |
| 6,974,078 B1 | 12/2005 | Simon | |
| 7,013,290 B2 | 3/2006 | Ananian | |
| 7,069,256 B1 | 6/2006 | Campos | |
| 7,139,723 B2 | 11/2006 | Conkwright et al. | |
| 7,146,329 B2 | 12/2006 | Conkwright et al. | |
| 7,197,472 B2 | 3/2007 | Conkwright et al. | |
| 7,197,568 B2 | 3/2007 | Boure et al. | |
| 7,203,909 B1 | 4/2007 | Horvitz | |
| 7,219,078 B2 | 5/2007 | Lamont et al. | |
| 7,236,941 B2 | 6/2007 | Conkwright et al. | |
| 7,257,546 B2 | 8/2007 | Ebrahimi et al. | |
| 7,523,087 B1 | 4/2009 | Agarwal et al. | |
| 7,630,986 B1 | 12/2009 | Herz et al. | |
| 7,685,232 B2 | 3/2010 | Gibbs et al. | |
| 7,792,697 B2 | 9/2010 | Bhagchandani et al. | |
| 7,805,332 B2 | 9/2010 | Wilson | |
| 7,840,438 B2 | 11/2010 | Carson et al. | |
| 7,848,950 B2 | 12/2010 | Herman et al. | |
| 7,860,743 B2 | 12/2010 | Stevens | |
| 7,996,296 B2 * | 8/2011 | Lange | G06Q 40/08 705/37 |
| 8,001,004 B2 | 8/2011 | Protheroe et al. | |
| 8,086,697 B2 | 12/2011 | Goulden et al. | |
| 8,108,254 B2 | 1/2012 | Lin et al. | |
| 8,117,067 B2 | 2/2012 | Ketchum | |
| 8,117,199 B2 | 2/2012 | Ghani et al. | |
| 8,160,977 B2 | 4/2012 | Poulin | |
| 8,175,950 B1 | 5/2012 | Grebeck et al. | |
| 8,255,285 B1 | 8/2012 | Peretz et al. | |
| 8,255,489 B2 | 8/2012 | Agergan et al. | |
| 8,375,046 B2 | 2/2013 | Dettinger et al. | |
| 8,392,246 B2 | 3/2013 | Coladonato et al. | |
| 8,527,342 B2 | 9/2013 | Feuerstein et al. | |
| 8,548,909 B1 | 10/2013 | Snow et al. | |
| 8,688,522 B2 | 4/2014 | Gern et al. | |
| 8,782,249 B1 | 7/2014 | Hood | |
| 8,972,530 B2 | 3/2015 | Agergan et al. | |
| 9,047,612 B2 | 6/2015 | Anderson et al. | |
| 9,076,166 B1 * | 7/2015 | Peretz | G06Q 30/0277 |
| 9,135,655 B2 | 9/2015 | Buchalter et al. | |
| 9,497,496 B1 | 11/2016 | Corley et al. | |
| 10,191,972 B2 | 1/2019 | Maher et al. | |
| 10,223,703 B2 | 3/2019 | Buchalter et al. | |
| 10,332,156 B2 | 6/2019 | Buchalter et al. | |
| 10,354,276 B2 | 7/2019 | Schobeiri et al. | |
| 10,467,659 B2 | 11/2019 | Chalasani et al. | |
| 10,592,910 B2 | 3/2020 | Buchalter | |
| 10,628,859 B2 | 4/2020 | Buchalter et al. | |
| 10,636,060 B2 | 4/2020 | Buchalter et al. | |
| 11,049,118 B2 | 6/2021 | Buchalter | |
| 2001/0037361 A1 | 11/2001 | Croy | |
| 2001/0049620 A1 | 12/2001 | Blasko | |
| 2001/0053995 A1 | 12/2001 | Nishimoto | |
| 2002/0052825 A1 | 5/2002 | Bensemana | |
| 2002/0055880 A1 | 5/2002 | Unold et al. | |
| 2002/0059369 A1 | 5/2002 | Kern et al. | |
| 2002/0065797 A1 | 5/2002 | Meidan et al. | |
| 2002/0087573 A1 | 7/2002 | Reuning et al. | |
| 2002/0087967 A1 | 7/2002 | Conkwright et al. | |
| 2002/0103698 A1 | 8/2002 | Cantrell | |
| 2002/0116491 A1 | 8/2002 | Boyd et al. | |
| 2002/0133490 A1 | 9/2002 | Conkwright et al. | |
| 2002/0188508 A1 | 12/2002 | Lee et al. | |
| 2002/0194434 A1 | 12/2002 | Kurasugi | |
| 2003/0018550 A1 | 1/2003 | Rotman et al. | |
| 2003/0023489 A1 | 1/2003 | McGuire et al. | |
| 2003/0033202 A1 | 2/2003 | Ogawa et al. | |
| 2003/0101454 A1 | 5/2003 | Ozer et al. | |
| 2003/0135464 A1 | 7/2003 | Mourad et al. | |
| 2003/0149622 A1 * | 8/2003 | Singh | G06Q 30/0257 707/E17.108 |
| 2003/0208754 A1 | 11/2003 | Sridhar et al. | |
| 2004/0054589 A1 | 3/2004 | Nicholas et al. | |
| 2004/0073553 A1 | 4/2004 | Brown et al. | |
| 2004/0083133 A1 | 4/2004 | Nicholas et al. | |
| 2004/0123247 A1 | 6/2004 | Wachen et al. | |
| 2004/0215501 A1 | 10/2004 | D'ornano | |
| 2004/0225562 A1 | 11/2004 | Turner | |
| 2005/0038700 A1 | 2/2005 | Doemling et al. | |
| 2005/0080775 A1 | 4/2005 | Colledge et al. | |
| 2005/0105513 A1 | 5/2005 | Sullivan et al. | |
| 2005/0125289 A1 | 6/2005 | Beyda et al. | |
| 2005/0144065 A1 | 6/2005 | Calabria et al. | |
| 2005/0144072 A1 | 6/2005 | Perkowski et al. | |
| 2005/0144073 A1 | 6/2005 | Morrisroe et al. | |
| 2005/0159921 A1 | 7/2005 | Lourviere et al. | |
| 2005/0171843 A1 | 8/2005 | Brazell et al. | |
| 2005/0188400 A1 | 8/2005 | Topel | |
| 2005/0197954 A1 | 9/2005 | Maitland et al. | |
| 2005/0216339 A1 | 9/2005 | Brazell et al. | |
| 2005/0235030 A1 | 10/2005 | Lauckhart et al. | |
| 2005/0240354 A1 | 10/2005 | Mamou et al. | |
| 2005/0251444 A1 | 11/2005 | Varian et al. | |
| 2005/0261062 A1 | 11/2005 | Lewin | |
| 2005/0273388 A1 | 12/2005 | Roetter | |
| 2006/0026067 A1 | 2/2006 | Nicholas et al. | |
| 2006/0031301 A1 | 2/2006 | Herz et al. | |
| 2006/0041661 A1 | 2/2006 | Erikson et al. | |
| 2006/0128469 A1 | 6/2006 | Willis et al. | |
| 2006/0212350 A1 | 9/2006 | Ellis et al. | |
| 2006/0224447 A1 | 10/2006 | Koningstein | |
| 2006/0253323 A1 | 11/2006 | Phan et al. | |
| 2007/0033105 A1 | 2/2007 | Collins et al. | |
| 2007/0033269 A1 | 2/2007 | Atkinson et al. | |
| 2007/0033532 A1 | 2/2007 | Lemelson | |
| 2007/0050244 A1 | 3/2007 | Stevens | |
| 2007/0061195 A1 | 3/2007 | Liu et al. | |
| 2007/0118796 A1 | 5/2007 | Nazem et al. | |
| 2007/0143171 A1 * | 6/2007 | Boyd | G06Q 30/0278 705/306 |
| 2007/0150353 A1 | 6/2007 | Krassner et al. | |
| 2007/0156524 A1 | 7/2007 | Grouf et al. | |
| 2007/0157245 A1 | 7/2007 | Collins | |
| 2007/0192356 A1 | 8/2007 | O'Kelley | |
| 2007/0198350 A1 | 8/2007 | O'Kelley et al. | |
| 2007/0214037 A1 | 9/2007 | Shubert et al. | |
| 2007/0265923 A1 | 11/2007 | Krassner et al. | |
| 2007/0271392 A1 | 11/2007 | Khopkar et al. | |
| 2007/0271501 A1 | 11/2007 | Vasilik | |
| 2007/0271511 A1 | 11/2007 | Khopkar et al. | |
| 2008/0004954 A1 | 1/2008 | Horvitz | |
| 2008/0021778 A1 | 1/2008 | Perkowski et al. | |
| 2008/0052278 A1 | 2/2008 | Zlotin et al. | |
| 2008/0052413 A1 | 2/2008 | Wang et al. | |
| 2008/0086380 A1 | 4/2008 | Cohen et al. | |
| 2008/0097832 A1 | 4/2008 | Lee et al. | |
| 2008/0103799 A1 | 5/2008 | Domenikos et al. | |
| 2008/0103800 A1 | 5/2008 | Domenikos et al. | |
| 2008/0103895 A1 * | 5/2008 | Burdick | G06Q 30/02 705/14.71 |
| 2008/0109376 A1 | 5/2008 | Walsh et al. | |
| 2008/0162574 A1 | 7/2008 | Gilbert | |

(56) References Cited

U.S. PATENT DOCUMENTS

| | | |
|---|---|---|
| 2008/0189175 A1 | 8/2008 | Chan |
| 2008/0249855 A1 | 10/2008 | Collins et al. |
| 2008/0255922 A1* | 10/2008 | Feldman ............... G06Q 30/02 705/14.71 |
| 2008/0256061 A1 | 10/2008 | Chang et al. |
| 2008/0262907 A1 | 10/2008 | Broady et al. |
| 2008/0275757 A1* | 11/2008 | Sharma ................. G06Q 30/02 705/7.29 |
| 2008/0313027 A1 | 12/2008 | Jain et al. |
| 2009/0002852 A1 | 1/2009 | Wang |
| 2009/0012852 A1 | 1/2009 | O'Kelley et al. |
| 2009/0063250 A1 | 3/2009 | Burgess |
| 2009/0083145 A1 | 3/2009 | Lee |
| 2009/0098891 A1 | 4/2009 | Park et al. |
| 2009/0112629 A1 | 4/2009 | Leiper |
| 2009/0150362 A1 | 6/2009 | Evenhaim |
| 2009/0216619 A1 | 8/2009 | Tavernier |
| 2009/0228397 A1 | 9/2009 | Tawakol et al. |
| 2009/0327006 A1 | 12/2009 | Hansan |
| 2010/0023863 A1 | 1/2010 | Cohen-Martin |
| 2010/0042497 A1 | 2/2010 | Pritchard et al. |
| 2010/0049602 A1 | 2/2010 | Softky |
| 2010/0070322 A1 | 3/2010 | Lahaie et al. |
| 2010/0082402 A1 | 4/2010 | Kantak et al. |
| 2010/0082429 A1 | 4/2010 | Samdadiya et al. |
| 2010/0094758 A1 | 4/2010 | Chamberlain et al. |
| 2010/0100407 A1 | 4/2010 | Lin et al. |
| 2010/0114716 A1 | 5/2010 | Heilig et al. |
| 2010/0145763 A1 | 6/2010 | Swanson |
| 2010/0185516 A1 | 7/2010 | Swanson et al. |
| 2010/0191558 A1 | 7/2010 | Chickering et al. |
| 2010/0228634 A1 | 9/2010 | Ghosh et al. |
| 2010/0250332 A1* | 9/2010 | Ghosh ................... G06Q 30/02 705/26.1 |
| 2010/0268603 A1 | 10/2010 | Nolet et al. |
| 2011/0035259 A1 | 2/2011 | Das et al. |
| 2011/0035287 A1 | 2/2011 | Fox |
| 2011/0055009 A1 | 3/2011 | Kiversis |
| 2011/0078143 A1 | 3/2011 | Aggarwal |
| 2011/0119125 A1 | 5/2011 | Javangula et al. |
| 2011/0145570 A1 | 6/2011 | Gressel et al. |
| 2011/0191714 A1 | 8/2011 | Ting et al. |
| 2011/0213659 A1 | 9/2011 | Fontoura et al. |
| 2011/0225037 A1* | 9/2011 | Tunca ................... G06Q 30/02 705/14.46 |
| 2011/0231264 A1 | 9/2011 | Dilling et al. |
| 2011/0246298 A1 | 10/2011 | Williams et al. |
| 2011/0246310 A1 | 10/2011 | Buchalter et al. |
| 2011/0251875 A1 | 10/2011 | Cosman |
| 2011/0276389 A1* | 11/2011 | Kulkarni ............ G06Q 30/0275 715/764 |
| 2011/0313757 A1 | 12/2011 | Hoover et al. |
| 2012/0041816 A1* | 2/2012 | Buchalter ............. G06Q 30/02 705/14.71 |
| 2012/0129525 A1 | 5/2012 | Pazhyannur et al. |
| 2012/0215607 A1 | 8/2012 | Brereton, II et al. |
| 2012/0226560 A1 | 9/2012 | Chang et al. |
| 2012/0253928 A1* | 10/2012 | Jackson ................. G06Q 30/02 705/14.49 |
| 2012/0323674 A1 | 12/2012 | Simmons et al. |
| 2013/0124316 A1 | 5/2013 | Kiversis |
| 2013/0124669 A1 | 5/2013 | Anderson et al. |
| 2013/0185039 A1 | 7/2013 | Tesauro et al. |
| 2013/0276009 A1 | 10/2013 | Ajitomi et al. |
| 2013/0346597 A1 | 12/2013 | Baumback et al. |
| 2014/0059343 A1 | 2/2014 | Mohajeri et al. |
| 2014/0082660 A1 | 3/2014 | Zhang et al. |
| 2014/0108139 A1 | 4/2014 | Weinstein |
| 2014/0143032 A1 | 5/2014 | Tomlin et al. |
| 2014/0201007 A1 | 7/2014 | Stack et al. |
| 2014/0222593 A1 | 8/2014 | Cosman |
| 2014/0279595 A1 | 9/2014 | Senaratna et al. |
| 2015/0042379 A1 | 2/2015 | Hara |
| 2015/0051986 A1 | 2/2015 | Saifee et al. |
| 2015/0066793 A1 | 3/2015 | Brown |
| 2015/0193818 A1 | 7/2015 | Turner et al. |
| 2015/0242379 A1 | 8/2015 | Kuivinen et al. |
| 2015/0347353 A1 | 12/2015 | Turner et al. |
| 2015/0348141 A1 | 12/2015 | Parker et al. |
| 2016/0071168 A1 | 3/2016 | Buchalter et al. |
| 2016/0170567 A1 | 6/2016 | Hunter et al. |
| 2016/0316240 A1 | 10/2016 | Hirsch et al. |
| 2017/0052652 A1 | 2/2017 | Denton et al. |
| 2017/0330245 A1 | 11/2017 | Guermas et al. |
| 2018/0040032 A1 | 2/2018 | Chalasani et al. |
| 2018/0189843 A1 | 7/2018 | Kulkarni et al. |
| 2019/0205900 A1 | 7/2019 | Buchalter |
| 2019/0244257 A1 | 8/2019 | Goldman et al. |
| 2019/0340655 A1 | 11/2019 | Buchalter et al. |
| 2019/0347693 A1 | 11/2019 | Schobeiri et al. |
| 2019/0347697 A1 | 11/2019 | Chalasani et al. |
| 2019/0373077 A1 | 12/2019 | Lepore et al. |
| 2020/0160388 A1 | 5/2020 | Sabeg et al. |
| 2021/0090126 A1 | 3/2021 | Schobeiri et al. |
| 2021/0125223 A1 | 4/2021 | Schobeiri et al. |

FOREIGN PATENT DOCUMENTS

| | | |
|---|---|---|
| KR | 20000030103 | 8/2008 |
| WO | WO 2005/094175 | 10/2005 |
| WO | WO 2009/078861 | 6/2009 |
| WO | WO 2012/167209 | 12/2012 |
| WO | WO 2014/074347 | 5/2014 |

OTHER PUBLICATIONS

"Yahoo New "SmartAds" Meld Brand and Direct Response Advertising" printed Sep. 6, 2007.

"Yahoo Smart Ads Demo Page" printed Sep. 6, 2007.

Abacus Selects MicroStrategy for Enhanced Marketing Campaign Reporting and Analysis, PRNewswire, Mar. 1, 2006, Retrieved from: http://prnewswire.com/news-releases/abacus-selects-microstrategy-for-enhanced-marketing-campaign-reporting-and-analysis-55192512.html (1 page).

Chen, M., et al., Mining changes in customer behavior in retail marketing, 2005, pp. 773-781, Expert Systems with Application, vol. 28, 9 pages.

Eric W. Tyree et al., Bankruptcy prediction models: probabilistic neural networks versus discriminant analysis and backpropagation neural networks, 1996.

EP Extended Search Report for Application No. 11713434.6 dated Feb. 24, 2014.

EP Supplementary Search Report for Application No. 11713434.6 dated Mar. 13, 2014.

Fu, A., et al., Privacy-Preserving Frequent Pattern Mining Across Private Databases, 2005, Proceeding of the Fifth IEEE International Conference on Data Mining, 4 Pages.

Google, A Revolution in Measuring Ad Effectiveness: Knowing Who Would have Been Exposed. 2015.

International Preliminary Reporton Patentability dated Jan. 31, 2013 in PCT Application No. PCT/US2011/044386.

International Search Report and Written Opinion dated Jan. 27, 2012 in PCT Application No. PCT/US2011/030587.

International Search Report and Written Opinion dated Jan. 9, 2012 in PCT Application No. PCT/US2011/044386.

International Search Report and Written Opinion dated Feb. 24, 2014 in PCT Application No. PCT/US13/67330.

International Search Report and Written Opinion PCT/US11/43231 dated Jan. 19, 2012.

Privacy Preserving Data Mining Biography, Retrieved from: http://www.cs.umbc.edu/-kunliu1/research/privacy_review.html (12 pages).

Sammy, Ryan, Google's New Beta PPC Service Dubbed Remarketing, retrieved from internet: www.searchenginejournal.com/google%E2%80%99s-new-beta-ppc-service-dubbed-remarketing/18900/ (posted on Mar. 17, 2010).

Seufert, Eric, Measuring advertising incrementality using Ghost Ads, 2014 (Year: 2014).

(56) References Cited

OTHER PUBLICATIONS

University of Colorado Boulder Web Central, Expandable Content Sample, Apr. 4, 2016, (https://www.colorado.edu/webcentral/web-express-features/site-building-snap/expandable-content-sample (Year: 2016).

Wikipedia contributors. "Conditional probability distribution." Wikipedia, The Free Encyclopedia, Mar. 10, 2016 Web. Mar. 30, 2016.

Wikipedia contributors. "Posterior probability." Wikipedia, The Free Encyclopedia. Wikipedia, The Free Encyclopedia, Mar. 9, 2016. Web. Mar. 30, 2016.

Wikipedia contributors. "Probability distribution." Wikipedia, The Free Encyclopedia. Wikipedia, The Free Encyclopedia, Mar. 28, 2016. Web. Mar. 30, 2016.

Wikipedia contributors. "Stepwise regression." Wikipedia, The Free Encyclopedia. Wikipedia, The Free Encylcopedia, Mar. 19, 2016. Web. Mar. 30, 2016.

Xiong, L., et al., K Nearest Neighbor Classification across Multiple Private Databases, Nov. 5-11, 2006, CIKM'06, 2 pages.

Sweeney, "How Real-Time Bidding (RTB) Changed Online Display Advertising", Clearcode Blog, Jan. 8, 2015 https://clearcode.cc/blog/real-time-bidding-online-display-advertising/[Feb. 3, 2021 11:48:43 AM].

Hornyack, et al. ("These aren't the droids you're looking for: retrofitting android to protect data from imperious applications," in Proceedings of the 18th ACM conference on Computer and cummuications security (CCS '11), Association for Computing Machinery, New York, NY, USA, 639-652. 2011. (Year:2011).

\* cited by examiner

| Parameter | Parameter/Data Name | Exh A | Exh B |
|---|---|---|---|
| P1 | API format | POST, Google protocol buffer | GET, query string params |
| P2 | Response Time | 150ms | 150ms |
| P3 | RequestID | id | admeld_request_id |
| P4 | UserID | google_user_id | admeld_user_id |
| P5 | Ext UserID | - | external_user_id |
| P6 | IP | ip | ip_address |
| P7 | TimeZone | - | time_zone |
| P8 | Language | detected_language | language |
| P9 | Browser | user_agent | user_agent |
| P10 | Site URL | - | - |
| P11 | Page URL | url | url |
| P12 | Referrer (of Page URL) | - | refer_url |
| P13 | Cookie | - | via request's "Cookie" header |
| P14 | Category | detected_vertical, AdSlot.targetable_channel | - |
| P15 | PublisherID | - | - |
| P16 | TagID | - | admeld_tag_id |
| P17 | SiteID | anonymous_id | admeld_website_id |
| P18 | Age | - | - |
| P19 | Gender | - | - |
| P20 | Country | country | - |
| P21 | Region | region | - |
| P22 | DMA | metro | - |
| P23 | City | city | - |
| P24 | AdTagType (js, html) | - | - |
| P25 | AdType | AdSlot.excluded_attribute? | - |
| P26 | Width | AdSlot.width | size(wxh) |
| P27 | Height | AdSlot.height | size(wxh) |
| P28 | ScreenWidth | - | - |
| P29 | ScreenHeight | - | - |
| P30 | Frequency | - | - |
| P31 | Ads on Page | - | - |
| PN | Others | hashed_cookie, cookie_version, excluded_click_through_url, AdSlot.allowed_vendor_type, AdSlot.excluded_category, AdSlot.id, MatchingAdData.adgroup_id | view_count, position, max_response_time |

*Fig. 2Ha*

| Exh C | Exh D | Exh N |
|---|---|---|
| POST, JSON | GET, query string params | POST, Google protocol buffer |
| - | 75ms | 125ms |
| bid_request_guid | requestId | request_id |
| adbrite_visitor_id | uid | user_cookie_id |
| - | - | - |
| visitor_ip | ip | user_ip_address |
| geo_data.timezone | timezone | - |
| - | language | user_lang |
| user_agent | browser | user_agent |
| zone_data.zone_url | site-url | - |
| page_data.page_url | pageurl | url |
| - | refurl | http_referer |
| partner_visitor_data | cookie | - |
| zone_data.zone_quality | - | ox_cat_tier_1<br>ox_cat_tier_2 |
| zone_data.zone_id | adid | - |
| - | - | - |
| demo_data.age | - | - |
| demo_data.gender | - | - |
| geo_data.country | - | user_geo_country |
| - | - | user_geo_state |
| geo_data.dma | - | user_geo_dma |
| - | - | - |
| - | adTagType | - |
| zone_data.supported_ad_types | - | pub_blocked_type |
| zone_data.weight | adWidth | ad_width |
| zone_data.height | adHeight | ad_height |
| - | screenResolution (WxH) | user_screen_width |
| - | screenResolution (WxH) | user_screen_height |
| session_data.number_of_page_views | - | - |
| page_data.number_of_ads_on_page | - | - |
| zone_data.supported_rich_media_vendors, impression_attributes, zone_keywords, session_data.previous_page_view_time | bidCurrency | , pub_blocked_content, pub_blocked_url, pub_blocked_cat |

*Fig. 2Hb*

| Parameter | Parameter/Data Name | Exh A | Exh B | Exh C | Exh D | Exh N |
|---|---|---|---|---|---|---|
| P1 | API format | Google protocol buffer | JSON | JSON | Plain text | Google protocol buffer |
| P2 | Response size | < 1K | not specified | not specified | not specified | <1K |
| P3 | Response Code | - | - | response_code: "bid", "error code", "pass" | - | - |
| P5 | CPM | - | cpm | bid_amount | bid | cpm_bid_micros |
| P6 | Creative | AdSlot.max_cpm_micros | creative | ad_code | either: creativeHTMLURL or creativeJSURL | ad_code |
| P7 | Creative ID | html_snippet | creative_id | - | - | - |
| P8 | Creative Attribute | - | - | - | - | - |
| P9 | Click-thru URL | attribute | - | - | - | click_url |
| P10 | Request ID | click_through_url | request_id | - | request_id | request_id |
| P11 | Transaction ID | AdSlot.id (not quite) | - | - | id | - |
| P12 | Brand Type | - | - | - | - | - |
| P13 | Notification URL | vendor_type | - | win_feedback_image_url | - | - |
| P14 | Piggyback Cookie | - | - | - | piggybackCookie | - |
| P15 | Others | processing_time_ms, AdSlot.min_cpm_micros | brand_name, brand_id, filter | win_feedback_html, visitor_ignore_interval, | bidCurrency | |

SYSTEMS AND METHODS FOR DETERMINING COMPETITIVE MARKET VALUES OF AN AD IMPRESSION

RELATED APPLICATION

This present application is a continuation of U.S. patent application Ser. No. 17/313,614, entitled "SYSTEMS AND METHODS FOR DETERMINING COMPETITIVE MARKET VALUES OF AN AD IMPRESSION," filed May 6, 2021, which is a continuation of U.S. patent application Ser. No. 16/773,053, entitled "SYSTEMS AND METHODS FOR DETERMINING COMPETITIVE MARKET VALUES OF AN AD IMPRESSION," filed Jan. 27, 2020, now U.S. Pat. No. 11,049,118, issued Jun. 29, 2021, which is a continuation of U.S. patent application Ser. No. 16/222,519, entitled "SYSTEMS AND METHODS FOR DETERMINING COMPETITIVE MARKET VALUES OF AN AD IMPRESSION," filed Dec. 17, 2018, now U.S. Pat. No. 10,592,910, issued Mar. 17, 2020, which is a continuation of U.S. patent application Ser. No. 13/185,236, entitled "SYSTEMS AND METHODS FOR DETERMINING COMPETITIVE MARKET VALUES OF AN AD IMPRESSION," filed Jul. 18, 2011, now U.S. Pat. No. 10,223,703, issued Mar. 5, 2019, which claims priority to and is a Non-provisional Application of U.S. Provisional Patent Application Ser. No. 61/365,623, entitled "SYSTEMS AND METHODS FOR DETERMINING COMPETITIVE MARKET VALUES OF AN AD IMPRESSION", filed on Jul. 19, 2010. Each of the foregoing applications is incorporated, incorporated herein by reference in its entirety for all purposes.

A portion of the disclosure of this patent document contains material which is subject to copyright protection. The copyright owner has no objection to the facsimile reproduction by anyone of the patent document or the patent disclosure, as it appears in the file or records of the Patent and Trademark Office, but otherwise reserves all copyright rights whatsoever.

FIELD OF THE DISCLOSURE

This disclosure generally relates to systems and methods for trading online advertising space. In particular, this disclosure relates to systems and methods for determining market values of an ad impression.

BACKGROUND OF THE DISCLOSURE

Online publishers typically provide or allocate portions of their web pages for advertising purposes. These areas are sometimes referred to as impression opportunities. Some of the impression opportunities are available for advertising products, services, or businesses not directly provided by or related to the online publishers. In some embodiments, these impression opportunities are available to advertisers for a price. These impression opportunities are sometimes made available directly to advertisers or through one or more advertising networks (sometimes referred to as "ad networks") operating as middlemen. In some embodiments, advertising exchanges provide a platform for buying and selling advertising impressions by consolidating and managing impression opportunities across a plurality of publishers. Advertisers interested in impression opportunities may comprise an individual, company or other client entity, which may be further represented by one or more advertising agencies. An advertising agency may design and/or implement an advertising campaign on behalf of a client and procure or buy impression opportunities based on the advertising campaign. As online activity trends upwards and advertisers are looking for the right media to maximize their online exposure, trading in impression opportunities have become increasingly sophisticated.

BRIEF SUMMARY OF THE DISCLOSURE

In various aspects, the present application is directed to methods and systems for determining market values of an ad impression. In order to make an informed bid, a brain engine of a demand side platform (DSP) may predict a competitive market value for an advertisement (ad) impression, given the conditions of the market. The brain engine may have access to information about the ad impression, as well as past or recent records of ad impression bids. The brain engine may additionally acquire information, such as insights and analytics, to assess the market worth of the ad impression. Further, the DSP may estimate a fair market value for the ad impression in the context of a particular ad campaign, creative and/or advertiser. The worth or value of the ad impression may depend on how well the ad impression matches the goals and other aspects of the campaign. Based on the competitive market value, the brain engine may further select a bid aggressiveness slider value, to adjust the fair market value and/or determine a bid price for the ad impression.

In one aspect, the present invention is related to a method for determining competitive market values for an ad impression on an advertiser exchange. An engine executing on a device may receive a candidate set of inputs associated with ad impressions. The engine may determine competitive market values for an ad impression on an advertiser exchange. The engine may determine candidate clearing prices based on the candidate set of inputs and history of clearing prices on the advertiser exchange. The engine may generate, based on the candidate clearing prices, a competitive market value prediction for the ad impression on the advertiser exchange. The competitive market value prediction may comprise a distribution function of predicted clearing prices on the advertiser exchange.

In some embodiments, the engine receives a candidate set of inputs comprising one or more of: a campaign goal of the advertiser, a budget of the advertiser's ad campaign, performance of the advertiser's ad campaign, and the spending pace for the budget. The engine and/or ad campaign may define an initial period and portion of an ad campaign budget for limiting the candidate set of inputs and the history of clearing prices for the determination of the candidate clearing prices. The engine may generate a set of predicted fair market value bids based on at least one of the following types of goals: cost per click (CPC), cost per lead (CPL), cost per sale (CPS), cost per action (CPA), return on investment (ROI), or winning a targeted portion of available ad impressions.

In some embodiments, the engine dynamically incorporates new candidate set of inputs to generate an updated competitive market value prediction. The engine may generate, based at least in part on the competitive market value prediction, one or more fair market value bids for the ad impression in the context of a specific ad campaign.

In another aspect, the present invention is related to a method for determining fair market value bids for an ad impression. An engine executing on a device may receive a candidate set of inputs associated with an ad impression and a specified ad campaign. The engine may determine fair market values for an ad impression and a specified ad campaign. The engine may determine, based on the candidate set of inputs, that a statistically valid prediction can be made of a fair market value for the ad impression. The engine may generate, responsive to the determination, a set of predicted fair market value bids for the ad impression in the context of the ad campaign.

In some embodiments, the engine receives a candidate set of inputs comprising one or more of: a campaign goal of the advertiser, a budget of the advertiser's ad campaign, performance of the advertiser's ad campaign, and the spending pace for the budget. The engine may receive a candidate set of inputs comprising one or more high-performing ad impression characteristics and low-performing ad impression characteristics. The engine may receive a candidate set of inputs comprising a distribution function of predicted clearing prices on an advertiser exchange for the ad impression. In certain embodiments, the engine generates a set of predicted fair market value bids based on at least one of the following types of goals: cost per click (CPC), cost per lead (CPL), cost per sale (CPS), cost per action (CPA), return on investment (ROI), or winning a targeted portion of available ad impressions.

In some embodiments, the engine and/or a bidder submits a bid for the ad impression based on the set of predicted fair market value bids if the engine determines that the bid is likely to win against another fair market value bid of another ad campaign. The engine may dynamically incorporate new candidate set of inputs to generate an updated set of predicted fair market value bids for the ad impression.

In yet another aspect, the present disclosure is related to a method for managing aggressiveness of bidding based on fair market value and competitive market value of an ad impression. A bidder may receive identification of a bid aggressiveness value on a predetermined bid aggressiveness scale. The bidder may scale a fair market value generated for an ad impression with a predetermined scaling factor. The bidder may determine whether the scaled fair market value is greater than a competitive market value for the ad impression corresponding to the bid aggressiveness value received by the bidder.

In some embodiments, a DSP and/or an ad campaign may select the bid aggressiveness value based on at least one of the following types of goals: cost per click (CPC), cost per lead (CPL), cost per sale (CPS), cost per action (CPA), return on investment (ROI), or winning a targeted portion of available ad impressions. The bidder may receive identification of a bid aggressiveness value on a predetermined bid aggressiveness scale, the scale having an assigned value below which a bid using a corresponding competitive market value is expected to win less than 50% of the available ad impressions, and above which a bid using a corresponding competitive market value is expected to win more than 50% of the available ad impressions.

In certain embodiments, the bidder determines the scaling factor based on the bid aggressiveness value received. The bidder may determine the scaling factor to comprise a value less than 1 if the bid aggressiveness value received is less than the assigned value. The bidder may select, as the fair market value bid, the greater of the scaled fair market value and the competitive market value corresponding to the received bid aggressiveness value, if the bid aggressiveness value received is less than the assigned value. In some embodiments, the bidder may select, as the fair market value bid, the lesser of the scaled fair market value and the competitive market value corresponding to the received bid aggressiveness value, if the bid aggressiveness value received is more than the assigned value.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIGS. 2Ha and 2Hb are block diagrams depicting an embodiment of different data related to bid requests for a plurality of impression opportunity providers;

FIG. 2I is a block diagram depicting an embodiment of different data related to bid response for a plurality of impression opportunity providers;

FIG. 2J is a block diagram depicting an embodiment of goals and constraints defined for a campaign;

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for providing a demand side platform; and Section C describes embodiments of systems and methods for determining competitive and fair market values of an advertising impression.

A. Computing and Network Environment

Figure 1A:
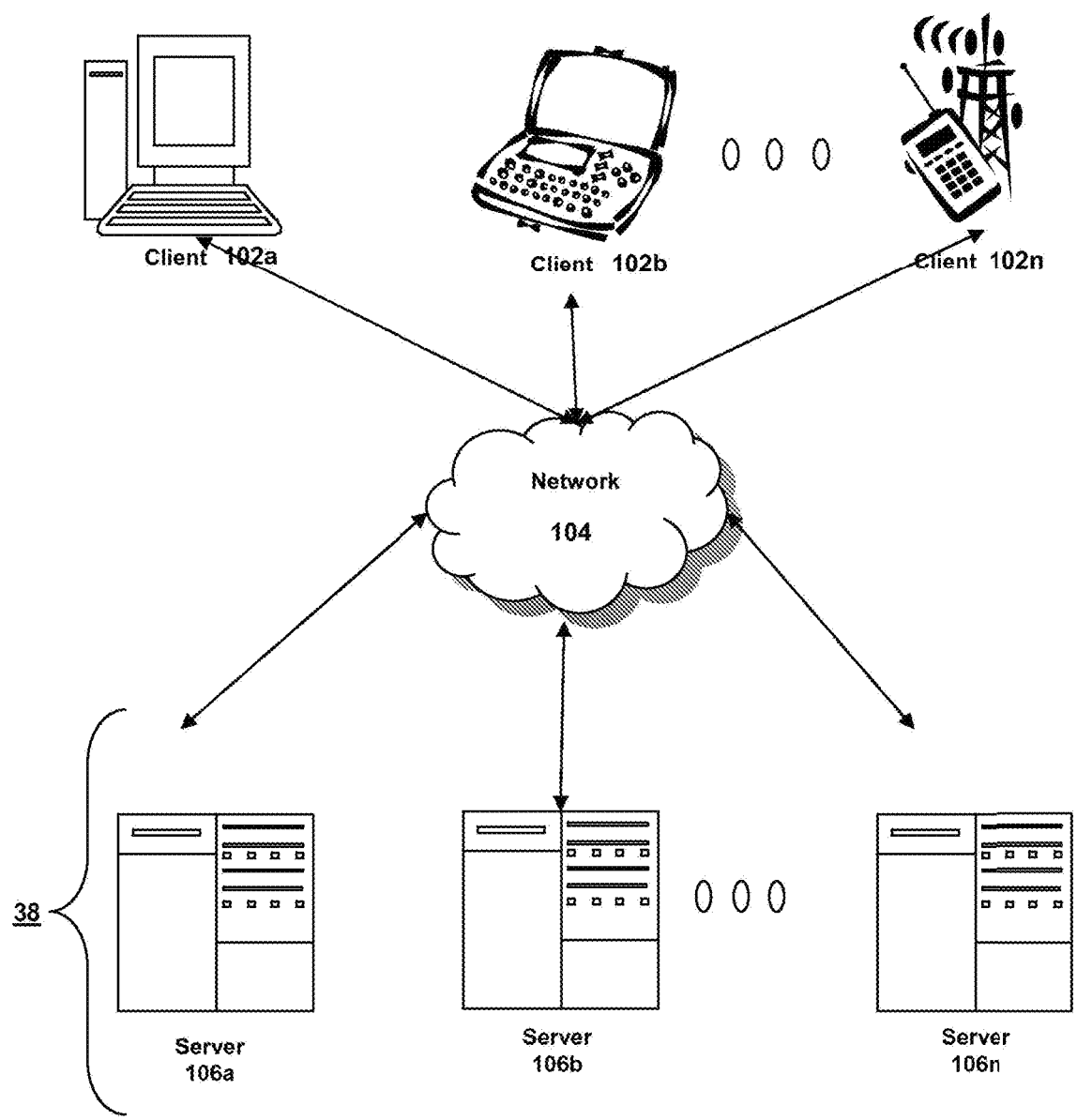
FIG. 1A is a block diagram depicting an embodiment of a network environment comprising client machines in communication with remote machines.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be any type and/or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the Xen hypervisor, an open source product whose development is overseen by Citrix Systems, Inc.; the VirtualServer or virtual PC hypervisors provided by Microsoft or others.

In order to manage a machine farm 38, at least one aspect of the performance of servers 106 in the machine farm 38 should be monitored. Typically, the load placed on each server 106 or the status of sessions running on each server 106 is monitored. In some embodiments, a centralized service may provide management for machine farm 38. The centralized service may gather and store information about a plurality of servers 106, respond to requests for access to resources hosted by servers 106, and enable the establishment of connections between client machines 102 and servers 106.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

In one embodiment, the server 106 provides the functionality of a web server. In another embodiment, the server 106a receives requests from the client 102, forwards the requests to a second server 206b and responds to the request by the client 102 with a response to the request from the server 106b. In still another embodiment, the server 106 acquires an enumeration of applications available to the client 102 and address information associated with a server 106' hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives output data, such as display data, generated by an execution of the identified application on the server 106.

Figure 1B:
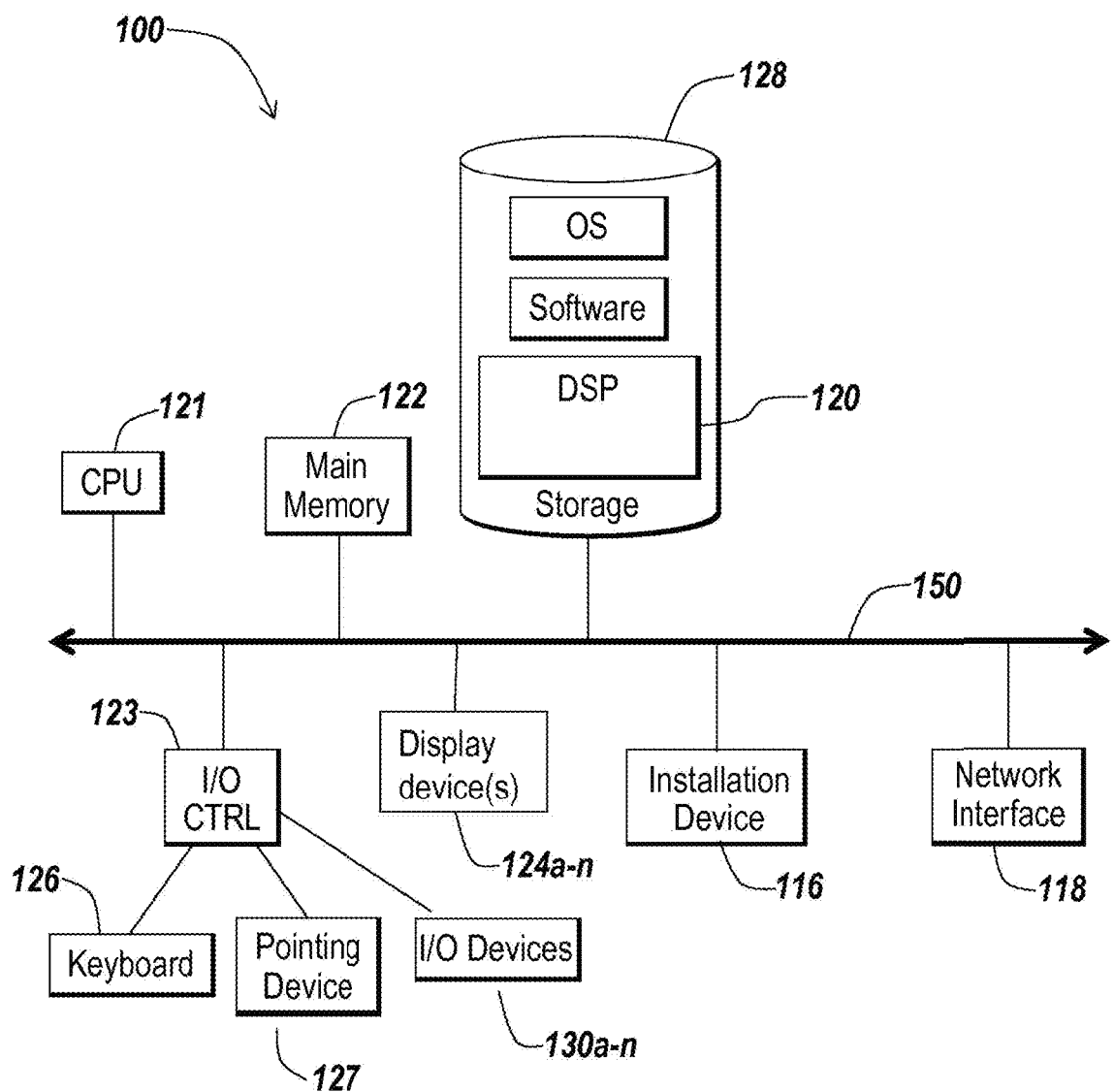
FIGS. 1B and 1C are block diagrams depicting embodiments of computing devices useful in connection with the methods and systems described herein.
Figure 1C:
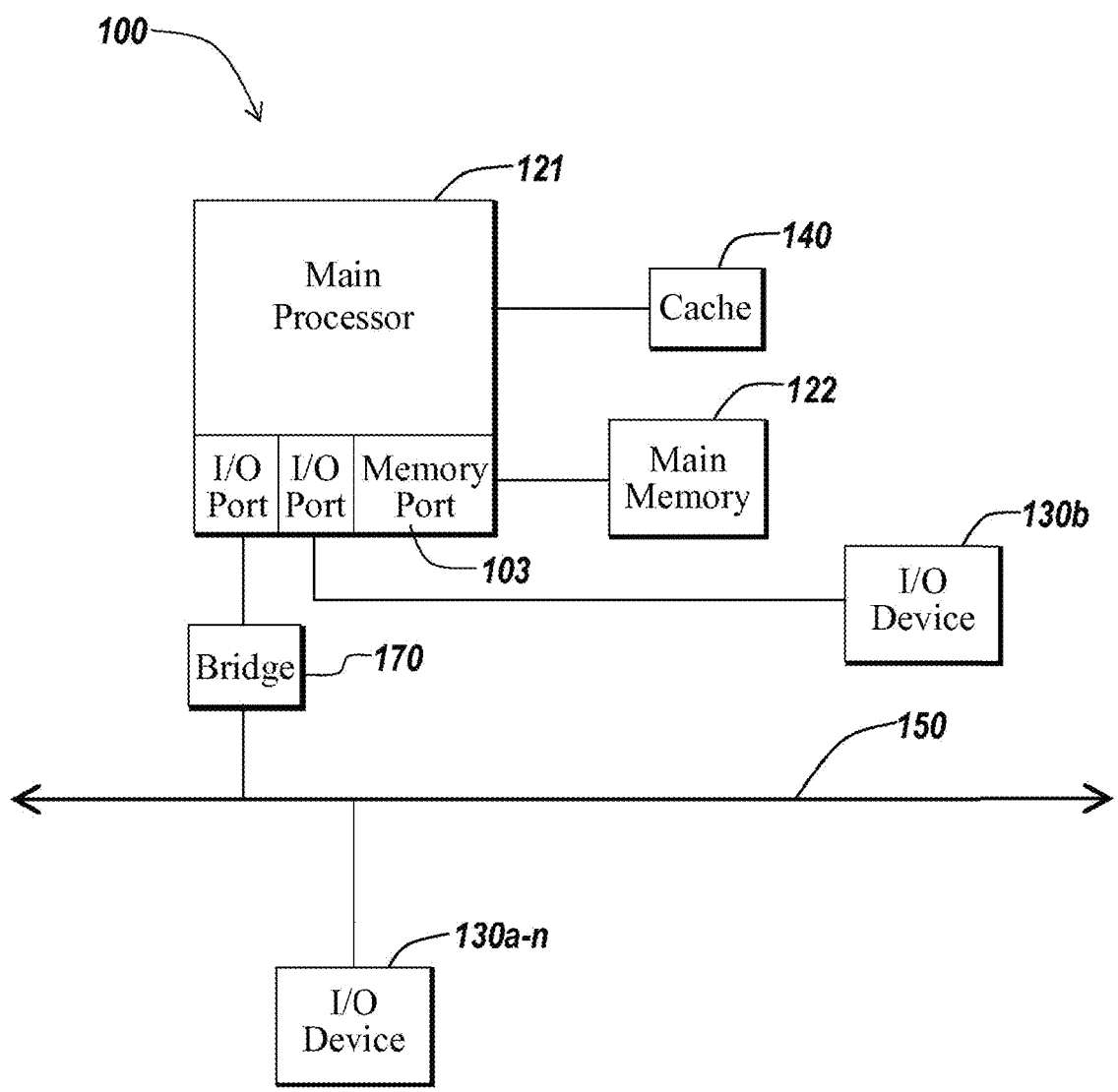

The client 102 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 102 or a server 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-102n, a keyboard 126 and a pointing device 127, such as a mouse. The storage device 128 may include, without limitation, an operating system, software, and a software of a demand side platform 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, dials, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, a flash memory drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the software 120 for the demand side platform. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, a Serial Attached small computer system interface bus, or a HDMI bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS MOBILE, WINDOWS XP, and WINDOWS VISTA, all of which are manufactured by Microsoft Corporation of Redmond, Wash.; MAC OS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein. For example, the computer system 100 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95c1, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 100 is a digital audio player such as the MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the communications device 102 includes a combination of devices, such as a mobile phone combined with a digital audio player or portable media player. In one of these embodiments, the communications device 102 is a smartphone, for example, an iPhone manufactured by Apple Computer, or a Blackberry device, manufactured by Research In Motion Limited. In yet another embodiment, the communications device 102 is a laptop or desktop computer equipped with a web browser and a microphone and speaker system, such as a telephony headset. In these embodiments, the communications devices 102 are web-enabled and can receive and initiate phone calls. In other embodiments, the communications device 102 is a Motorola RAZR or Motorola ROKR line of combination digital audio players and mobile phones.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Demand Side Platform

Online publishers typically provide or allocate areas or portions of their web pages for advertising (or "ad") purposes. These areas or portions are generally differentiated from content created or published by the publishers. These areas or portions are hereafter sometimes generally referred to as impression opportunities. Some of these impression opportunities are available for advertising products, services, or businesses not directly provided by or related to the online publishers. In some embodiments, these impression opportunities are available to advertisers for a price.

Impression opportunities may include any form or type of space or region on a web page. This space or region may overlap with or reside within (or as part of) content on the page (e.g., locations for banners, ad blocks, sponsored listings, margin ads and flash displays). Impression opportunities may be temporal, e.g., associated with a time slot (e.g., screening of a sponsored video footage prior to a requested screening, or available on a part of a day referred to as a day part). In some embodiments, an impression opportunity may sometimes not directly reside on a webpage. For example and in one embodiment, an impression opportunity may be generated from a webpage, such as due to an user action or some other trigger. For example, a pop-up may be generated when a webpage is loaded onto a browser. A window display or other widget may be generated responsive to a mouse-over. In some embodiments, an impression opportunity may include one or more elements such as a banner and an animated flash display extending from the banner boundary. In some embodiments, elements that may individually qualify as an impression opportunity may be collectively packaged as a single impression opportunity. In some embodiments, an impression opportunity is sometimes referred to as "inventory" (e.g., of a publisher).

Impression opportunities are sometimes offered directly to advertisers. In some embodiments, publishers may offer impression opportunities through one or more ad networks and/or ad exchanges. An ad network or ad exchange may consolidate and/or manage impression opportunities on behalf of a publisher. An ad network or ad exchange may consolidate and/or manage impression opportunities across a plurality of publishers. In particular, an ad exchange may provide a platform for buying and selling advertising impressions. An ad exchange may provide services (e.g., for trading impression opportunities) beyond that of ad networks. In some embodiments, ad networks and ad exchanges have distinct features as defined by the Interactive Advertising Bureau (IAB). Ad exchanges may include, but is not limited to Microsoft AdECN, Yahoo Right Media, and DoubleClick, a Google subsidiary.

In some embodiments, an ad exchange operates as a platform, interface or mediator for matching an impression opportunity buyer with a seller. As the online ad market becomes more automated and exchange-driven, ad exchanges may provide better efficiency and value to buyers and sellers than ad networks. As an ad exchange attempts to broker a transaction, the buy side (e.g., advertiser or ad agency) may make a bid and the sell side (e.g., publisher) may set a floor for accepting a bid or accept the highest bid from multiple sellers. Due to the benefits provided by ad exchanges, ad exchanges may command a relatively large share of the profit from transacting an impression opportunity. This may be especially true as ad rates or impression opportunity rates drop. In some cases, ad agencies may see their margins drop, e.g., to 10% or lower. Taking more control of the buying process, such as by using the methods and systems disclosed herein, may change such a trend.

Moreover, in some embodiments, an ad exchange brokering a transaction between a seller and multiple buyers may provide more value to the seller than to the buyers. In other embodiments, an ad exchange may represent only a limited pool of impression opportunities to a buyer. Furthermore, an ad exchange may offer less competitive terms to a buyer for a given impression opportunity as compared to another ad exchange. The transaction interface provided by an ad exchange to a buyer may include unique and/or proprietary processes, specific configuration of impression opportunity-related information, non-uniform transaction terms and/or parameters. Due to the non-uniform transaction interface provided by each ad exchange, a seller may not be able to determine a preferred ad exchange(s) to work with. This can be true in general, for a particular ad campaign, or for a particular impression opportunity bid. In some embodiments, the systems and methods disclosed herein provide a single interface for a buyer (e.g., an ad agency) to access a plurality of ad exchanges, and integrate multiple pools of impression opportunities from these ad exchanges for bidding by the buyer.

Embodiments of the methods and systems of a demand side platform disclosed herein may address the issues described above. The platform of the present disclosure provides the following one or more features and/or combination of the features that characterize the platform as a demand side platform:

(a) the platform integrates and interfaces to multiple exchanges to provide normalized access to a cross-exchange spectrum of disparate and different supply sources;

(b) the platform integrates and interfaces to third party ad servers for reporting on performance and/or operations;

(c) the platform calculates daily impression estimates for the multiple exchanges and campaigns;

(d) the platform provides an interface to match buyer demand to supplier supply by matching against the inventory of impressions;

(e) the platform provides a system to trade demand to supply to connect a plurality of buyers (demand) across a plurality of disparate sellers (supply)

(f) the platform provides reporting of performance of an ad campaign of a buyer across a cross-exchange spectrum of suppliers.

(g) the platform provides flighting: a period of time in which a defined bid price, daily spend goal and frequency cap are defined.

Embodiments of the demand side platform may include any combination of the above-mentioned features. With these embodiments of the demand side platform, the present disclosure provides performance, simplicity, processing algorithms and reporting not previously offered in a single integrated solution and service. Embodiments of the demand side platform may be offered, delivered or deployed as a software, a service or a managed service, application or platform. Embodiments of the demand side platform may be offered, delivered or deployed as an outsourced service. In some embodiments, the demand side platform may be offered, delivered or deployed as a combination of managed and outsourced service.

Figure 2A:
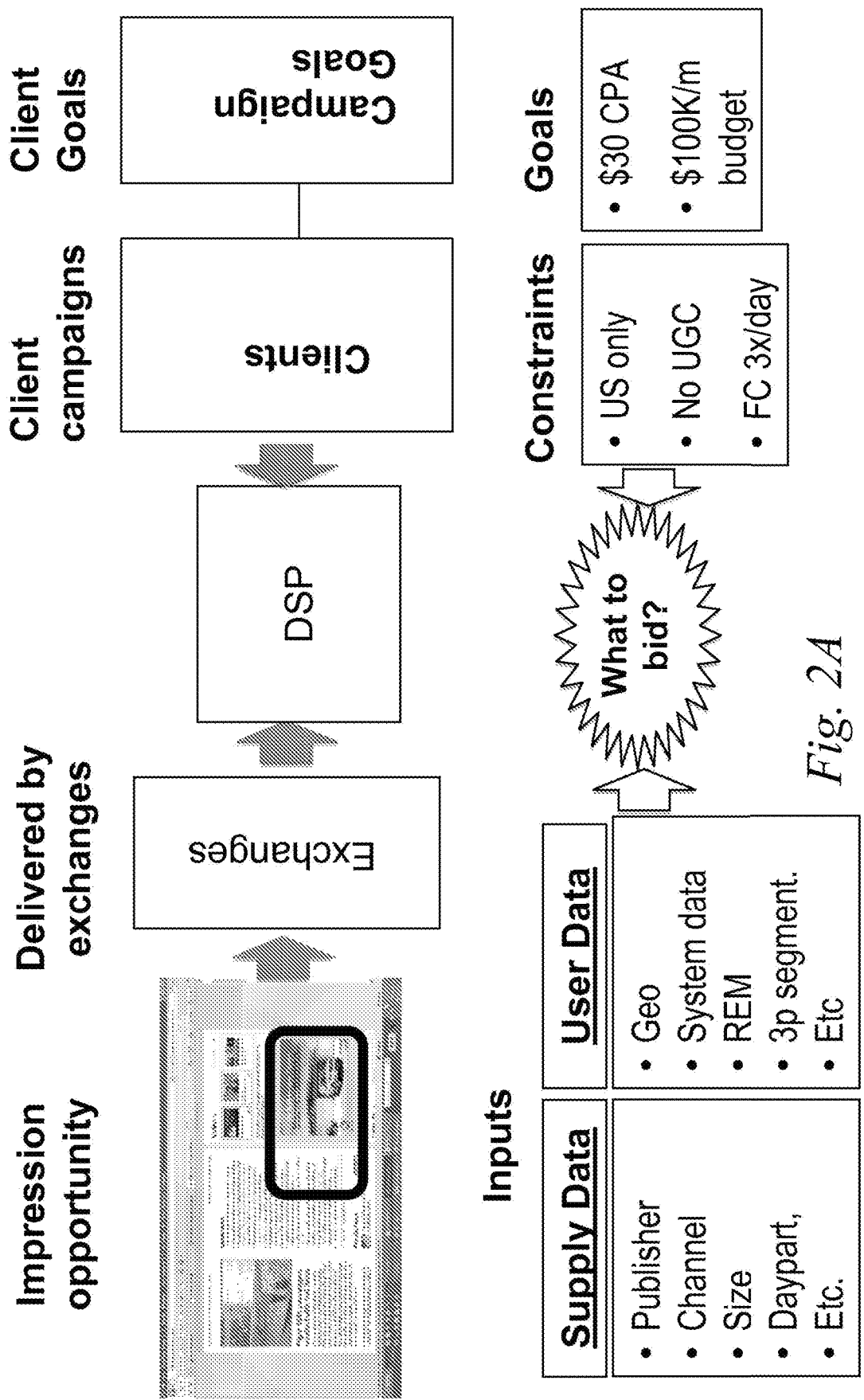
FIGS. 2A-2D are block diagrams depicting embodiments of systems and methods for providing a demand side platform.

Referring now to FIG. 2A, embodiments of a system for a demand side platform which may integrate multiple pools of impression opportunities from multiple ad exchanges for bidding is shown. In brief summary, the system shows one or more impression opportunities available and/or delivered via one or more ad exchanges for bidding by one or more ad agencies. Each ad agency may represent one or more clients. The system further includes a Demand Side Platform (DSP) for interfacing between the one or more ad agencies and the one or more ad exchanges. The DSP determining for the ad agencies and/or the clients which impression opportunity to bid and how to bid based on information provided from the buy side and sell side.

In further details of FIG. 2A, each ad agency may represent one or more clients. Client entities interested in impression opportunities may comprise an individual, company, organization or a groups of individual with shared interests. An ad agency may design and/or implement an ad campaign on behalf of a client. The ad agency may further procure or buy impression opportunities based on the advertising campaign on behalf of the client. In some embodiments, an ad agency and/or one or more clients the agency represents may collectively or individually be referred to as an advertiser. In one of these embodiments, an advertiser includes an ad agency and a client the agency represents. A client may be an advertiser that directly uses the DSP to procure impression opportunities, e.g., without using an ad agency. In some embodiments, an ad agency may use a DSP to concurrently and/or independently run ad campaigns for one or more clients. In some embodiments, an ad exchange may interface with an advertiser via a DSP. In other embodiments, an ad exchange may interface directly with an advertiser that uses a DSP to process information provided by the ad exchange.

A DSP may be implemented in hardware or a combination of hardware and software. The DSP may be built and/or configured for supporting or providing impression opportunity analyses and/or transactions. In some embodiments, a DSP is built and configured for providing buy side services for impression opportunities. A DSP may provide automation for impression opportunity workflow (e.g., designing ad campaigns and applying these to multiple ad exchanges), supply integration (e.g., interfacing with multiple ad exchanges and other supply partners to normalize pools of impression opportunity for analysis and bidding), and insight and analytics (e.g., quantitative analysis in determining outgoing bids and reviewing performance).

The DSP may include any module, script, program, agent, state machine, component or set of executable instructions executing on one or more machines or servers 106. The DSP technology stack may incorporate open source and/or commercial code platforms, including but not limited to: Flex/Catalysts (e.g., implemented in the DSP user interface and middleware in some embodiments), Perl (e.g., implemented in the application layer and business logic in some embodiments), C/C++ (e.g., implemented in the bidding module and/or brain engine in some embodiments), Netezza/PostGreSQL (e.g., implemented in DSP data warehousing or data marts in some embodiments). These code platforms, as implemented in the DSP system, can support agile and interactive development of the system. In some embodiments, the DSP includes a self-monitoring and/or self-healing framework. The DSP may include application programming interfaces (APIs) into some or all subsystems of the DSP.

The one or more machines or servers 106 providing the DSP may include one or more server farms 38, for example incorporating features of server farms 38 described above in connection with FIG. 1A. The DSP hardware may interface with other network components via any type or form of communication protocol, including standard, proprietary and custom protocols. The DSP may have components operating at one or more layers of the network stack, such as the transport layer. The DSP may operate as an intermediary, logically and/or physically, between one or more ad exchanges and one or more advertisers (e.g., ad agencies).

In certain embodiments, a DSP may be referred as a demand side service. In some embodiments, the DSP may include one or more services, subsystems, modules and/or applications hosted by a provider and/or an advertiser. For example and in one embodiment, the DSP may include a service or application engine hosted on one or more servers of the advertiser and/or a third party. The third party may be a server farm or hardware provider and/or service provider. The DSP may include a service, module and/or application dedicated for an advertiser, e.g., to interface that advertiser with one or more ad exchanges. For example and in one embodiment, a DSP may include services, applications and/or hardware leased and/or owned by an advertiser. In some embodiments, an ad exchange may provide a DSP or some features of a DSP to an advertiser, e.g., for ad campaign planning Any of the systems and/or features associated with a DSP may be provided to advertisers and/or ad exchanges for a fee, e.g., on a per use basis (e.g., online access), for an access/lease period (e.g., software license), and/or for purchase (e.g., custom or configured hardware).

The DSP may provide an advertiser access to a plurality of impression opportunities provided via different providers (e.g., publishers). The plurality of impression opportunities may include one or more pools of impression opportunities. For example and in one embodiment, a pool of impression opportunities may include impression opportunities from a publisher, a group of publishers, an ad exchange, and/or an ad network. In some embodiments, a pool of impression opportunities comprises impression opportunities across discrete and disparate supply sources. Certain ad networks and/or ad exchanges may control, distribute, offer, administer or otherwise manage one or more pools of impression opportunities. In some embodiments, certain impression opportunities or pools of impression opportunities may only be available via a specific ad network or ad exchange. The DSP may function as an interface between a plurality of impression opportunity providers (or sellers) and an advertiser (buyer). The DSP may offer a single interface, point of access, and/or relationship to a buyer, e.g., to simplify transactions and/or analyses associated with a plurality of sellers. In some embodiments, the pools of impression opportunities may correspond to different types or categories of impression opportunities, e.g., impression opportunities associated with a segment, channel, particular type of website or premium level, mouse-over vs. page-embedded impression opportunities, etc.

The DSP may process or analyze information associated with various impression opportunities and normalize these into metrics for comparison against goals set by advertisers. The DSP may normalize the information across impression opportunities, pools of impression opportunities, and/or ad exchanges. In some embodiments, the DSP may statistically and/or intelligently process or analyze the information to help an advertiser customize, determine or develop an advertising campaign based on the advertiser's goals. The DSP may dynamically update the metrics to help an advertiser adjust or implement advertising campaigns based on the goals. For example, the DSP may determine (e.g., via an impression calculator and/or a bidding module of the DSP) an estimate of daily impression opportunities across the plurality of impression opportunity providers to identify an appropriate advertising campaign strategy. The methods and systems described herein may use the normalized metrics to bid for impression opportunities, e.g., according to the advertising campaigns developed.

In some embodiments, a DSP may provide services to one or more advertisers in parallel, in sequence, on demand or otherwise. For example and in one embodiment, a single DSP may perform analysis and/or transactions for one or more advertisers concurrently and/or sequentially. An analysis may include any type or form of data processing, such as any statistical, algorithmic or other intelligent computation, profiling and/or prediction of impression opportunity information that may be useful in the formulation of ad strategy, campaign and/or bidding across one or more ad exchanges. A transaction may include any type or form of operation associated with bidding, trading, and/or procuring impression opportunities. Each analysis and/or transaction may be independent of another analysis and/or transaction of the same or different advertiser. For example, in some embodiments, an analysis may account for one or more transactions taking place at the same time. In certain embodiments, a transaction may affect or compete with another transaction. A transaction may be assigned a different priority and/or be configured relative to another transaction, e.g., to potentially effect a certain result or a different result. In one embodiment, such as between transactions of a same advertiser, a transaction (e.g., impression opportunity bid) may be processed to optimize or improve the chances or outcome of another transaction. In another embodiment, such as between transactions of different advertisers and/or ad campaigns, a transaction may be processed blindly, fairly and/or independently of another transaction.

In some embodiments, a plurality of DSPs may operate in parallel. In some embodiments, the plurality of DSP supporting different advertisers. A transaction may affect or compete with another transaction from another advertiser or DSP. In certain embodiments, an advertiser may operate a plurality of DSPs in parallel, either using the same ad campaigns or using different ad campaigns. For example and in one embodiment, an advertiser may be evaluating one DSP against another, or comparing one ad campaign against another. A different DSP may help the same advertiser (e.g., ad agency and/or client) develop a different ad campaign. A different DSP may provide the same advertiser access to different ad exchanges and/or information.

As a single interface across a plurality of ad exchanges, a DSP can receive and process any type or form of information supplied via the ad exchanges. For example, and as depicted in the embodiment shown in FIG. 2G, each ad exchange and/or publisher may supply different types of information, similar information in a different format, data structure or granularity, using different communication protocols or standards, and at different time instances or intervals. In some embodiments, the information provided via some ad exchanges may conform at least in part to some standards. In certain embodiments, the information provided by an ad exchange may be specific to the ad exchange's custom or semi-custom interface. The availability and type of information provided via ad exchanges may vary, e.g., from publisher to publisher. In some embodiments, an ad exchange may process and/or convey information from different publishers differently. Some ad exchanges and/or publishers may provide support for requesting or querying different types or granularity of data. Information provided via ad exchanges may include supply data with respect to impression opportunities, and user data.

User data may include any type or form of data related to a user of a webpage, website, web session and/or web application. Such user information may include geolocation or geographical (sometimes generally referred to as "geo") information, system data, remarketing information, and third-party segment information. Geo information may include information including but not limited to information related to the user network, internet protocol (IP) address, access point (e.g., wifi hotspot), geographical location and mobile tracking, and demographic and other geographical information system (GIS) data linked to the user location. System data may include any user information stored or tracked by the publisher or network, including but not limited to user preferences, browsing and transaction history, and user device information. Some of these information may be tracked by cookies and/or Adware.

Third-party segment information may include information identifying specific audience segments with certain online shopping habits. A number of companies, such as BlueKai, Exelate and Axciom, may provide such insights into the in-market shopping profiles of advertisers site audiences. Third-party segment information may include information related to a conversion (e.g., pattern of user behavior and/or advertising characteristics leading to a newsletter sign-up, registration, transaction, etc) as well as behavioral targeting data sourced or bought from ad networks. Advertisers can use pre-existing segments or use the information provided to create custom audience segments, identify matching impression opportunities and reach prospects.

Remarketing information may include information including but not limited to information related to tracking a user after the user has left a publisher's site with a goal of driving the user back to a client's site to complete an action or transaction. Remarketing information may identify user or user attributes indicating past or potential success in remarketing efforts. In addition to the above, user data may include "IXI" data that provides measures of user wealth, income, spending, credit, investment stele, share-of-wallet and share-of-market.

Supply data may include any type or form of data related to impression opportunities. Supply data may include information related to, but not limited to the network, publisher, channel, ad size and daypart. Network data may include information including but not limited to information related to the size, characteristics and audience reach of an ad network associated with an impression opportunity. Publisher data may include information including but not limited to information related to the content and web traffic of a publisher or website offering an impression opportunity. Publisher data may include an identifier of the publisher and/or website. Ad size may indicate the size of the impression opportunity using any type or form of measure, e.g., digital image dimensions by pixels, such as 300×250. Daypart information specifies portions of the days during which the impression opportunity is offered, e.g., 12 pm-6 pm, 6 pm-9 pm, primetime, morning segment, late night, etc. Weekpart information may specify between weekend and weekday. Other time-specific parts may be provided or defined.

Channel data may include information including but not limited to information related to the type and reach of a media channel associated with an impression opportunity. A channel may be a category of media content targeting a specific audience. For example, channels may include categories such as news, finance, women, men, etc. In some embodiments, a channel may be a media type, for example, rich media, in-stream video, search, banner, text links, e-mail spam, opt-in e-mail advertising, other trackable media. Media type channels may also include podcasts, mobile device content and RSS feeds.

A DSP can receive a variety of sell-side information received via ad exchanges and normalize the information for a buyer or advertiser. The DSP may have custom interfaces for communicating with each ad exchange, e.g., as depicted in the embodiment shown in FIG. 2G. Each custom interface may include standard and/or custom modules for receiving portions of information from the corresponding ad exchange. Each custom interface may support the appropriate communication protocol conversion or translation. Each custom interface may include filters for removing redundant and/or unsupported data received from an ad exchange or other third party providers (e.g., BlueKai). Each custom interface may include any type or form of extract, translate and load (ETL) capabilities to create a set of data or parameters in normalized, standard or generic (hereafter generally referred to as "normalized") form for the corresponding ad exchange. The normalized set of parameters may include one or more of geo, system, REM, third-party segment, IXI, publisher (ID), channel, ad size, weekpart and daypart data pertaining to an impression opportunity.

Figure 2B:
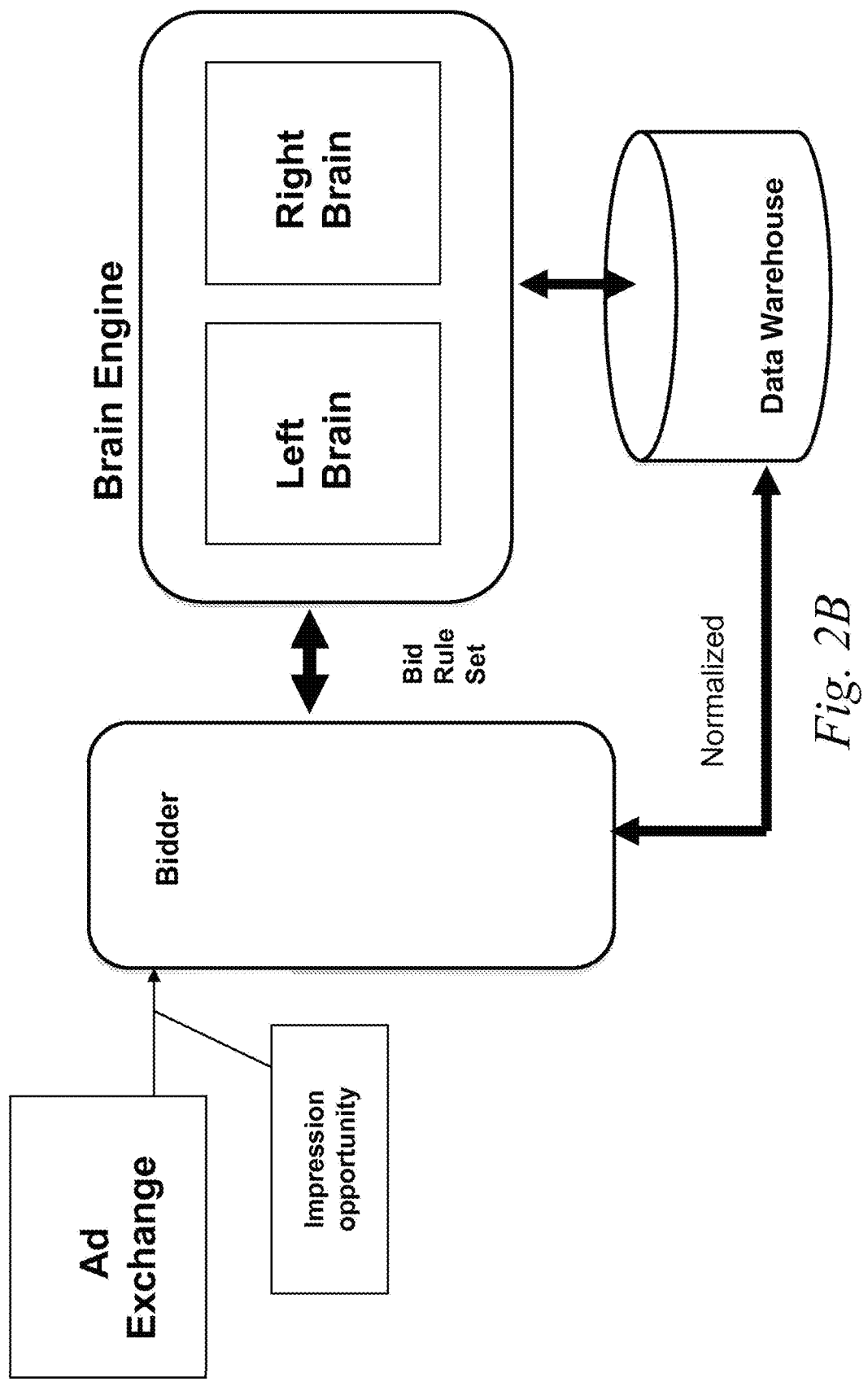

Referring now to FIG. 2B and in some embodiments, each set of sell-side information received by a DSP may be associated with an impression opportunity. In other embodiments, each set of sell-side information received by a DSP is associated with a pool of impression opportunities, a publisher, an ad network, or an ad exchange. In some embodiments, the DSP includes at least one bidding engine or module (e.g., a MathBid module) for initiating bids to any of the ad exchanges, ad networks, supply partners and/or publishers. A bidding engine or module is sometimes referred to as a bidder. A DSP may include any number of high performance bidding modules. In some embodiments, the DSP bidding modules can operate at 500,000 queries per second. A bidding module may be configured to bid on every impression opportunity or on selected impression opportunities. A bidding module may bid on one or more impression opportunities for placement of an advertisement. A bidding module may be configured to bid one or more times on an impression opportunity based on the corresponding impression opportunity provider's response to the bid. A bidding module may be configured to bid one or more times on an impression opportunity to try to achieve a successful bid.

Figure 2C:
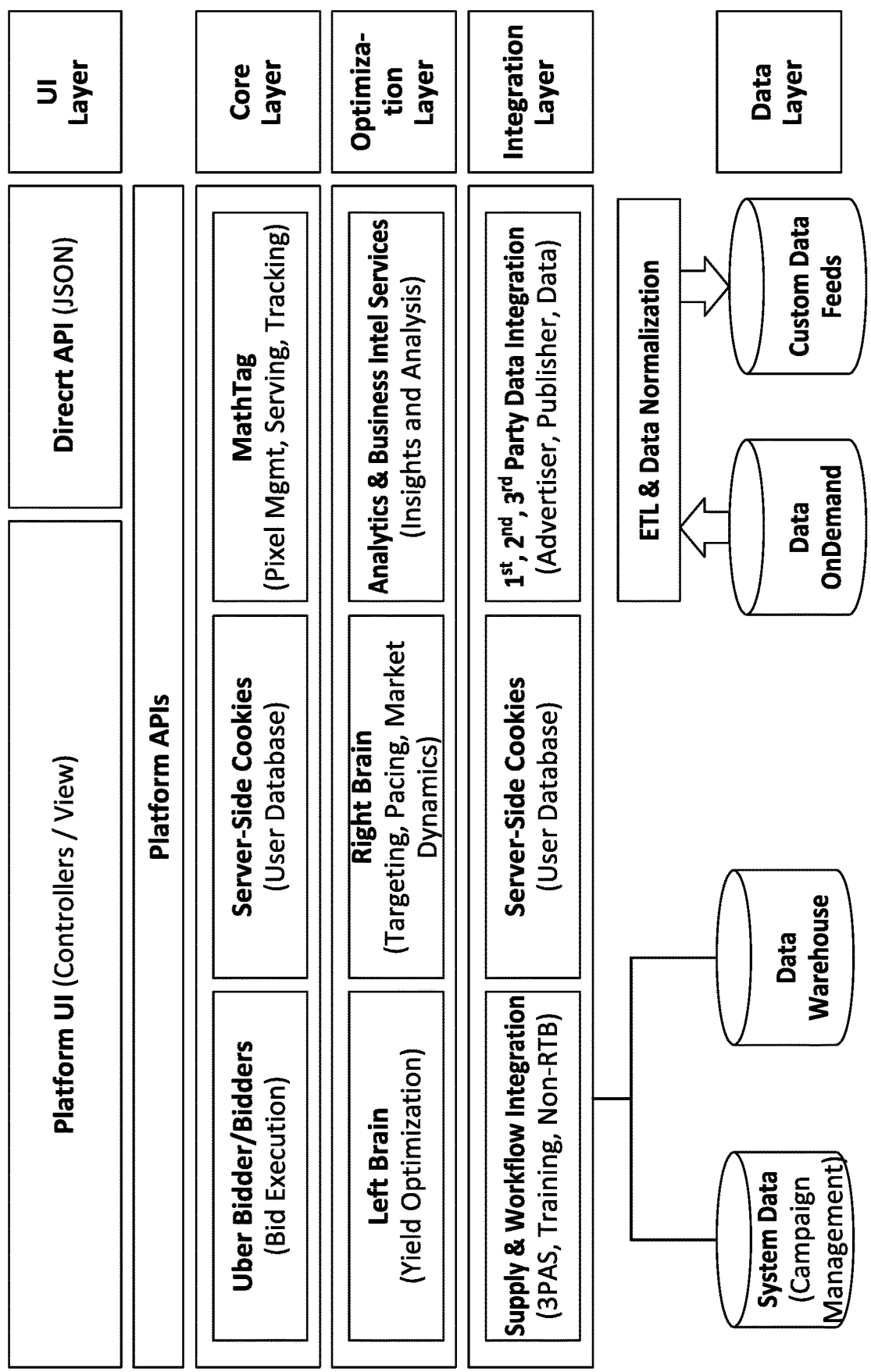
Figure 2D:
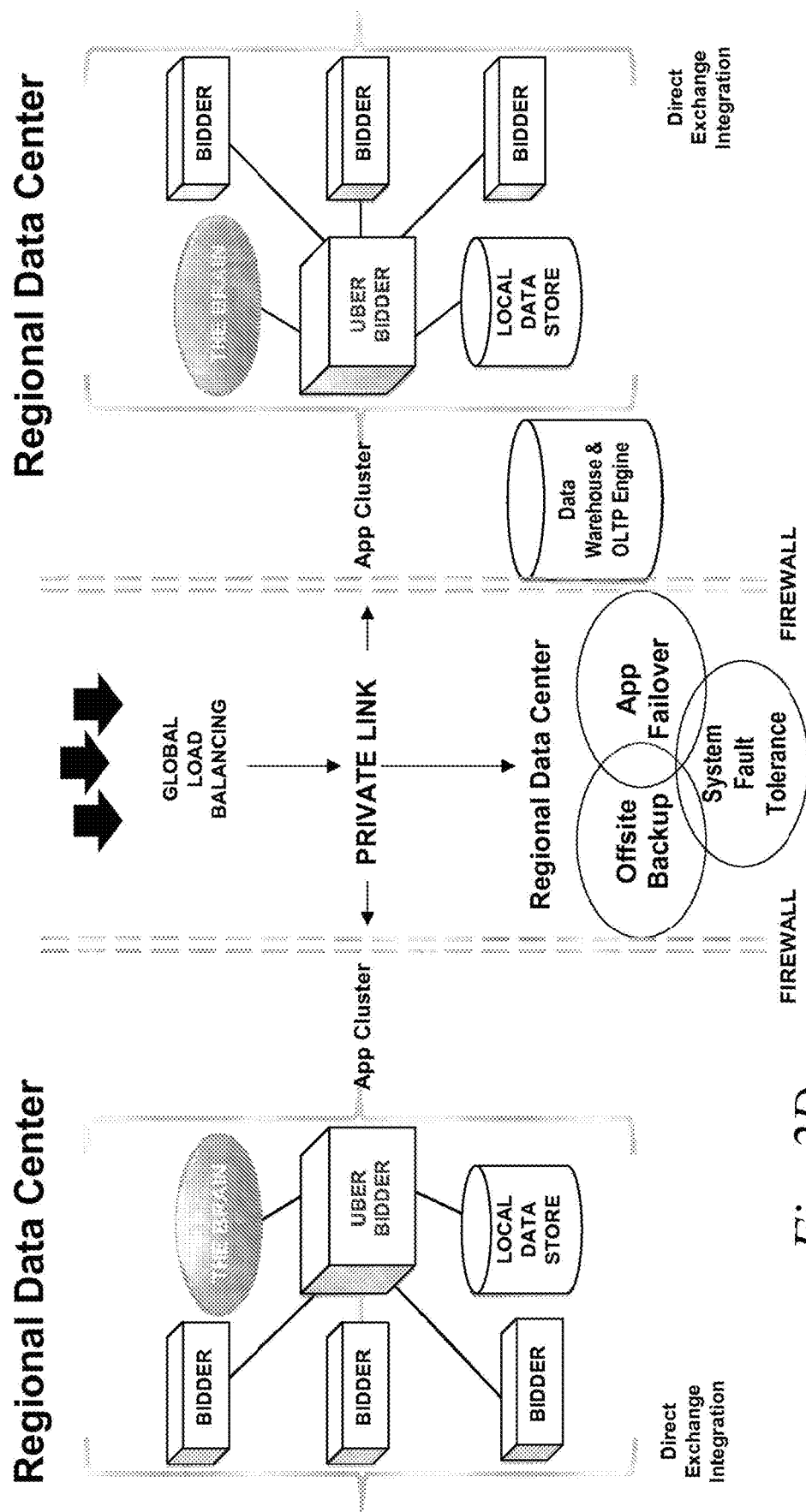

In certain embodiments, a bidding module may include or incorporate the one or more custom interfaces described above. The bidding module may receive sets of sell-side information via the custom interfaces. The bidding module(s) may integrate all supply sources across real time, different APIs and bid sheet environments. The custom interfaces may normalize each set of sell side information into sets of data that can be processed by the bidding module and/or a brain engine of the DSP. The normalized sets of data may be stored in a data warehouse in some embodiments. The bidding modules may include a uber or master bidder, e.g., as depicted in FIGS. 2C and 2D. The master bidder may execute on brain engine instructions and/or generated rule sets. The master bidder may load balance bids across one or more of the other biding modules (sometimes generally referred to as "bidders"). The brain engine may constantly update the bidders (e.g., via the master bidder) as statistically significant variables are recognized and/or pockets of performing media or impression opportunities are unlocked.

The data warehouse may include a database management module for logging, tracking and managing the normalized sets of data. The database management module may be implemented in hardware or a combination of hardware and software. The database management module may be built and configured for storing, retrieving, organizing and managing impression opportunity-related information, including normalized sets of data or parameters. In some embodiments, the database management module is built and configured for efficient and/or fast storing, retrieving, organizing and managing impression opportunity-related information. The database management module may include any module, script, program, agent, component or set of executable instructions executing on one or more machines or servers 106.

The data warehouse may include one or more storage devices, incorporating features from embodiments of storage devices 128, 122, 140 described above in connection with FIGS. 1B and 1C. Moreover, the data warehouse may include data structures for storing and organizing the sets of normalized data. In certain embodiments, the data warehouse includes or operates with a reporting module for processing routine reporting or requests for information. In some embodiments, the DSP system includes a massively parallel data warehouse, e.g., for processing high levels of impression opportunity transactions and/or analysis. In one embodiment, the DSP data warehouse has a capacity of 20 TB or more. The DSP data warehouse may be built or configured to support massive data sets for reporting, optimization and insights. The DSP data warehouse may be built or configured to integrate with third-party systems and/or other data warehouses.

Referring to FIG. 2C, one embodiment of a platform architecture for the DSP system is shown. In brief summary, the DSP system includes an interface layer, a core layer, an optimization layer, an integration layer and a data layer. The data layer may include the DSP data warehouse discussed above. Bidding modules are depicted as the uber bidder and bidders in the core layer. The core layers may also include a cookies module and a MathTag module. The cookie module may generate and/or provide cookies to generate user data. The cookie module may communicate with server-side cookies to receive user data. The MathTag module may provide functionality for managing pixels and/or tracking code. The MathTag module may provide functionality for serving and/or tracking pixels or REM segment users.

The DSP integration layer may include a number of modules, including but not limited to Supply and Workflow Integration (SWI), creative management and data integration. In some embodiments, the SWI module processes and/or integrates supply data (from impression opportunity sellers such as ad exchanges). The SWI module may also process and/or integrate workflow data. These data can include third-party analytics data, trafficking data and non-real-time-bidding (non-RTB) data. These data may include system data, such as campaign management data. The SWI module may interface with the DSP data warehouse to retrieve data for processing and/or store data processed by the SWI module. The DSP integration layer may include a creative management module for storing, creating, updating, organizing, or otherwise managing creatives. The creative management module may manage a library of creatives.

The data integration module may process and/or integrate any type or form of data from first, second and/or third parties, such as an advertiser (e.g., ad agency and/or client), a publisher, an ad exchange, ad network, third-parties like BlueKai, etc. The data integration module may comprise, interoperate or interface with the one or more custom interfaces described above and in connection with FIG. 2G. The data integration module may operate with a ETL module to extract and normalize data from various sources. The data integration module may provide specific data on demand In some embodiments, the data integration module may provide custom data feeds to requestors. One or more of the integration layer modules may operate with each other and/or with the DSP data warehouse to provide data for use in the optimization layer and/or provide data requested by any requestor.

The DSP may include a brain engine for performing operations based on any portion of the data discussed above. In some embodiments, the brain engine may perform operations using data collected or generated by the core layer. The brain engine may be implemented in hardware or a combination of hardware and software. The brain engine module may include any module, script, program, agent, component or set of executable instructions executing on one or more machines or servers 106. The brain engine may be built and configured for quickly processing massive data sets, applying machine learning against that data and deploying learnt real-time data into bidders. The brain engine may be implemented in the optimization layer of the DSP system.

The brain engine may include one or more processors, e.g., executing in parallel or substantially in parallel. In some embodiments, the brain engine includes a plurality of processing cores. In some embodiments, the brain engine includes distributed processing (e.g., across multiple server farms). The capability for parallel processing can for example, support multi-scenario analysis in modeling a bidding process. In some embodiments, the brain engine incorporates cloud computing features. In some embodiments, the DSP platform includes a distributed brain engine or a plurality of brain engines. The DSP platform may include a plurality of brain engines that can operate in a coordinated or collaborative fashion. In other embodiments, the DSP platform may include a plurality of brain engines that can operate independently.

In one embodiment, the brain engine includes a left brain component for performing yield optimization (e.g., bidding success, competitive bid prices, REM success, low CPM, etc). In some embodiments, the left brain component can determine the Fair Market Value (FMV) of impressions based on variables obtained via requests (e.g. HTTP) to supply partners and/or from third party data. In some embodiments, the left brain component can determine FMV (fair market value) based on the data of past bidding and campaign performance and operational data stores in the data warehouse. The brain engine may includes a right brain component for handling operations such as targeting (e.g., targeting segments, channels, dayparts), pacing (e.g., controlling spend rate with respect to bidding) and market dynamics (e.g., updating bid rules according to bid results and/or market information). In some embodiments, the right brain component can adjust FMV bids based on targeting, pacing and/or market dynamics.

In some embodiments, the brain engine may be built and configured for one or more of: (i) retrieving appropriate sets of normalized data from the data warehouse and/or the bidding module, (ii) comparing and ranking impression opportunities based on the sets of normalized data, (iii) grouping impression opportunities, e.g., based on the comparison and/or ranking, (iv) generating one or more rules for bidding on impression opportunities, (v) generating an initial bidding prediction based on the one or more rules and/or sets of normalized data, (vi) adapts the one or more rules based on bidding results, and (vii) optimizes the one or more rules. The brain engine may generate an initial set of bidding rules for the bidding module to bid for impression opportunities. In some embodiments, the bidding module executes one or more initial bids without using any bidding rules. The bidding module may forward or summarize bidding results to the brain engine for developing and/or refining bidding rules. In some embodiments, the brain engine exports a rule set optimized according to bidding results. The brain engine may export or provide the rule set to the bidding module. In certain embodiments, the brain engine dynamically updates the bidding rules based on new bidding results. The brain engine may dynamically update bidding rules for an ad campaign to the bidding module. The brain engine may, in some embodiments, export an updated rule set to the bidding module based on one or more of: an export schedule, a change or substantial change in the bidding rules, a change in the corresponding ad campaign, or some other triggering event.

Referring again to FIG. 2A, the brain engine generates bidding rules for an online ad campaign based in part on constraints and/or goals provided by an advertiser. In some embodiments, a client or advertiser provides one or more goals for an ad campaign. Goals may include a budget cap or target for an effective cost per Action (eCPA or CPA). An eCPA may be used as a measure of the effectiveness of impression opportunities procured by the advertiser. For example, an ad campaign may involve multiple bids over a plurality of impression opportunities. To determine the eCPA, the bid price for successful bids may be summed over a period of time and divided by the number of desired user actions (e.g., a form submission or purchase) linked to an advertisement successfully bid. The larger the number of desired user actions, the more successful the ad campaign is as the eCPA lowered. Ad campaign goals may also specify the budget for the ad campaign over a period of time. Budget spending for an ad campaign may be capped at $100,000 per month for bidding on impression opportunities. Therefore bidding may be paced (e.g., by the DSP) so that the budget is not exceeded.

Goals may also be set based at least in part on bidding success rate, conversion rate for remarketing efforts, rate of user actions, number of actions from unique users, and click through rate (CTR—which can be a way of measuring the success of an online ad campaign, obtained by dividing the number of users who clicked on an ad on a web page by the number of impression delivered). Such goals may also be set to target certain preferred websites, demographics, dayparts, etc. For example, in one embodiment, a campaign goal or objective may be to increase online order volume at or below a target eCPA. In another embodiment, campaign goals or objectives include attracting a more engaged audience as measured by CTR while maintaining a fixed cost per click through (CPC). In another embodiment, campaign goals or objectives may include achieving aggressive order volume targets at or above a return on investment (ROI) hurdle. An advertiser may define any type or form of constraints for an ad campaign. For example and in various embodiments, constraints may limit the ad campaign to certain geographical regions, such as the US only. In one embodiment, only user actions (such as registrations) completed by users residing in the US are desired. The ad campaign may prefer websites hosted in the US and/or targeting a US audience. Some advertisers may require exclusion of impression opportunities offered with user generated content (UGC). UGC, sometimes also known as consumer generated media (CGM), may refer to any online material, such as blogs and online comments, created by non-media professionals. In certain embodiments, advertisers may specific a frequency limit on the number of bids per time period. An advertiser may also limit the number of campaign flights over a time period, such as three flights per day. A flight may refer to a period of time in which a defined bid price, daily spend goal and frequency cap are defined. An ad campaign may specify one or more flights, and the bid prices, daily spend goals and frequencies at which a specific set of ads are served during these flights.

Based at least in part on the goals and/or constraints, an advertiser may define or design an ad campaign. The DSP can provide a simple and intuitive interface to help advertisers develop and/or run an ad campaign. The DSP may provide an interface for the advertiser to specify, define, compose, develop, test, refine, modify and/or design an ad campaign, for example, as depicted in FIG. 2G. The DSP may provide an interface for the advertiser to manually and/or automatically bid on an impression opportunity. In some embodiments, the DSP system provides this interface in the user interface (UI) layer. The interface provides access to and presentation of any of the functionality and services of the DSP. An advertiser may use the interface to select or specify ad exchanges for inclusion in the ad campaign. An advertiser may specify the goals and/or constraints for any ad campaign via the interface. In addition, an advertiser may access any information provided by the ad exchanges and/or publishers via the interface. These information may be processed (e.g., reformatted, organized, analyzed, normalized, etc) and may be presented in a way that is more user friendly and/or easily understood.

The interface may be any type or form of interface, such as a graphical user interface (GUI) and/or a command line interface. The interface may be a web interface or an application/software interface. Portions of the interface and interface content may be provided by a locally-executing application (e.g., software program) on a client machine 102. Portions of the interface and interface content may be remotely transmitted from a server 106 to a client machine 102 for presentation (e.g., on a browser executing on the client machine 102). The interface may include any number of widgets. A widget may comprise any one or more elements of a user interface which may be actionable or changeable by the user and/or which may convey information or content. Interface widgets may comprise any type and form of executable instructions that may be executable in one or more environments. Each widget may be designed and constructed to execute or operate in association with an application and/or within a web-page displayed by a browser. One or more widgets may operate together to form any element of the interface, such as a dashboard.

In some embodiments, using any type and form of web browser such as Mozilla Firefox, Safari, Konqueror, Opera, Flock, Internet Explorer, Epiphany, K-Meleon and AOL Explorer, an advertiser can create an account and access DSP services remotely. In certain embodiments, an advertiser may access DSP services locally and/or remotely via an application executing on a device operated by the advertiser. The advertiser can compose their ad campaign using digital content stored on the machine the advertiser is operating or by accessing a remote storage location. Since DSP components may be distributed across networks, each component may communicate with another component using any type and form of interface, protocol, inter or intra process communications, messaging, etc. In some embodiments, the interface communicates with a DSP Server using JavaScript Object Notation, (JSON) format, e.g., as specified in RFC 4627. For example and in one embodiment, the DSP system may include a direct application programming interface (API) to support JSON or other formats. In some embodiments, Hypertext Transfer Protocol (HTTP) and/or Hypertext Transfer Protocol Secure (HTTPS) may be used as the communications protocol.

DSP services, including web services, may be accessed through the provided interface via any type and form of web browsers and/or applications that can connect to a network. In certain embodiments, DSP services are provided via a website or portal for online access. In some embodiments, Secure Sockets Layer (SSL) cryptographic protocol or Transport Layer Security (TLS) protocol is used by the DSP platform, portal or website to provide secure communications with web browsers and application. Any type and form of security mechanisms and/or protocols may be used to provide a secure session or connection with the DSP platform, portal, service or website. Embodiments of the systems described herein may include any type or form of high speed connection with the DSP platform, portal or website, such as one or more T1 lines and/or higher bandwidth lines.

In some embodiments, the interface facilitates creation of online display ad campaigns. By way of illustration and not intended to be limiting in any way, the following description shows how an advertiser may create a REM online display campaign using the interface. In connection with the ad campaign, goal-based optimization, marketing options based on core plans, and/or the ability to target or buy audiences may be provided as part of DSP services. The advertiser can use the interface to perform any of: (i) create a new REM campaign for an existing advertiser, or select from a list of pre-existing campaigns (e.g., under the Campaign Settings section of the interface), (ii) configure start/end date, price, spend and frequency (e.g., under the Campaign Settings section of the interface), (iii) select a pixel to use in a REM target segment campaign (e.g., under the Pixels section of the interface), (iv) enter an ad tag creative to be used in the campaign (e.g., under the Creatives section of the interface), and (vii) launch the REM campaign. A creative, as referenced above, may represent online ads that are referenced via ad tags. These online ads may be used to remarket to users.

In some embodiments, a pixel, as referenced above, is an image that is placed on an advertiser's page or pages and used to target a REM segment. In some embodiments, a pixel is a unique tracking element which is used to serve ads to a visitor when they are on other web sites. The pixel can be of any size, such as 1×1. The pixel may represent, include or incorporate any type or form of script or program code. The script or program code may be activated when the pixel and/or the host webpage is loaded onto a browser or device. This pixel may install a tracking device on a consumer's device used to visit the advertiser's page or website. REM may target known consumers who have taken a specific action at a site as they travel to other sites across the internet. A successful REM may reach these consumers by serving them compelling ads based on their previous actions.

In certain embodiments, the DSP interface is designed to allow an advertiser to enter any type or form data as it becomes available to the advertiser. The interface may include a dashboard that provides a listing of ad campaigns in the DSP system associated with an advertiser. The dashboard may indicate the status of each campaign dynamically in real-time or with updates at defined instants. In some embodiments, an advertiser can perform any of the following from the Dashboard: adding a new campaign, editing an existing campaign, launching a campaign or stopping a campaign that is currently running Campaigns may be listed in chronological order (e.g., newest to oldest), or in any order. In some embodiments, the interface can display any type or form of campaign data, such as □Campaign Name, Advertiser, □Campaign Type, Start/End Date, Status (e.g., Not Ready to Launch, Ready to Launch, Scheduled Pause, Manual Pause, Running, Completed, etc). The interface may also include Action Buttons or widgets for performing specific actions (e.g., Edit Campaign, Launch Campaign and Pause Campaign).

The display can present additional details of any listed campaigns, e.g., upon user demand. For example and in one embodiment, a user may view additional details regarding the status of steps required to create a launch-ready Campaign. In certain embodiments, the interface includes three sections for defining or configuring an ad campaign: Campaign Settings, Pixels and Creative. In one embodiments, a campaign is ready for launching when these three sections are complete. An advertiser may create a new campaign in the Campaign Settings section. To edit a campaign, a user may select the campaign and identify the section(s) for editing. In some embodiments, a campaign is editable if the campaign's status is "Not Ready to Launch" or is paused (e.g., manually or through scheduling). In one embodiment, a user can manually pause a campaign that has already launched (e.g., performing impression opportunity monitoring and/or bidding) via the dashboard (e.g., a "Pause Campaign" Action Button). After making edits, an advertiser can launch an edited campaign (e.g., via a "Launch Campaign" Action Button). In some embodiments, a Launch Confirmation screen allows a user to review some of the settings before launching a campaign.

In some embodiment, once a campaign is launched, the corresponding status may be "Running" or "Scheduled Pause" (e.g., if the start date is in the future). A campaign will continue until (i) the campaign is manually paused by a user, (ii) the campaign is scheduled to pause by placement of a gap between flight dates, or (iii) the campaign has completed one or more flights, or its run of flights.

A user may include any type and form of configuration setting for a campaign via the interface. In some embodiments, a user (e.g., from an a agency) may identify a client (e.g., from a plurality of clients) for which the user is creating a campaign. The user may specify or select the type of campaign (e.g., REM, prospecting) to create or launch. The user may specify or select a third-party ad server (e.g., Atlas and DART for Advertisers (DFA), SPAS), e.g., as depicted in FIG. 2G. The user may also specify or select one or more of: the advertiser site, targeted unique visitor count (e.g., per month), spending goals (e.g., daily spend goals), targeted segment (e.g., defined by third-party analytics such as Exelate and Axciom), types of completed actions, types of impression opportunity, types of published content, channels, day parts, week parts, ad size preferences, bid range and targets.

A user may include any type and form of configuration setting for a flight via the interface. For example, a user can specify the start and end dates/times for a campaign flight. A user can create multiple or additional flights via the interface. A user can extend a campaign or test different bid prices, daily spends and frequency caps against each other. Any type or form of flight details can be presented on demand via the interface, e.g., responsive to a mouse-over, presenting a visual reference of a flight. Any of the specifications or settings described herein may be entered into data structure for evaluation, verification, calculation or checks. For example and in one embodiment, price, daily spend and frequency goals and/or caps for a flight may be entered into a budget matrix of the interface. Specifications classified as a goal (e.g., daily spend goal) is specified as a target to the DSP and may not be guaranteed. Specifications classified as a range, limit, floor or cap may be guaranteed.

In some cases, an ad agency may represent a client. The ad agency may have a CPM price agreement with the client for an ad campaign. The ad agency may specify this CPM (or Advertiser IO Price) via the DPS interface, for example to determine or calculate the maximum bid for the ad campaign. A user may specify a bid price via the interface. The range of the bid price may be determined or capped by the Advertiser IO Price. In some embodiments, the DPS may calculate a Daily Estimated Available Impressions (e.g., At Cost) using an algorithm that approximates the total pool of available number impressions. The DPS may comprise or communicate with an impression calculator that determines an estimate of daily impression opportunities available across one or more providers. In certain embodiments, the Daily Estimated Available Impressions (DEAI) represents the total possible impressions, e.g., at the set price and frequency cap. In other embodiments, the DEAI represents the number of estimated impressions at the set price and frequency cap. The DPS may calculate the DEAI based on the number of monthly unique users to the Advertiser Site. By way of illustration, the DPS may determine the flight spending by multiplying Daily Spend Goal by the number of days in the flight. The DPS may determine the campaign budget based on the flight spending of flights in the campaign.

An advertiser may specify a frequency cap for serving the advertiser's ads. The advertiser may have an option of choosing how often ads are served per number of Hours, Days, or other time period. An advertiser may specify or choose to have the ads served ASAP, evenly distributed, according to other distribution profiles or via the DSP's recommended or optimized settings. An advertiser can save any portion of the settings or specifications disclosed herein at any point of time.

An advertiser may select or create any type or form of REM targeting segment pixel for a campaign. The advertiser may add one or more ads for the campaign. Each ad may be referenced by an ad tag. Each ad may be served from an ad server which may be specified via the interface. In some embodiments, some ads may be uploaded into the DPS via the interface. In certain embodiments, ads may be designed, customized and/or modified via the DPS interface. An advertiser can specify one or more ad sizes. In some embodiments, standard ad sizes may be specified or automatically configured. In one embodiment, the DPS may automatically resize and/or crop an ad to match an ad size offered by an impression opportunity.

In some embodiments, the brain engine of the DSP processes some or all of the data provided via the UI, core and/or integration layers. The brain engine may use any of these data for campaign creation, trafficking management, yield management and/or generating analytics. In some embodiments, trafficking refers to running campaigns by sending ad tags to publishers and/or ad exchanges. Yield management may refer to analysis or evaluation of campaigns to obtain measures of online advertising success. Online advertising success may be measured in any one or a combination of cost, budget-management, user actions or conversions, increased audience awareness of advertiser products and/or services, bidding success rate and/or efficiency, order volume and revenue. Online advertising success may incorporate metrics such as CPM, CPI, CPC, CTR, CPA, ROI, cost per lead or registration (CPL) and cost per sale (CPS).

The DSP system may be designed and built for scalability. Some estimates have reported that over thirteen billion impression opportunities may be available per day. Accordingly, the DSP system can operate to analyze and/or handle transactions for large volumes of impression opportunities efficiently and effectively. In addition, the DPS can interface with any number or type of ad exchanges and/or ad networks, including but not limited to RightMedia, Google AdX, AdECN, Adsdaq, Adbrite, Valueclick, Admeld, SpotXchange, AdNexus, AdBidcentral, Traffiq, OpenX, BidPlace, Facebook, Pubmatic and Yahoo APT. In some embodiments, the systems and methods described herein can source for new ad exchanges and/or ad networks online (hereafter sometimes referred to as "supply partners"), and incorporate new interfaces for these or adapt existing interfaces for reuse on these supply partners. The DSP platform can interface with biddable media sources of any level of sophistication, including but not limited to real-time bidding, API based platforms, and UI/bidsheet interfaces.

In various embodiments, the DSP platform can handle one or more bidding transactions (or bids) within short periods of time (e.g., 30 ms). During a short period of time, the DSP platform can communicate or submit one or more bids for an advertiser to one or more impression opportunities for the placement of an advertisement. These periods of time may be dependent on, or relative to network latency and/or load times for a page or image (e.g., on a web page). In some embodiments, the DSP platform includes direct connections to some or all supply sources, which can enable low bid latency. For example and in one embodiment, a user action may trigger loading of a web page having an impression opportunity. In another embodiment, a user action may trigger loading of an application interface having an impression opportunity. In some embodiments, the impression opportunity is offered for bidding (e.g., via one or more ad exchanges) responsive to the user action. In other embodiments, the impression opportunity is preemptively offered for bidding prior to a user action or schedule action. During any portion of the time from offer of the impression opportunity until the complete loading of the page or interface, a DSP may perform any of the impression opportunity analysis, determination of whether to bid, bidding rule adjustments, actual bidding, delivery of ad to publisher, payment of a successful bid, etc. The DSP may consider the impression opportunity in connection with one or more other impression opportunities to determine which impression opportunities to bid on at any instant of time and/or at what bid prices. For an impression opportunity that is offered via multiple ad exchanges, the DSP may also determine the ad exchange(s) to submit a bid to.

The DSP, including the brain engine, may incorporate any standard, proprietary and/or custom algorithms and/or software for executing on hardware from the DSP provider, advertisers and/or DSP partners. The algorithms and/or software may incorporate any type or form of predictive modeling, simulation methods, and computational techniques, e.g., from physics, statistics, game theory, and algorithmic securities trading. The algorithms and/or software integrated in the DSP platform may be refined or tuned via any number of real-world or simulated campaigns.

The DSP, via the interface and/or brain engine, may operate across any number of exchanges, accounting for differences in available data sets, variable naming, and bid types (CPM, CPC, etc). The DSP, via the interface and/or brain engine, may incorporate any number and/or type of variables, including third-party data (e.g., from Exelate service). The DSP may identify any important groupings within those variables. The DSP, via the brain engine, may recognize and account for interactions between variables (e.g., Monday impressions perform poorly, but Monday in News channel works well except for dialup connections). The DSP, via the brain engine, may adaptively adjust bidding rules based on interactions between variables.

The DSP, via the brain engine, may optimize bidding operations towards any definable or measurable buyer goal (e.g., click count, orders, post-order activity, ROI, etc). The DSP, via the brain engine, may auto-update predictions and/or bidding rules as more data becomes available. The DSP, via the brain engine, may determine and implement competitive bidding, e.g., by adjusting bids according to recent bidding results and parameters. The brain engine may continually or dynamically re-test predictions and/or rule sets to ensure ongoing accuracy of predictions, competitive bidding prices, consistency with advertiser goals and/or constraints. In some embodiments, the brain engine can identify anomalous activity, e.g., via profiling impression opportunity transactions and/or user actions. Based on the anomalous activity, the brain engine may adjust the bidding process or rule set, the DSP's interaction with any ad exchange or publisher, or any other aspect of the ad campaign.

By way of illustration and not intended to be limiting in any way, the brain engine of the DSP system can generate estimates for metrics such as CPM for different categories of impression opportunities. For example, pools of impression opportunities may be integrated and normalized into a single pool of impression opportunity supply. In some embodiments, the brain engine predicts the impression pool size for a particular day or other time period through analysis of available data. Based on this pool, the estimated CPM may be $1.37, for example. This pool may be further divided into impression opportunities suitable for REM (e.g., 4% of all impression opportunities, CPM=$5.53) and prospecting (e.g., 96% of all impression opportunities, CPM=$1.20). The prospecting impression opportunities may be further classified according to segments (e.g., 5% from BlueKai segment at $2.24, 7% from Exelate segment at $2.17, etc). Each segment may be further classified into channels (e.g., 8% from news at $1.14, 11% from women at $1.31, etc). Each channel may be further classified into dayparts (e.g., 13% from the 12 pm-6 pm slot at $0.86). In some embodiments, the REM impression opportunities may be further classified according to ad size (e.g., 2% are 728×90 ads at a CPM of $2.24), and further classified according to weekpart (e.g., 1% of impression opportunities applies to weekend at a CPM of $4.90). Based on this impression opportunity pool analysis, the DSP system can help an advertiser tailor a campaign and/or match demand (e.g., for specific inventory types) with the available supply of impression opportunities.

In some embodiments, the DSP platform can provide comprehensive reporting capabilities. Reporting capabilities includes support for internal clients (e.g., DSP administrators and developers) as well as external client (e.g., ad agencies). Reporting may be provided via the DSP interface and/or delivered directly to a requestor, e.g., via email. Reporting capabilities include operational reporting as well as any type or form of insight and analytics. In some embodiments, operational reporting includes any type or form of statistics, logs, records, summaries and/or alerts pertaining to the operation of the DSP system, running of a campaign, execution of a flight and/or status of a bid. Insights and analytics may include any type or form of information or data processed or derived from operational data, supply partners, third-party sources and/or advertisers.

The DSP platform can provide real-time analytics, e.g., via a feedback loop in which the brain engine constantly updates bidding modules as statistically significant variables are discovered and/or pockets of performing media are unlocked.

A business intelligence (BI) suite may provide insights and analytics capabilities. A BI suite may provide an external presentation layer as part of the DSP reporting capabilities. For example and in one embodiment, the BI suite may provide insight and analytics to ad agencies using the DSP platform. A BI suite may apply analysis and intelligence on data inputs incorporated from various sources and applications. A BI suite may provide a range of features such as interactive dashboards, proactive intelligence delivery and alerts, ad hoc queries and analysis, operational and volume reporting, online analytical processing (OLAP) analysis and presentation, dynamic predictive intelligence, disconnected analytics, unified metadata processing and ETL from any data source.

In some embodiments, the DSP can provide site or audience analysis as part of its insight and analytics capabilities. In various embodiments, the DSP's BI, insight and analytics capabilities may be implemented in the optimization layer. In some embodiments, the DSP's insight and analytics capabilities can estimate, determine and/or recommend optimal frequencies (e.g., of flights, bidding), rank responsive of regions or target segments, identify the relative success of ad channels and/or publishers (e.g., with respect to order volume and/or user actions), and characterize or classify conversions. In certain embodiments, the DSP can provide analysis pertaining to creatives. For example and in some embodiments, the DSP can profile or summarize the attributes of creatives applied in ad campaigns. The DSP may determine which creative concepts are driving performance in terms of sales and/or different types of user actions.

In certain embodiments, the DSP can provide attribution and segmentation analysis. This may include determining an optimal timelag window for attribution, bidding, presenting an ad, executing flights, or running a campaign. The DSP may determine the economics (e.g., ROI, CPM, etc) at an ideal timelag window. The DSP brain engine may determine the characteristics and/or profiles of conversion segments. The DSP brain engine may attribute success of certain metrics to particular segments, channels, ad flights, campaigns, etc. In some embodiments, the DSP can forecast spending levels. For example and in some embodiments, the DSP can predict what CPA (or other metric) can be achieved according to certain budget levels. The brain engine of the DSP can adjust or scale the forecasts based on changes in different budgeting aspects.

In some embodiments, the DSP system provides distributed processing for its subsystem components. FIG. 2D depicts one embodiment of this distributed DSP platform. In certain embodiments, a plurality of data centers may house brain engines, pixel management technology, bidding modules, data warehouses, offsite backup, system fault tolerance support, application failover clusters, etc. Some data centers or server farms 38 may include an application cluster comprising a brain engine, an uber bidder, bidders, a local data store or warehouse. Client requests, including ad campaign creation, requests for reports, campaign execution and campaign simulation, may be distributed via global load balancing (e.g., via a central server) to one or more data centers for processing.

Some of the DSP data centers or application clusters may be connected by private transit interconnects or links. Some of the DSP data centers or application clusters may be secure by firewalls. In some embodiments, the DSP platform includes direct links to major peering points, e.g., peer and internet exchange (PAIX), New York International Internet Exchange (NYIIX), etc. Some of all of the DSP distributed system may be monitored via a distributed or central Network Operations Center. In some embodiments, the distributed DSP platform provides fault tolerant operation and/or failover. The distributed DSP platform may provide dynamic, real-time scalability. The distributed DSP platform can be customized ore reconfigured to meet evolving needs. In various embodiments, the distributed DSP platform can provide high system availability and/or high system performance.

Figure 2E:
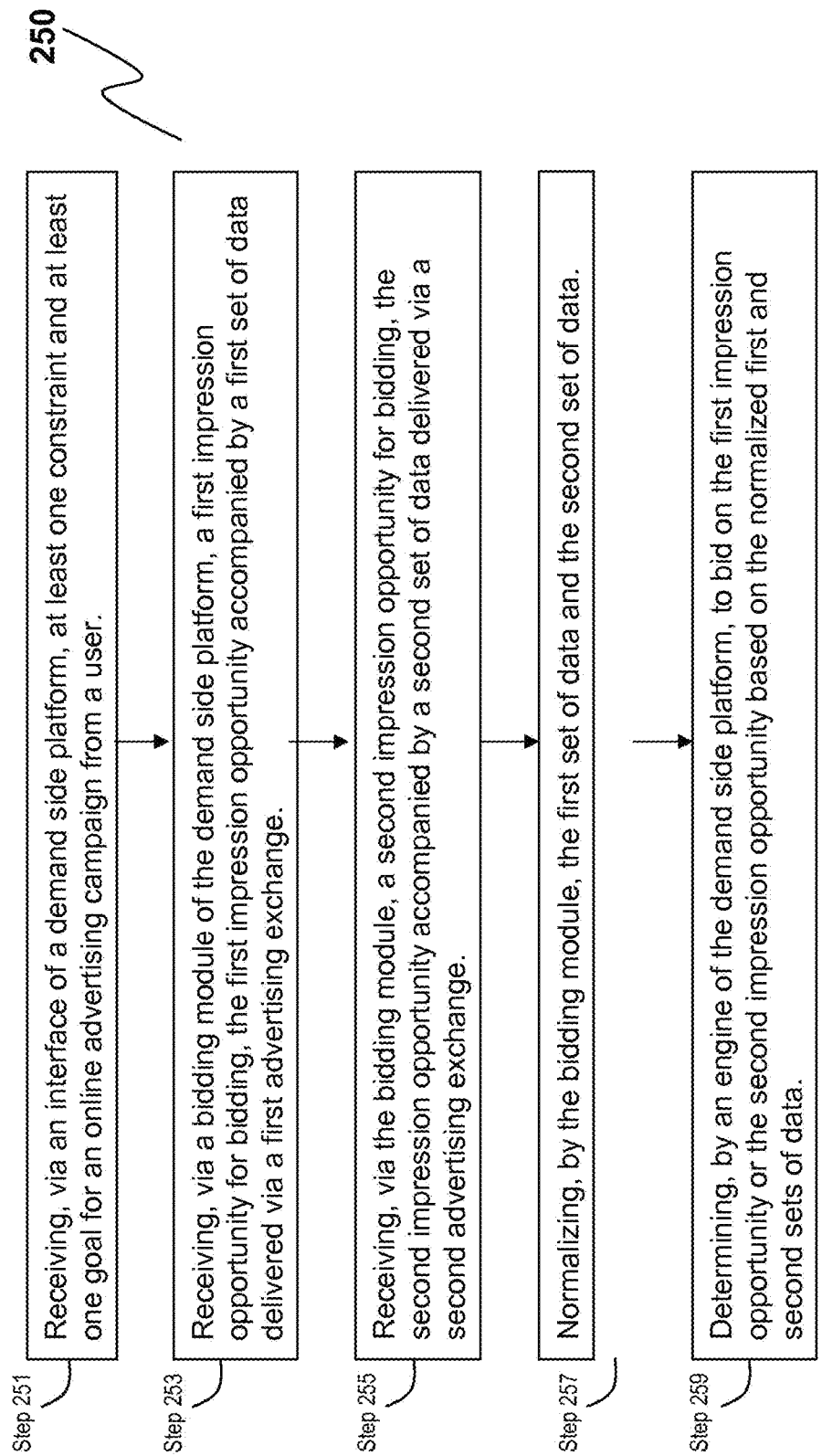
FIG. 2E is a flow diagram depicting an embodiment of a method for integrating multiple pools of impression opportunities from multiple advertising exchanges for bidding by advertisers.

Referring now to FIG. 2E, a flow diagram depicts embodiments of steps taken in a method 250 for integrating multiple pools of impression opportunities from multiple advertising exchanges for bidding by advertisers. The method includes receiving, via an interface of a demand side platform (DSP), at least one constraint and at least one goal for an online advertising campaign from a user (251). A bidding module of the demand side platform receives a first impression opportunity for bidding, the first impression opportunity accompanied by a first set of data delivered via a first advertising exchange (253). The bidding module receives a second impression opportunity for bidding, the second impression opportunity accompanied by a second set of data delivered via a second advertising exchange (255). The bidding module normalizes the first set of data and the second set of data (257). An engine of the demand side platform determines to bid on the first impression opportunity or the second impression opportunity based on the normalized first and second sets of data (259).

Referring now to FIG. 2E, and in greater detail, the method includes receiving, via an interface of a DSP, at least one constraint and at least one goal for an online advertising campaign from a user (step 251). In some embodiments, a user (e.g., of an ad agency), enters or otherwise inputs at least one constraint and goal for an ad campaign via an interface provided by the DSP. These constraints and/or goals may incorporate features of the constraints and/or goals discussed above in connection with FIGS. 2A and 2B.

The user may enter additional information with respect to the campaign, such as parameters or settings of any type or form described above in connection with FIGS. 2A-2C. For example, the user may specify the advertiser or client for the campaign. The user may specify any one or more of: the type of campaign, the advertiser site, targeted unique visitor count, spending goals, targeted segment, types of completed actions, types of impression opportunity, types of published content, channels, day parts, week parts, ad size preferences, bid range and targets. The user may include any type and form of configuration setting for a flight, such as the start and end dates/times. The user may specify a frequency cap and/or profile for serving the advertiser's ads. The user may select or create a REM pixel and/or ads for the campaign.

The user may enter any of these information, constraint(s) and/or goal(s) using a form, script and/or command line submission. The user may provide any of these information and/or selection via a web or application interface. In some embodiments, the user may request the DSP to recommend at least one constraint, goal, setting and/or parameter for the campaign. The DSP may determine a recommendation of a constraint, goal, setting and/or parameter based at least in part on other information provided by the user, available in the DSP warehouse and/or from third-party sources. The DSP may calculate estimates for metrics such as campaign budget, based at least in part on other information provided by the user, available in the DSP warehouse and/or from third-party sources. In some embodiments, the DSP may predict a measure of success for the campaign based in part on estimated impression opportunity availability and/or past statistics.

In further details of 253, a bidding module of the DSP receives an impression opportunity for bidding. The impression opportunity is accompanied by a set of data delivered via an advertising exchange. The bidding module may receive a set of data specific to the ad exchange. The bidding module may receive the set of data associated with or describing the impression opportunity. The bidding module may receive the impression opportunity in real-time as the impression opportunity is about to be presented to a user. The bidding module may receive the impression opportunity before a user can cause it to be presented to the user.

In further details of 255, the bidding module receives another impression opportunity for bidding. This impression opportunity is accompanied by a another set of data delivered via another advertising exchange. This set of data may be specific to the corresponding ad exchange. The bidding module may recognize or determine that this set of data is presented or organized differently from the earlier set of data. The bidding module may recognize or determine that this set of data includes more (or less) information than the earlier set of data. In some embodiments, the bidding module determines that this impression opportunity is the same as the other impression opportunity, although the accompanying data sets may differ in some aspects.

In further details of 257, the bidding module normalizes the two sets of data. The bidding module may apply any type or form of ETL, filtering, protocol translation, data integration, mapping, reformatting or other processing techniques to normalize the two sets of data. The bidding module may compare the types of data between the two sets of data in determining how to perform the normalization. The bidding module may request for additional data for each set of data from the corresponding ad exchange and/or retrieve additional data from a data warehouse of the DSP.

In further details of 259, an engine of the demand side platform determines to bid on one of the first impression opportunities based on the normalized sets of data. The engine may process one or more of the constraints, goals, parameters, settings and/or normalized sets of data to determine whether to bid on either impression opportunities. The engine may generate an initial set of one or more rules from one or more of the constraints, goals, parameters, settings and/or normalized sets of data to determine whether to bid on either impression opportunities. The engine may determine to whether to bid on either impression opportunities based on the initial set of rules. The engine may predict an outcome for a bid. The engine may determine what price to use for a bid. In some embodiments, the engine determines not to bid. In other embodiments, the engine determines to bid on one or both of the impression opportunities.

In some embodiments, the engine submits a bid to one of the impression opportunities. The DSP may deliver a REM pixel and/or ad for the impression opportunities. If the bid is accepted, the DSP may process payment for the bid. In some embodiments, the outcome of the bid is updated into the DSP's data warehouse. The DSP may adjust or change the initial rule set based on the outcome of the bid.

Figure 2F:
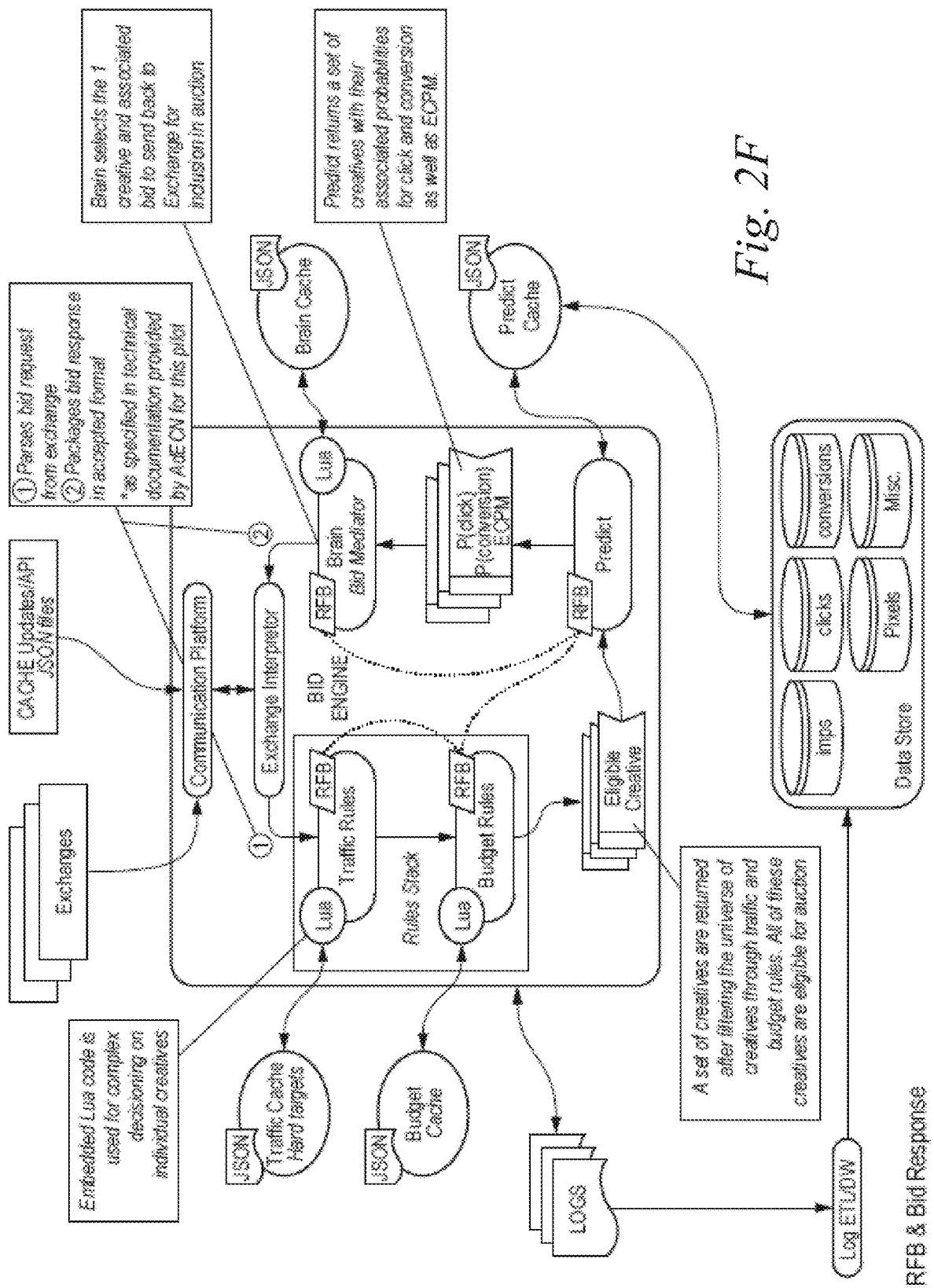
FIG. 2F is a block diagram depicting an embodiment of a transaction environment for providing a normalized interface to a plurality of exchanges.
Figure 2G:
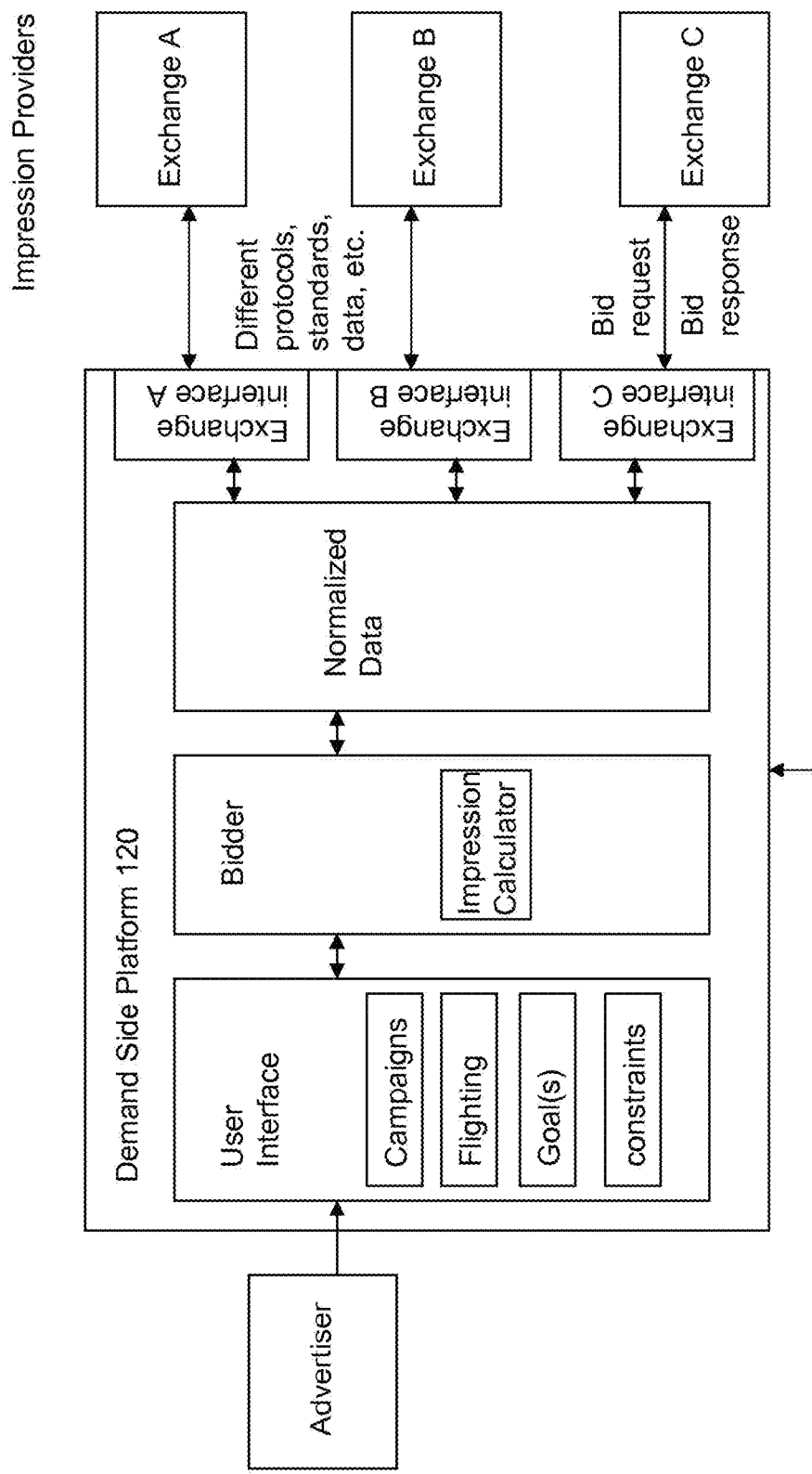
FIG. 2G is a block diagram depicting an embodiment of a system for matching, by a demand side platform, an advertisement with an impression of a plurality of impressions available across a plurality of impression opportunity providers.

Referring now to FIG. 2F, embodiments of analysis and normalization of data and interfaces across a plurality of disparate and different supply sources, referred to as cross-exchange integration and normalization, is depicted. FIG. 2F depicts, in one of the embodiments, a transaction system and environment for cross-exchange interfacing and bidding.

In brief overview of FIG. 2F, an embodiment of the transactional bid environment is depicted. The transaction bid environment includes a connection manager, exchange interpreter, decisioning/decisioner, predictor, brain engine and transaction level data aggregation and reporting, Each of the above modules may comprise any type and form of executable instructions executing on any one or more computing devices.

The connection manager comprises logic, functions and operations for initiating and maintaining connections and communications to each of the disparate and discrete exchanges. The connection manager may be designed and constructed to communicate and interface to each exchange based on the technology, API, protocols and command and data communications specific to each exchange.

The exchange interpreter comprises logic, functions and operations for normalizing the input and output data and information from each of the exchanges. The exchange interpreter identifies and maps the input and output data from the exchanges to a common, single interface and data set to be used by the demand side platform and/or bid transaction system. In some embodiments, the exchange interpreter includes the ETL features to normalize and load the exchange inputs (bid requests) and bid environment outputs (bid response).

The decisioning or decision module comprises logic, functions and operations for identifying creatives or forms of advertisements available for auction based on bid request, traffic rules and budget rules. The traffic rules may comprise any type and form of policies or rules for deciding on bidding based on the publisher, user, location, geo data, network information of the traffic and any other information about the source of the advertisement to the destination of delivery of the advertisement. The budget rules may comprise any type and form of policies or rules for deciding on bidding based on any constraints or goals of the campaign, including budget and flighting.

The predict module may comprise logic, functions and operations to calculate, identify and/or present the probability of click and conversion for a set of creatives. The brain engine generates the bid based on decisioning, prediction and campaign metadata. The transactional environment provides one or more reporting modules that provide performance and operation metrics, information and data on any level of granularity from transaction level to campaign level to exchange level. Each reporting module may provide performance and operation metrics, information and data on any aggregation of agency, campaigns, transactions, exchanges including cross-transaction, cross-campaign and cross-exchange information. The reporting module may provide performance and operation metrics, information and data on any of the traffic and budget rules and the performance and operation of any of the modules, including bidder, predictor and decisioning modules.

Referring now to FIG. 2G, an embodiment of a DSP 120 is depicted. In brief overview, the DSP may include an interface for requestors to request campaigns be executed for bidding via the bidder on impression opportunities provided by a plurality of impression opportunity providers, sometimes referred to as exchanges. Each of the different exchanges may have different data formats, protocols and parameters used by the exchange interface for bidding, such as different data formats, protocols and parameters for a bid request and bid response. The DSP may have a plurality of exchange interfaces that are designed and constructed to interface to or communicate with the interface of each of the plurality of exchanges. The DSP may include a normalizer to provide a normalized set of data from the plurality of different data and data formats provided by the different exchanges. The bidder may use the normalized set of data for bid requests and bid responses communicated with an exchange. The bidder may operate responsive to a campaign set up via an interface that allows a requestor to setup campaign goals and constraints. Using a single interface to setup and request execution of a campaign, the bidder may execute the campaign to trade or match a plurality of advertisement placements to a plurality of impressions across a plurality of different exchanges.

In further details, each of the exchange interfaces may comprise any type and form of executable instructions that are designed and constructed to interface to, communicate with and/or transact with a predetermined exchange and the interface provided by such an exchange. Each exchange interface may be designed and constructed to use formats, data, parameters and protocols recognized and used by the exchange, such as any of those depicted in FIGS. 2Ha-Hb and 2I described below. Each exchange interface may be designed and constructed to handle bid requests and bid responses or otherwise perform a bid related transaction with the exchange. Each exchange interface may identify and process data received by the exchange to store to a database for use by the bidder in further bidding determinations. Each exchange interface may store the data sent to and/or received from an exchange to the database in a desired manner for normalization or otherwise to a normalized data storage or structure storing the data. In some cases, a single multi-interface exchange interface may be designed and constructed to interface to and/or communicate and transact with the plurality of exchanges.

Referring to FIGS. 2Ha-Hb and 2I, these diagrams depict the different interfaces of bid requests and responses across a set of example embodiments of exchanges. FIGS. 2Ha-Hb depict generally a set of parameters that may be used in bid requests across a plurality of different exchanges (e.g., Exh A thru Exh N). FIG. 2I depicts generally a set of parameters that may be used in bid responses across a plurality of different exchanges (e.g., Exh A thru Exh N). Each of the exchange interfaces may be designed and constructed to handle the request parameters depicted in FIGS. 2Ha-Hb for bid requests from a corresponding exchange and the response parameters depicted in FIG. 2I for bid responses from the corresponding exchange.

In FIGS. 2Ha-Hb, a table of parameters P1-PN are identified across a plurality of exchanges Ech A-Ech N for bid requests. Each of the exchanges may have an API format or interface, such as a Jason (JSON) interface, HTTP Post interface or an HTTP Get Interface identified in parameter P1 in the table. Some of these API formats may use query string parameters in the Get or Post. Some of these API formats may be text based. Some of these API formats may be XML based. Some of these API formats may use Google protocol buffer. Protocol buffers is Google's language-neutral, platform-neutral, extensible mechanism for serializing structured data, similar to XML. One define how the data is to be structured once, then special generated source code is used to write and read the structured data to and from a variety of data streams and using a variety of languages, such Java, C++, or Python. Each of the exchanges pay have an identified, predetermined to expected response time, such as those identified by parameter P2 in the parameter table. In accordance with their identified API format, the exchanges pay receive and/or pass parameters via the request. Each of the exchanges may support some of the same parameters while some exchanges do not support the same parameters. Exchanges supporting the same parameters may use the same or different variable names or id for such parameters. An exchange may support or use other or additional parameters not used by another exchange.

Some of the exchanges may have an identified, predetermined or expected response time, such as those identified by parameter P2 in the parameter table. Each of the exchanges may use a differently named parameter or variable for a request identifier and user identifier, such as those identified in parameters P3 and P4. Each of the exchanges may use the named parameter or variable for a visitor or user's IP address, such as those identified in parameter P6. Each of the exchanges may use various variables for parameters identifying the size of the ad, such as ad width and height identified in parameters P26 and P27. Each of the exchanges may use various variables for browser or user agent identification such as parameter P9. Each of the exchanges may use various variables for identifying the page url for the bid request or impression such as parameter P11.

In some cases, some of the exchanges support a certain set of parameters while others do not. For example, in view of parameter table in FIGS. 2Ha-Hb, not all the exchanges support or have variables for parameters P5, P7, P8, P10, P12-P25, and P28-P31. Some of these parameters include external user identification or id (P5), time zone identification (P6), language identification (P7) and identification of a site URL (P10). Parameters P12-P25 used by some of the exchanges may identify and use different variable for the following: Referrer (of Page URL), Cookie, Category, Publisher, Tagged, Sited, Age (of user), Gender (of user), Country (of user), Region (of user), DMA, City, Antitype (js,html) and AdType. Each of the exchanges may support or use other, additional or optional parameters, such as those identified in parameters PN.

In FIG. 2I, a table of parameters P1-PN are identified across a plurality of exchanges Ech A-Ech N for bid responses. Each of the exchanges may have an API format or interface, such as a Jason (JSON) interface, HTTP Post interface, text interface or an HTTP Get Interface identified in parameter P1 in the table. Some of these API formats may use Google protocol buffer. Each of the exchanges may support or identify variables for the creative such as those identified in parameter P6. Some of the exchanges may have an identified, predetermined or expected response size, such as those identified by parameter P2 in the parameter table. In some cases, some of the exchanges support a certain set of parameters while others do not. For example, in view of parameter table in FIG. 2I, not all the exchanges support or have variables for parameters P3-P5 and P7-P15. Parameters P3-P5 and P7-P15 used by some of the exchanges may identify and use different variable for the following: CPM, Creative, Creative ID, Creative Attribute, Click-thru URL, Request ID, Transaction ID, Brand Type, Notification URL, and Piggyback Cookie.

Referring back to FIGS. 2Ha-Hb, the DSP normalizes the interfaces to each of the plurality of exchanges. As the DSP is aware of and understands the similarities and difference between each of the exchanges, the DSP can normalize these similarities and differences such that a single interface for establishing and executing a campaign across the exchanges. The normalization may occur in multiple ways, such as providing a data abstraction, data interface and/or data structures, such as a unified or normalized data interface, in the DSP that represents the common parameters across the exchanges. When the DSP interfaces with the exchange, the DSP may translate these normalized data structures to the parameters and variable names expected by the specific exchange. For those parameters not common across all the supported exchanges, the DSP may include logic, functions or operations to provide values for those parameters that are appropriate for the transaction when interacting with the exchange. The values for these parameters may be data tracked or managed by the DSP and stored in a DSP database, such as a user database or an exchange related database. Likewise, when receiving responses from the exchange, the DSP may translate the common exchange parameters into the unified or normalized data interface and non-common parameters are tracked and managed by the DSP, such as via a user or exchange database.

By normalizing the data for the exchanges and providing one interface to run a campaign that executes across the plurality of exchanges, the DSP platform provides a cross-exchange system with a single interface to trade demand for impression placement with supply of impression opportunities. From one or more campaigns of an advertiser, a first portion of the demand of the campaign to place advertisements may be traded with or matched to a first set or pool of impression opportunities of a first exchange, a second portion of demand of the campaign to place advertisements may be traded with or matched to a second set or pool of impression opportunities of second exchange, and so on. For example, a first advertisement of the advertiser for a first campaign may be delivered to a first impression opportunity of a first exchange while a second advertisement for the first campaign may be delivered to a second impression opportunity of a second exchange, and so on. As such, a single campaign may be executed across different exchanges and pools of impression opportunities.

An advertiser may run a plurality of campaigns that are executed across the same set or different set of multiple exchanges than previous campaigns of the advertiser or campaigns of other advertisers. As the DSP is a multi-user service or platform that supports a plurality of campaigns executing from the same advertise and different advertisers at the same time, the DSP provides a trading platform of matching a plurality of demand for advertisement placements of a plurality of advertisers to a plurality of pools of impression opportunities across a plurality of exchanges. As such, a plurality of campaigns may be executed across different exchanges and pools of impression opportunities.

One or more campaigns executed across the plurality of exchanges may be established, requested and/or executed via a common, unified or normalized user interface. Although the exchanges have different bid request and response parameters and different API formats and interfaces, the DSP platform provides a common or unified user interface, sometimes referred to a single interface, to the user to provide an efficient and easy input mechanism to setup and run campaigns for these different exchanges. The unified user interface removes these differences in the interface to the exchange so that the user can provide a campaign strategy via the unified interface that works across the exchanges without the user dealing with these differences. In one aspect, the unified user interface allows the user to setup and run a campaign agnostically to the pool of exchanges accessible via the DSP.

A user may establish a campaign and campaign strategy with specified goals and constraints. These goals and constraints are applied by the DSP to execution of the campaign across the plurality of exchanges. Although placements of impressions will be transacted with different exchanges for the campaign, the DSP applies the common or single set of goals and constraints specified for the campaign to the aggregated set of placements for the campaign across the different exchanges. For constraints, the DSP applies the specified constraints to bidding and placement of impressions on an exchange in the terms and format of the interface of the corresponding exchange. For a campaign, the DSP tracks and manages the plurality of bid transactions across the different exchanges. The DSP compares and tracks the campaign results in progress to the campaign goals. The DSP uses these comparisons and tracking as input and/or to adjust the remaining execution of the campaign.

The DSP, such as via bidder, may track statistics regarding number of available impression opportunities across the exchanges, number of bids and/or number of procured impression from the impression opportunities. Based on historical data and trends, the DSP may calculate and provide a daily estimate of a number of impression opportunities available in the aggregate across all available exchanges. Based on historical data and trends, the DSP may calculate and provide a daily estimate of a number of impression opportunities available across each of the exchanges. The DSP may provides an estimated number of impression opportunities for an exchange or aggregate of exchanges for any predetermined time period, such as impression opportunities expected for a week or month. Based on historical data and trends, the DSP may calculate and provide an estimated number of impression procurements over a predetermined time period for each of the exchanges and/or the aggregate of exchanges. Any of the estimated calculation of impression statistics, such as a daily impression calculation, may be published or posted via the user interface or may be queried via an API.

In some embodiments, the DSP calculates or determine a Daily Estimated Available Impressions for a campaign. The daily estimated available impressions is calculated to approximate the total pool of available number impressions, such as those available at the cost specified by a campaign. This may be based on the number of monthly unique users to the Advertiser Site. The Daily Estimated Available Impressions may be the total possible impressions, not the number of estimated impressions at the set price and frequency cap. The daily estimated available impressions may be calculated to approximate the total pool of available number impressions for the goal and constraints specified by the campaign.

Furthermore, the DSP may be configured to report information on operation and performance of the campaign across a plurality of exchanges to one or more Ad Servers identified by a user. As such, the execution of the campaign across exchanges may still be reported to a single identified Ad Server. This provides for a more efficient administrative and single interface point for reporting to an Ad Server the activity from a plurality of campaigns running through the DSP across a plurality of exchanges.

The DSP via the user interface may allow the user to setup campaigns, specify campaign goals and constraints. The DSP may support flighting, which comprises defining the goals and constraints via one or more flight configurations. A flight is period of time in which defined bid price, daily spend goal and frequency cap are defined. In some embodiments, to define a flight, the user enters an Advertiser IO Price. The Advertiser IO Price is the CPM (cost per impression, such as costs of advertising per thousand potential customers reached by a given advertisement) price agreement between your agency and your client advertiser for the remarketing portion of the campaign. This amount may be used to calculate the maximum bid allowed in the Bid Price.

For the flight budget, the user may specify Price, Daily Spend and Frequency cap. Once a Bid Price is specified (the range of which is determined by the Advertiser IO Price specified), the Daily Estimated Available Impressions (At Cost) is calculated using a algorithm that approximates the total pool of available number impressions. This may be based on the number of monthly unique users to the Advertiser Site. The Daily Estimated Available Impressions may be the total possible impressions, not the number of estimated impressions at the set price and frequency cap. The user may specify a desired Daily Spend Goal which should be less than or equal to the Cost of the Daily Estimated Available Imps. Upon specifying a Daily Spend amount, the Flight Spend will be calculated by multiplying Daily Spend Goal by the number of days in the flight. The user may also set a Frequency Cap for the serving of ads. The user may have the option of choosing how often ads are served per number of Hours or Days. Also, the user may specify to have ads served ASAP or evenly throughout the chosen time measure. In some embodiments, the user may specify for the DSP to optimize Frequency Cap. In these embodiments, the DSP determines the frequency at which to increase the chances of meeting the flight spend goals (based on the bid price and daily spend goal). The Campaign Budget may be the sum of chosen Daily Spend of all flights in the campaign.

Figure 2J:
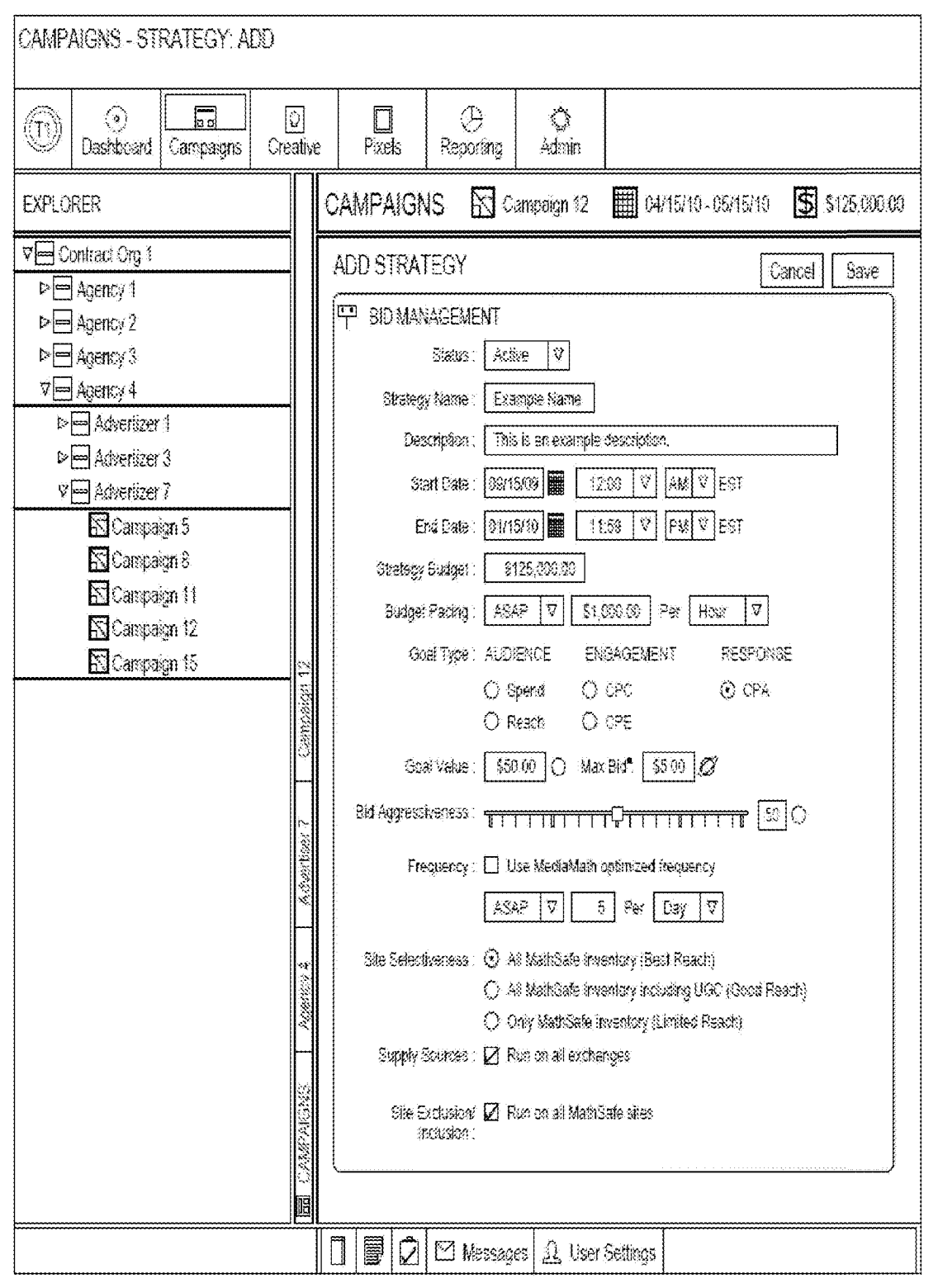

Referring now to FIG. 2J, an embodiment of a unified or common interface for setting up or establishing a campaign with goals and/or constraints to be executed across a plurality of exchanges is depicted. In brief overview, a user may add a campaign and strategy for the campaign via the user interface. The campaign strategy may define campaign goals and constraints for guiding, instructing or otherwise providing directives for bid management to the DSP and the bidder in executing the campaign. A user may specify a campaign strategy name, start and end dates and a budget in dollars for the campaign. The user may specify constraints in terms of budget pacing—how to spend the budget over a predetermined time period (e.g., spend per day). The user may specify a goal type based on audience, engagement or response. The user may specify a goal value for the specified goal type and a maximum bid. The user may specify a bid aggressiveness via a scale from less aggressive to more aggressive. The user may specify a frequency for the campaign such as how many placements per day and when those placements should occur. The user may specify the supply sources or exchanges to use for the campaign. The user may identify what type of sites to run or not run campaigns.

For a campaign, one or more goals may be specified by a user. The goals may include a total budget or spend for the campaign. A type of goal may be one of the following: audience, engagement or response. The audience goal type may be a focus on reaching a certain number or type of audience. For an audience goal type, the goal type may further include a spend or reach goal. A spend type of audience goal may be to spend a certain amount of dollars, such as to spend dollars more effectively when reaching an audience. A spend type of audience goal may be to reach a certain number and/or type of audience via the campaign at the expense of being less effective with campaign dollars. The engagement goal type may be based on the billing mechanism or revenue model for charging for an ad, such as cost per click (CPC) or cost per engagement (CPE) models for determined performance of your campaign. Engagement may be defined when a user response to the ad through the act of experiencing the features of the ad format. The response type goal may be based on a number of responses via the advertisement. A response type goal may include a cost per acquisition (CPA), in which payment is based on leads generated for a site. Based on the goal type selected, the user may further specific a goal value and a maximum hid. The goal value and maximum bid may be based on the type of goal selected, for example, the value of a CPA goal may be the goal value and the advertisement is willing to spend a maximum bid per unit specified by the goal type.

The bid management of the campaign strategy may specify one or more constraints, which may include temporal constraints, frequency bidding constraints, and budget spend and per placement constraints. The bid management may include constraints on sites for placements and/or supply sources (e.g., exchanges) that may be used for bidding or placing ads. The user may specify a constraint of a budget pace in which a predetermined amount of dollars of the total budget may be spent on per hourly, daily, weekly or monthly basis and at certain time during the time period, such as soon as possible during the time period or spread evenly across the time period. The user may specify a constraint of a placement frequency or cap in which a predetermined amount of placements may be placed on a per hourly, daily, weekly or monthly basis and at certain time during the time period, such as soon as possible during the time period or spread evenly across the time period. The user may specify a constraint on which aggressive the bidder should be in placing bids for placement of an ad. The user may specify a constraint on any scale from being least aggressive to most aggressive. The user may specify a constraint of sites in which placements may occur, which may range from user selected sites to DSP selected sites and from less safe sites to more safe sites. The user may specify a constraint of exchanges in which placements may occur, such as only on user selected exchanges to all DSP supported exchanges.

Figure 2K:
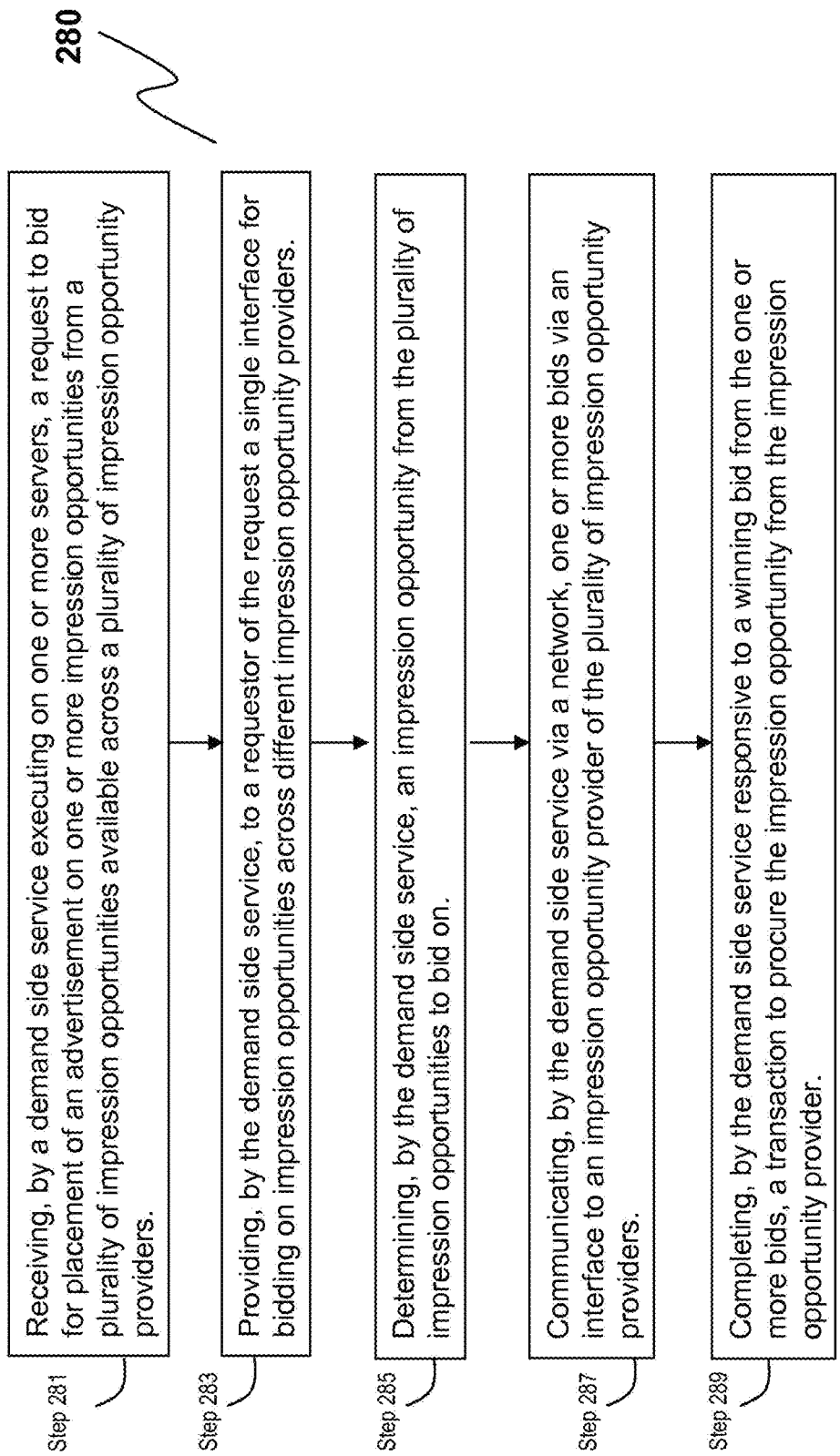
FIG. 2K is a flow diagram depicting an embodiment of a method for matching, by a demand side platform, an advertisement with an impression of a plurality of impressions available across a plurality of impression opportunity providers.

Referring now to FIG. 2K, a flow diagram depicts embodiments of steps taken in a method 280 for matching, by a demand side service, an advertisement with an impression of a plurality of impressions available across a plurality of impression opportunity providers. The method includes receiving, by a demand side service executing on one or more servers, a request to bid for placement of an advertisement on one or more impression opportunities from a plurality of impression opportunities available across a plurality of impression opportunity providers (281). The demand side service provides to a requestor of the request a single interface for bidding on impression opportunities across different impression opportunity providers (283). The demand side service determines an impression opportunity from the plurality of impression opportunities to bid on (285). The demand side service communicates, via a network, one or more bids via an interface to an impression opportunity provider of the plurality of impression opportunity providers (287). The demand side service completes a transaction to procure the impression opportunity from the impression opportunity provider responsive to a winning bid from the one or more bids (289).

Referring now to FIG. 2K, and in greater detail, the method includes receiving, by a demand side service executing on one or more servers, a request to bid for placement of an advertisement on one or more impression opportunities from a plurality of impression opportunities available across a plurality of impression opportunity providers (281). An advertiser or client may configure a bid, or request a bid for placement of an advertisement through the DSP. The advertiser or client may make a request for placement of an advertisement for an ad campaign. The advertiser or client may select or configure an ad campaign via the DSP user interface as described above in connection with FIGS. 2A-2C and 2J As discussed, the advertiser or client may provide one or more goals, constraints, ad pixels and/or ad tag creatives for populating, configuring and launching an ad campaign. Accordingly, the received request may include one or more goals for an ad campaign. The DSP may also receive the request including one or more constraints for placement of the advertisement or execution of the ad campaign The advertiser or client may, in some embodiments, send a request to configure or activate one or more flights for the ad campaign.

The DSP may provide access to impression opportunities from a plurality of impression opportunity providers such as ad exchanges. The advertiser or client may identify, select or place selection constraints on the DSP for selecting impression opportunity providers or placing bids with impression opportunity providers. The DSP may receive the request to bid for placement of an advertisement via an active ad campaign. The DSP may receive the request to bid for placement of an advertisement based on a pre-selected and/or configured flight.

The DSP may receive notification from one or more impression opportunity providers on the availability of one or more impression opportunities. In some embodiments, the DSP receives biddable request from an exchange. The DSP may process and/or convey the availability of the one or more impression opportunities to one or more ad campaigns, e.g., to solicit a request for a bid. In response to the availability of the one or more impression opportunities, a bidder on behalf of an ad campaign may request or issue a bid on at least one of the one or more impression opportunities. In some embodiments or situations, such as when available impression opportunities do not meet the constraint(s) and/or goal(s) of an ad campaign, the bidder may determine not to issue a request to bid. In certain embodiments, the DSP may receive more than one request to bid on an impression opportunity, for example, from multiple ad campaigns or advertisers. The bidder of the DSP may make a plurality of bids on an impression opportunity for a plurality of campaigns.

In further details of 283, the demand side service provides to a requestor of the request a common or unified interface referred to as a single interface for bidding on impression opportunities across multiple impression opportunity providers. The requestor may be an advertiser, client, ad campaign, flight, or a bidding engine operating on behalf of any of these entities. The DSP may provide an interface for configuring an ad campaign and one or more ad flights to access one or more impression opportunity providers. The DSP may provide an interface to an advertiser or client to receive or view any form or type of statistics, analytics, historical records, estimates and/or projections related to impression opportunities, bids and/or conversions. The DSP may provide any of these information via the interface to help an advertiser or client design or select an ad campaign. The DSP may provide any of these information via the interface to help the requestor make a particular bid, or execute a particular bidding strategy. The interface may incorporate any of the interface features described above in connection with FIGS. 2A-2C and 2J.

In some embodiments, the demand side service or DSP provides to a requestor of the request a single interface for bidding on impression opportunities across different data interfaces to the plurality of impression opportunity providers. The DSP may include one or more interfaces to the one or more impression opportunity providers. These interfaces may include one or more custom interfaces and incorporate any of the features described above in connection with FIGS. 2A-2D. In certain embodiments, some of these interfaces communicate with the respective providers using different protocols, standards, data format, and communication frequency (e.g., frequency of impression opportunity updates, bid submission, etc). The DSP may normalize the data received from each provider. The normalization process may incorporate any of the normalization features described above, such as in connection with FIGS. 2A-2G and method 250.

Referring now to 285, the demand side service determines an impression opportunity from the plurality of impression opportunities to bid on. The DSP may determine an impression opportunity to bid on via one or more of the following: a brain engine of the DSP, a bidding engine of the DSP, and an ad campaign. The DSP may determine an impression opportunity to bid on based on one or more of the following: an ad campaign, and the request for placement of the advertisement, historical records (e.g., prior success rate and client preferences). For example, the DSP may determine the impression opportunity to bid on based on a goal and/or constraint of an ad campaign. The DSP may determine an impression opportunity to bid on based on a goal and/or constraint specified by the request. Some of the various types of goals and constraints are described above in connection with FIGS. 2A-2F and 2J. For example, the DSP may select an impression opportunity from the plurality of impression opportunities based on demographics that may be exposed to the impression. The DSP may select an impression opportunity based on one or more of: a specified budget, spend rate, bid frequency, day part, week part, ad campaign progress, and number of available providers. The bidding engine may generate or provide bidding rules which correspond to the goals and/or constraints of a campaign and/or any flights of the campaign. The bidding engine may use these bidding rules in placing bids to exchanges.

The DSP may determine one or more impression opportunities to bid on based on an estimate of daily impression opportunities across the plurality of impression opportunity providers. An impression calculator of the DSP (e.g., residing in the bidding engine) may calculate, aggregate, estimate and/or project the number and types of daily impression opportunities across one or more impression opportunity providers. The DSP may determine whether to bid on an impression opportunity based on the provider of the impression opportunity, the frequency of availability of a type of impression, the total number of available impression opportunities, the type of impression opportunities (e.g., corresponding to a segment, channel, daypart, etc). In certain embodiments, the DSP may bid for an impression via different impression opportunities offered by different providers. The DSP may bid for an impression via one provider but not another provider, for example, based on constraints, historical data and/or client preferences configured in an ad campaign.

In further details of 287, the demand side service communicates one or more bids via an interface to an impression opportunity provider of the plurality of impression opportunity providers. The DSP or service may communicate a bid via a general or custom interface to one or more impression opportunity providers. The DSP may communicate the bid using any form or type of communication protocols. The protocols for communication may be standard, custom or proprietary. In some embodiments, the DSP communicates, via the interface, instructions for generating one or more bids to an intermediary. The intermediary may use the instructions to submit a bid on behalf of the DSP, e.g., in real time, or when an impression opportunity arises. The DSP may use any of the request and response parameters specified in FIGS. 2Ha-Hb and 2I corresponding to particular exchange.

The DSP may configure the communication or bid to address latency issues in the network(s). For example, the DSP may attempt to respond faster to an impression opportunity, compress the communication and/or direct the communication through preferred intermediaries to reduce communications latency. The DSP may address security and/or reliability issues when communicating a bid, for example, by using encryption, establishing a dedicated communications link and/or negotiating a preferred service level with a provider.

In certain embodiments, prior to submitting a bid, a bidding engine of the demand side service determines a price of a bid based on one or more bidding rules. The brain engine of the DSP may provide the one or more bidding rules to the bidding engine based on one or more of: a configuration of an ad campaign and flight. The brain engine of the DSP may generate and/or update the one or more bidding rules based on constraints and goals specified by the client or ad campaign. The brain engine of the DSP may generate and/or update the one or more bidding rules based on historical data, for example past successful bid prices and success rate. The brain engine of the DSP may generate and/or update the one or more bidding rules based on the spend rate, budget, and spending profile over one or more flights. In some embodiments, the bidding engine determines not to submit a bid to an impression opportunity based on any of the factors discussed above.

In some embodiments, the bidding engine matches a bid to a provider based on the impression opportunity selected for bidding. The bidding engine may match a bid to a specific interface provided for an impression opportunity provider, based on the impression opportunity selected for bidding. The bidding engine may direct a bid to an interface with the matching provider. In some embodiments, a routing agent of the DSP communicates a bid to the DSP interface of a matching provider.

A provider receiving a bid may respond to a bid, indicating whether the bid was successful. The provider may provide additional information about a failed bid, for example, the bid price of the winning bid. The provider may provide additional information about a winning bid, for example, transaction fees, the location of the impression relative to a webpage, and information about the layout of the webpage hosting the impression. The bidding engine may monitor the interface to each provider for a response to a submitted bid. The interface may convey the bid response to the bidding engine. In response to a failed bid, the brain engine may update the one or more rules provided to the bidding engine. The bidding engine may determine whether to submit another bid, if the target impression opportunity is not already won. The bidding engine may determine a new price for a follow-up bid to the same impression opportunity. The bidding engine may submit and monitor one or more bids through multiple providers for the same impression opportunity. The bidding engine may submit one or more successive bids for the same impression opportunity during an availability period for bidding. In some embodiment, a bidding engine may automatically and/or successively bid, starting from a floor price up to a ceiling price, in an attempt to get a winning bid.

Referring now to 289, the demand side service completes a transaction to procure the impression opportunity from the impression opportunity provider responsive to a winning bid from the one or more bids. The DSP may complete the transaction via the interface assigned to the impression opportunity provider. In some embodiments, the DSP may update the communications link or establish a new communications link with the provider to complete the transaction. For example, the DSP may establish a link to transmit payment information. The DSP may establish a link between an ad server and the provider (e.g., ad exchange) to deliver the advertisement. In certain embodiments, the DSP establishes a link between the ad server and the publisher to deliver the advertisement.

The DSP may automatically deliver an advertisement to the procured impression opportunity. In the request and response protocol with and/or interface to the exchange, the DSP may identify or provide information for the ad or the ad to the exchange for delivery or placement to the procured impression opportunity. The DSP may deliver a creative or identification of the creative (e.g., the advertisement) to the exchange for the procured impression opportunity. The DSP may deliver a pixel to the procured impression opportunity. The DSP may deliver an ad creative tag to the procured impression opportunity. The DSP may select one of a plurality of advertisements to the procured impression opportunity based on information received from the provider. For example, the DSP may select an advertisement based on the layout, style and/or color scheme of the webpage or site hosting or providing the impression. In some embodiments, the DSP directs the procured impression opportunity to access an ad server. The DSP may complete the transaction within a short timeframe to minimize latency for populating the impression with the advertisement. In certain embodiments, the DSP may provide an advertisement to a provider for local storage, prior to bidding. The provider may locally access the advertisement responsive to a winning bid.

C. Determining Competitive Market Values of an Ad Impression

In a competitive market for bidding ad impression, a DSP may improve bidding success by analyzing, understanding and/or predicting the market value (e.g., CMV and FMV) of ad impressions. The DSP may leverage various information gathered by the DSP or from various sources, such as advertiser sites, ad exchanges, and third-party-provided data like Blue Kai segment data. In some embodiments, the DSP performs analysis and prediction of ad impression bidding prices via its brain engine.

A CMV may describe the value or worth of an ad impression as predicted, calculated, or otherwise determined, in a market for ad impressions. The CMV may describe the value or worth of an ad impression across one or more advertisers and/or ad campaigns. The CMV may describe a competitive value or worth of an ad impression in an ad impression marketplace (e.g., market segment, daypart). In some embodiments, the CMV of an ad impression may not vary across advertisers and/or ad campaigns. The CMV of an ad impression may be used as a benchmark for determining a suitable bid price for the ad impression.

A FMV may describe the value or worth of an ad impression as predicted, calculated, or otherwise determined, for a particular context, such as for a particular advertiser and/or ad campaign. A FMV may be determined based at least in part on condition(s) and/or goal(s) of an advertiser and/or ad campaign. The particular characteristics of an ad impression may be more or less desirable to a particular advertiser and/or ad campaign, and may affect the FMV as determined or estimated. The FMV may be used as a basis or value for bidding on (e.g., determining a bid price for) a corresponding ad impression. The FMV may be compared against a corresponding CMV to determine a bid value for a corresponding impression. For example, if the FMV is lower than the CMV, a bid at the FMV would have a lower probability of success. If a bid is placed at a FMV that is much higher than a corresponding CMV, although the probability of success is good, the bid price may be too expensive compared to perceived market value. In some embodiments, the CMV and/or FMV may be determined for a particular instant or period of time. The CMV and/or FMV of an ad impression may vary during the availability of the ad impression.

Figure 3A:
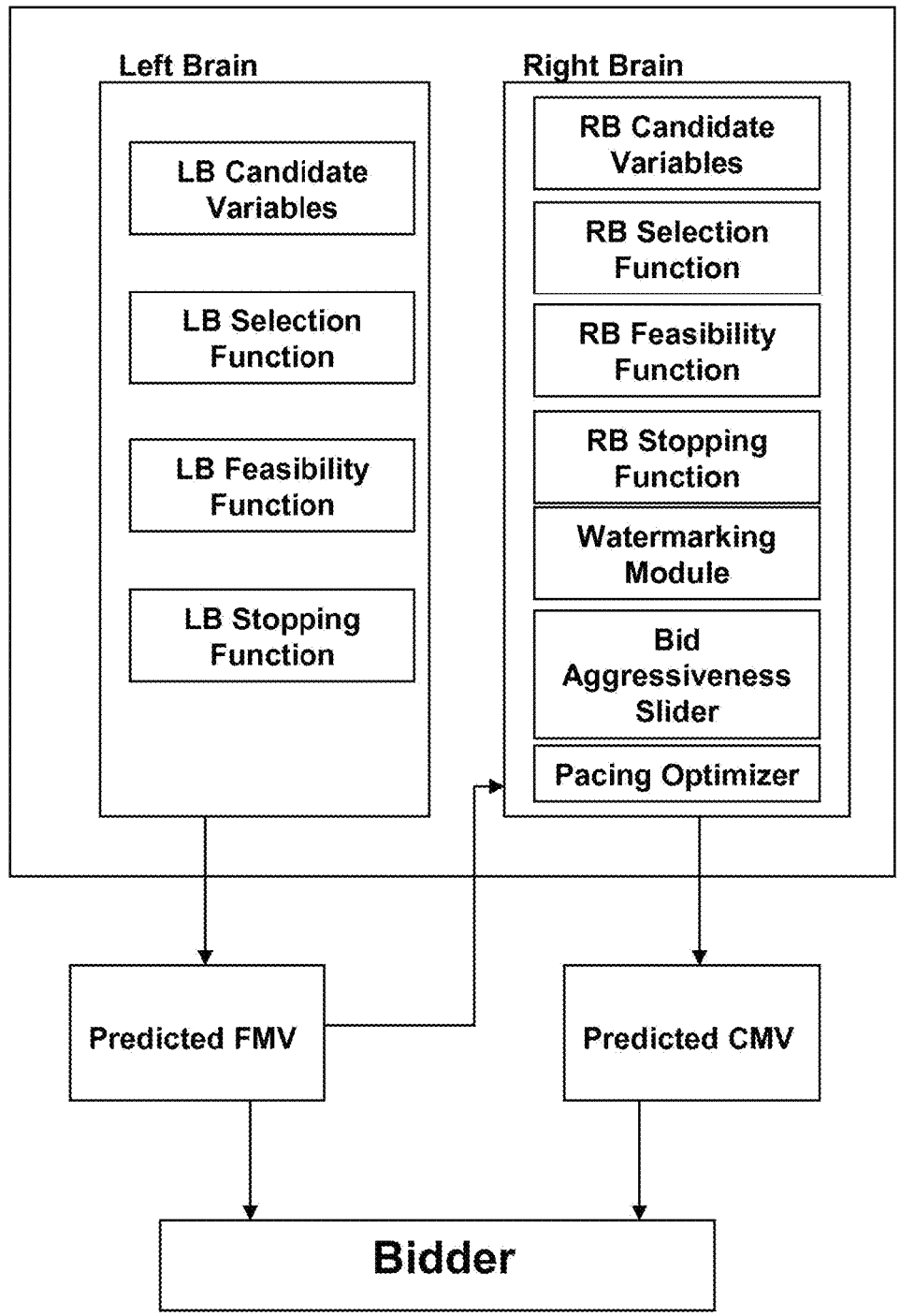
FIG. 3A is a block diagram depicting an embodiment of a system for determining market values of an advertising impression.

Referring to FIG. 3A, an embodiment of a system for determining CMV and/or FMV for an ad impression is depicted. In brief summary, the system includes a brain engine which may comprise a right brain and a left brain. Various embodiments of the brain engine are described above in connection with FIG. 2A. Some embodiments of the right brain and the left brain are described above in connection with FIGS. 2A and 2C. The right brain may generate a prediction of a CMV of an ad impression. The left brain may generate a FMV for an ad impression. A bidder may receive or use as input any one or more FMVs from the left brain and/or any one or more CMVs from the right brain.

In further details, the brain engine may include a right brain component for predicting CMV of an ad impression on one or more ad exchanges. The right brain may make a prediction of a distribution or profile of CMVs of an ad impression. The right brain may handle operations such as input variable selection, watermarking, and pacing across multiple advertisers (e.g., controlling spend rate with respect to bidding). In some embodiments, the right brain can make and adjust bids based on targeting, pacing and/or market dynamics. The right brain may receive, as candidates for input, any type or form of data from the various sources discussed above. For example, such information may include geo information, system data, remarketing information, segment data, site characteristics (such as ad network, publisher, category, etc), impression characteristics (such as channel, daypart, weekparts, REM or prospecting, ad size information, etc.) and/or other types of information discussed above in connection with FIGS. 2A, 2E and 2F. Fragments of such information may be gathered and/or received at different times.

In some embodiments, the right brain may receive a candidate set of inputs including media variables and/or user variables. The media variables and/or user variables may be associated with individual ad impressions. User variables include only non-personally-identifiable information (non-PII). Non-PII may include but is not limited to information about a device operated by a user, geo information, segment information, remarketing information, etc. In some embodiments, media variables may include any type or form of website, and/or content-related information. For example, media variables may include impression characteristics, such as the publisher, the ad size, the daypart, etc. The right brain may discard or filter away some or none of the media variables received. In some embodiments, instead of discarding away some candidate variables, the right brain may store these for later consideration and/or processing.

In some embodiments, the right brain includes or stores a decision-tree algorithm. This algorithm may include proprietary, custom, open-source, standard and/or commercially-available components. The DSP or the right brain may execute the algorithm in one or more processors of the DSP. The algorithm may be designed and configured to make CMV predictions based on the input variables collected or received in connection with ad impressions. The right brain may include a right brain (RB) selection module or function (hereafter generally referred to as "selection module", which may be embodied in hardware or a combination of hardware and software). The RB selection module may include any module, script, program, agent, state machine, component or set of executable instructions executing in the brain engine.

The RB selection module may be designed and configured for selecting (e.g., via proprietary methods) candidate variables to process. The list or number of candidate variables collected, received, filtered, discarded, stored and/or selected may not be static. These may change over time, for example, as ad networks, ad exchanges, publishers and other aspects change or evolve.

In some embodiments, the right brain may include a RB feasibility module or function (hereafter generally referred to as "feasibility module", which may be embodied in hardware or a combination of hardware and software. The RB feasibility module may include any module, script, program, agent, state machine, component or set of executable instructions executing in the brain engine. The RB feasibility module may be designed and configured for determining which values of selected variables to split, extract, monitor and/or analyze. The RB feasibility module may make this determination based on the profile or distribution of successful bids. For example, the RB feasibility module may determine or infer a relation between certain variable values and the number and/or value of winning bids.

In some embodiments, the right brain may include a RB stopping module or function (hereafter generally referred to as "stopping module", which may be embodied in hardware or a combination of hardware and software. The RB stopping module may include any module, script, program, agent, state machine, component or set of executable instructions executing in the brain engine. The RB stopping module may be designed and configured for determining or deciding when a solution (e.g., a CMV prediction) is achieved. The RB stopping module may perform or collect statistical measurements (e.g., of selected variable values) to make this determination. The RB stopping module may identify, isolate and/or analyze measurements of statistical significance (e.g., an identifiable trend or periodic distribution) to make this determination. The RB stopping module may determine that an incremental or recursive computation does not yield significant changes to a solution or prediction.

Some of all of the RB functions may interoperate with the RB decision-tree algorithm to generate an output. For example and in some embodiments, the RB selection, feasibility and stopping functions may be invoked at various stages of the RB decision-tree algorithm. In one embodiment, the RB decision-tree algorithm may include some or all of the RB functions. Some or all of the RB selection, feasibility and stopping functions may include proprietary features. The output of the RB decision-tree algorithm or right brain may include one or more CMV predictions. In some embodiment, a CMV prediction includes a distribution or distribution function of predicted clearing prices for one or more ad impressions. In some of these embodiments, a CMV prediction is generated at the ad exchange level. For example, the right brain may generate a prediction of the price an impression will clear at on a particular ad exchange. The distribution function of predicted clearing prices may include bid prices predicted to clear at various levels of likelihood from 0-100%. For example and in one embodiment, a predicted CMV for a selected ad impression with a 50% likelihood of clearing at a particular exchange (which may be represented as CMV(50)), may return a price which would win 50% of ad impressions sharing the characteristics of the selected ad impression on the particular exchange.

In some embodiments, CMV predictions are applied or used in the right brain in connection with one or more processes or functions, e.g., watermarking, bid aggressiveness slider, reach goal type, and/or cross-agency and cross-advertiser pacing. In some embodiments, watermarking refers to a process for controlling an initial and/or ongoing accumulation of data for use in "seeding" the left brain. The right brain may include a watermarking module designed and configured to perform watermarking. The watermarking module may be embodied in hardware or a combination of hardware and software. The watermarking module may include any module, script, program, agent, state machine, component or set of executable instructions executing in the brain engine. Initially, when an ad campaign launches, the left brain may not have information specific to this campaign or its creatives with which to make a prediction, e.g., of an FMV for an ad impression. The watermark module may define an initial watermark period and initial watermark budget for the watermarking process. The initial watermark budget may be spent (e.g., by bidding on impressions) over the course of the initial watermark period, representatively gathering data (e.g., bidding success statistics) across impression variables in order to seed the left brain.

The bid price during initial watermarking may be set by a user. For example, the user may define a "Benchmark CPM", which may represent a reference, base, or seed bid price. If a bid price is not set during initial watermarking, the watermarking module may bid at a value corresponding to CMV(initial_watermark_ptile), where initial_watermark_ptile may be an integer between 0 and 100, for example. In various embodiments, initial_watermark_ptile value may be predefined by a default value or a random value within the allowable range. The initial_watermark_ptile value may be defined by a user, an administrator, the watermarking module, or a program, e.g., based on any of the variable values analyzed. By way of illustration and in one embodiment, at CMV(initial_watermark_ptile=50), the watermarking module would bid, during the initial watermark period, a price that is expected to win 50% of the impressions available during the initial watermark period.

The left brain may begin to make predictions once the left brain has accumulated enough data, for example, to achieve statistical significance. This may result in some high-performing impression characteristics commanding high FMVs and low-performing impression characteristics commanding low FMVs. For example, some ad impressions may be determined to be high-performing and can therefore command a higher FMV. In some embodiments, in the case of impressions with low predicted FMVs, it may be likely that these impressions will not be won by the DSP's bid, which may present a risk (e.g., of lost opportunity) such as if the performance of such impressions were to change favorably for some reason. This risk may in part be offset by the self-updating nature of the left brain algorithm, e.g., which monitors the performance of impressions and generates new predictions. This risk may further be offset by the use of an ongoing or sustained watermark budget, e.g., to bid and gather more data across impression variables in order to seed the left brain.

In some embodiments, an ongoing watermark budget may be specified for improved predictive performance. The ongoing watermark budget may be a portion of the overall budget dedicated to continually re-testing impressions (such as those with low FMV values) over the course of the campaign. This constant re-testing may ensure that changes in market behavior are recognized and captured by the brain engine. The bid price during ongoing watermarking may be set by the user if the user defines a "Benchmark CPM" value. Otherwise, the watermarking module may bid a value corresponding to CMV(ongoing_watermark_ptile), where ongoing_watermark_ptile is an integer between 0 and 100, for example. The ongoing_watermark_ptile value may be defined by a user, an administrator, the watermarking module, or a program, e.g., based on any of the variable values analyzed. By way of illustration and in one embodiment, at CMV(ongoing_watermark_ptile=50), the watermarking module would bid or aim to bid a price that is expected to win 50% of the impressions available during the ongoing watermark period.

In some embodiments, the right brain includes a bid aggressiveness slider. The bid aggressiveness slider may define, for example, a scale from 0 to 100 that modulates FMV predictions. This scale may modulate FMV predictions for goal types that may include a reach goal type or any goal types such as CPC, CPE, CPA and ROI. For example and in some embodiments, if the slider value is greater than or equal to 50, the brain engine may select the lesser of: (a) the predicted FMV value multiplied by an amplification factor, or (b) the greater of the FMV or CMV at the bid aggressiveness slider value. By way of illustration and in certain embodiments, if the slider value is less than 50, then the brain engine may select the greater of: (a) the predicted FMV value divided by an amplification factor, or (b) the lesser of the FMV or CMV at the bid aggressiveness slider value.

In some embodiments, the amplification factor is a result of a scaling function that, for example, translates the 0 to 100 slider range into a range of multiples, e.g., to 1/x at 0, to 1 at 50, and to X at 100, where X is the maximum amplification. Thus, for bid aggressiveness slider values of 50 or higher, the brain engine may either bid a multiple of 1 or more times the FMV or the CMV of the aggressiveness slider value, whichever is less, in some embodiments. In another embodiment and example, for values below 50, the brain engine may either bid a multiple of less than 1 times the FMV or the CMV of the Aggressiveness Slider value, whichever is more.

Marketers may typically try to maximize exposure of their advertising campaign against a desired target audience, such as for brand-oriented campaigns. This may involve a tradeoff between bidding too high, which may result in a high cost per impression and therefore fewer impressions served for a given budget, and bidding too low, which may result in winning too few impressions. The right brain may include a reach goal type (RGT) module that is designed and configured to allow a user to manage this tradeoff. The RGT module may use, invoke or communicate with the bid aggressiveness slider to bid a value equal to the CMV of the bid aggressiveness slider value. For example and in one embodiment, setting the bid aggressiveness slider value to 75 may set a bid price that wins 75% of the available impressions. The user can, for example, use the collected statistics and monitored budget drain to quantify the tradeoff between price and volume. The RGT module or the user may accordingly re-adjust and/or optimize the slider value against the user's reach goals. The RGT module may be embodied in hardware or a combination of hardware and software. The RGT module may include any module, script, program, agent, state machine, component or set of executable instructions executing in the brain engine.

In some embodiments, the right brain includes a cross-advertiser pacing optimizer. The cross-advertiser pacing optimizer may be designed, constructed, and/or configured to optimize bidding for each campaign or advertiser or across multiple campaigns or advertisers. A user may specify if the cross-advertiser pacing optimizer should optimize for each campaign or advertiser individually, (e.g., allow the highest bidder within campaigns or advertiser to win), or to optimize globally across a portfolio of advertisers or campaigns (e.g., based in part on the performance of each campaign). The cross-advertiser pacing optimizer may be embodied in hardware or a combination of hardware and software. The pacing optimizer may include any module, script, program, agent, state machine, component or set of executable instructions executing in the brain engine.

By way of illustration, consider two campaigns from the same advertiser (ad agency): Campaign1 and Campaign2. Campaign1 may be performing well and pacing well against its budget. For example, Campaign1 may be utilizing its budget and winning enough bids as measured against the campaign's goals. Campaign2 may be struggling to perform and under-pacing against its budget. For example, Campaign2 may be not be winning enough bids and is under-utilizing its budget. If an impression becomes available, Campaign1 may determine that its FMV is $2.52 while Campaign2 may determines that its FMV is $2.49. If the cross-advertiser pacing optimizer is set to optimize for each campaign individually (sometimes referred to as a "highest-bid" campaign setting), Campaign1 is determined to be the highest bidder and its bid may be submitted over that of Campaign2. In another embodiment, if the cross-advertiser pacing optimizer is set to optimize across campaigns, the cross-advertiser pacing optimizer may consider if (a) any campaign is identified as under-pacing its budget by an amount or a rate higher than an amount or a rate the highest-bid campaign is under-pacing its budget. If so, the pacing optimizer may consider if (b) the identified campaign has determined a FMV bid that is still likely to win.

In some embodiments, the first factor considered determines whether another campaign "needs" the impression more than the highest-bid campaign, e.g., based on a comparison of relative pacing vs. campaign budgets. In certain embodiments, the second factor considered ensures that the bid is not going "to waste" if allocated to a campaign that is not offering the highest bid. The cross-advertiser pacing optimizer may determine that this campaign still has a high probability of winning. This probability may be assessed or quantified by comparing the FMV of lower-bidding campaigns and a function CMV(underpacing_ptile). The value of underpacing_ptile may be an integer between a range of 0 and 100, for example. By way of illustration and in one embodiment, if the FMV of a campaign is greater than CMV(underpacing_ptile=90), the pacing optimizer may predict that the campaign has at least a 90% chance of winning the impression bid. A campaign that is underpacing its budget the most while still having an FMV greater than the value returned by the CMV(underpacing_ptile) function may replace the highest-bid campaign in submitting a bid. The above example illustrates cross-advertiser pacing optimization across campaigns for the same advertiser. Pacing optimization may be adapted for selecting bids across campaigns of different advertisers within an ad agency. Pacing optimization can also be adapted for selecting bids between advertisers within an ad agency.

In some embodiments, the right brain may include a volume pacing module. The volume pacing module may be designed and configured for volume pacing which maps or allocates budget spending against the profile of impression volume over the course of time. Volume pacing may be implemented independent of, or in addition to even pacing (e.g., evenly distributed budget spending over a specified time period) and/or ASAP pacing (e.g., budget spending allocated for winning many bids early within a specified time period). A time period for pacing purposes may be defined for any length of time, such as over one hour, day, week, month, or an entire campaign period.

In some embodiments, the volume pacing module measures bid requests on each ad exchange to determine the periodic (e.g., hourly, daily, weekly and monthly) profile of available impression volume. The volume pacing module may create weights associated with each time interval. In some embodiments, these weights may be used to align budget spending against the volume profile(s). For example and in one embodiment, if the 4-5 pm time period on a Monday typically has 14 times the available impression volume as compared to the 1-2 am time period on a Sunday, the volume pacing module may assign a weight that is 14 times greater for the 4-5 pm time period and spend correspondingly 14 times more. In some embodiments, the volume pacing feature may be applied during watermarking, e.g., to ensure that watermarking does not "over-learn" during periods of low available volume, or does not "under-learn" during periods of high available volume. By appropriately, utilizing more of a campaign's budget during periods of high impression volume, the right brain may appropriately submit more bids to gather data for making a more accurate prediction. During periods of low impressions volume where less data can be gathered, the volume pacing module may allocate less of a campaign's budget to such periods.

In some embodiments, the left brain includes a decision-tree algorithm. The decision-tree algorithm may be designed and configured to predict the FMV of an ad impression for an advertiser. This algorithm may include proprietary, custom, open-source, standard and/or commercially-available components. The DSP or the left brain may execute the algorithm in one or more processors of the DSP. The decision-tree algorithm may include some of the same or similar features of the RB decision-tree algorithm. The decision-tree algorithm may include some features adapted from the RB decision-tree algorithm and/or right brain. For example and in some embodiment, the left brain collects and/or receives candidate variables, including media variables and/or user variables, from various sources. The left brain may process at least some of the media variables and/or non-PH user variables received in association with individual ad impressions. The left brain may determine if one or more statistically valid predictions can be made at the campaign and/or creative levels.

The left brain may include a left brain (LB) selection function or module, which may be embodied in hardware or a combination of hardware and software. The LB selection module may include any module, script, program, agent, state machine, component or set of executable instructions executing in the brain engine. The LB selection module may be designed and configured for selecting candidate variables to process, e.g., at each ad impression node. The list or number of candidate variables collected, received, filtered, discarded, stored and/or selected may not be static.

In some embodiments, the left brain may include a LB feasibility function, which may be embodied in hardware or a combination of hardware and software. The LB feasibility module may include any module, script, program, agent, state machine, component or set of executable instructions executing in the brain engine. The LB feasibility module may be designed and configured for determining which values of selected variables to split, extract, monitor and/or analyze.

In some embodiments, the left brain may include a LB stopping function which may be embodied in hardware or a combination of hardware and software. The LB stopping module may include any module, script, program, agent, state machine, component or set of executable instructions executing in the brain engine. The LB stopping module may be designed and configured for determining or deciding when a solution (e.g., a FMV prediction) is achieved.

In some embodiments, one or more of the left brain selecting, feasibility and stopping functions may differ substantially in function, operation, construct and/or output from the corresponding function in the right brain. For example, the LB functions may interoperate to generate a different output from the right brain. In one embodiment, the left brain generates or provides output including FMV predictions. The FMV predictions may include a set of predicted FMV CPM bids at the campaign and creative levels. These FMV predictions may be based on one or more types of goals, e.g., CPC, CPE, CPA, or ROI.

The left brain may be designed and built with an ability to handle large numbers of variables. The left brain may be designed and built to handle variables with high cardinality (i.e., having many variable values). The left brain may be built to accommodate data inputs with low fill rate, e.g., infrequent updates or refresh rates. The left brain may be built to accommodate data inputs with blank or missing values. The left brain may be configured with the ability to capture or infer nonlinear relationships between variables. The left brain may be built to provide fast computing or processing speeds, e.g., well-suited to speed requirements of real-time bidding. For example, the left brain may be able to make FMV predictions before availability of an impression expires. The left brain may be able to dynamically update itself to generate new FMV predictions, e.g., by adapting to and incorporating incoming streaming information. The left brain may also include transparent rule sets for easy validation.

Although generally described as a left brain module and a right brain module, any combination of the functionality, operations and logic of the left brain module and the right brain module may be combined in any manner into a single brain module. Furthermore, any brain module may incorporate functionality, operations and logic from another brain module. In some embodiments, the left brain module may incorporate all or any portion of the right brain module. In some embodiments, the right brain module may incorporate all or any portion of the left brain module.

Figure 3B:
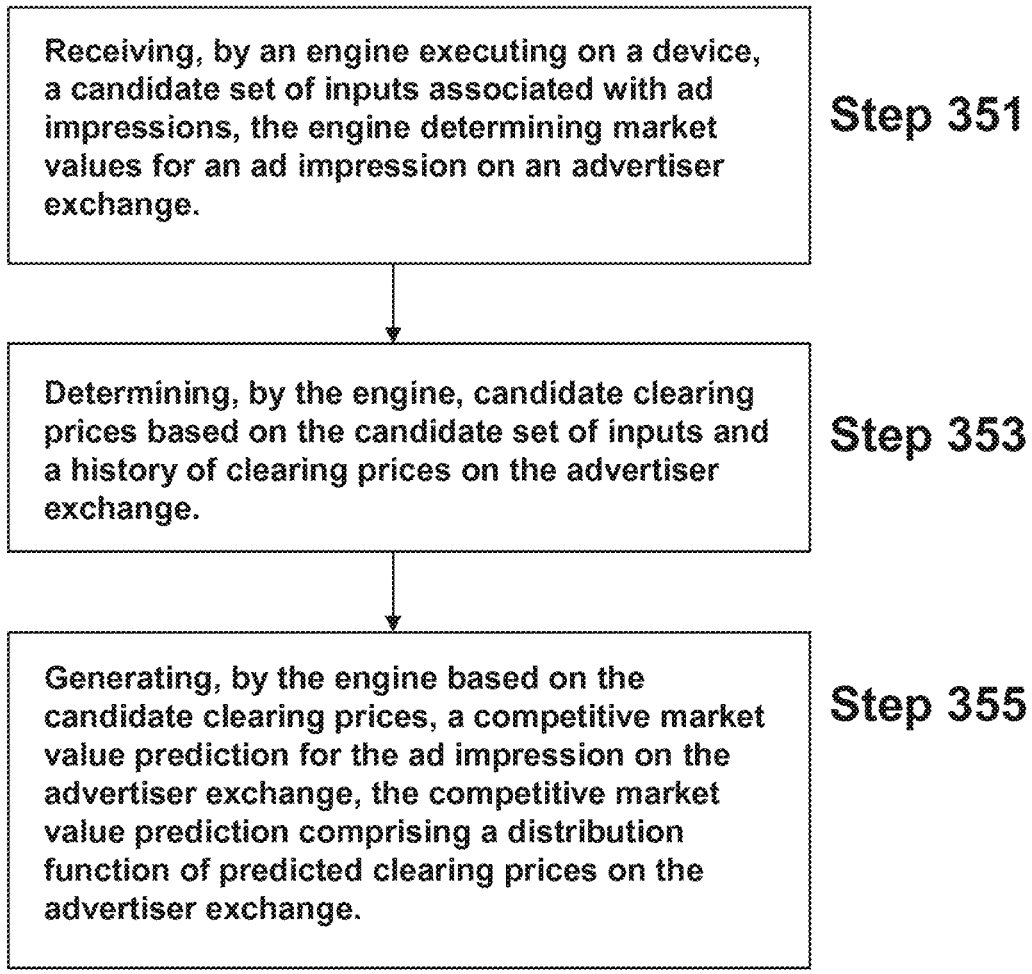
FIG. 3B is a flow diagram depicting an embodiment of a method for determining competitive market values of an advertising impression.

Referring now to FIG. 3B, one embodiment of a method for determining competitive market values for an ad impression on an advertiser exchange is depicted. In brief overview, an engine executing on a device may receive a candidate set of inputs associated with one or more ad impressions (351). The engine may determine competitive market values for an ad impression on an advertiser exchange. The engine may determine candidate clearing prices based on the candidate set of inputs and a history of clearing prices on the advertiser exchange (353). The engine may generate, based on the candidate clearing prices, a competitive market value prediction for the ad impression on the advertiser exchange (355). The competitive market value prediction may comprise a distribution function of predicted clearing prices on the advertiser exchange.

In further details of (351), an engine executing on a device may receive a candidate set of inputs associated with ad impressions. The device may comprise any one or more devices (e.g., DSP) described above in connection with FIGS. 2A-G and 6A. The engine may sometimes be referred to as a brain engine, and may comprise a left brain component and/or a right brain component. The engine may determine competitive market values for an ad impression on an advertiser exchange. An ad exchange, content provider or other ad impression opportunity provider may inform the engine that an ad impression is available (e.g., for bidding). In some embodiments, the device and/or engine receives a request to bid on the ad impression. The ad exchange, content provider or other ad impression opportunity provider may provide to the device information regarding and/or relating to the ad impression. The device may direct or send the received information to the engine for processing (e.g., in preparation for bidding).

The engine receives a candidate set of inputs, which may include the information received from the ad impression opportunity provider. The candidate set of inputs may include one or more of: segment information, geo information, information regarding content to be published with the ad impression, a minimum bid price for the ad impression, information from third-parties (e.g., Bluekai), insights and analytics (e.g., provided by the DSP, ad exchange and/or third-parties), impression characteristics, and retargeting information. In some embodiments, the engine receives a candidate set of inputs comprising one or more of: a campaign goal of the advertiser, a budget of the advertiser's ad campaign, performance of the advertiser's ad campaign, and the spending pace for the budget. In some embodiments, the engine excludes some or all ad campaign and/or advertiser-specific constraints and/or information in determining a CMV prediction. In other embodiments, the engine may incorporate information from one or more ad campaigns and/or advertisers in determining a CMV prediction.

The engine may receive a candidate set of inputs comprising historical data or inputs derived from historical data, such as availability profile(s) of ad impressions, past performance and/or records of successful/unsuccessful bids of similar ad impressions. The engine may receive a candidate set of inputs including media variables and/or user variables described above in connection with FIG. 3A. In some embodiments, the device and/or engine may allocate a portion of an ad campaign's budget on acquiring, selecting and/or processing the candidate set of inputs. For example, the engine perform the allocation using the watermarking process described above in connection with FIG. 3A.

At (353), the engine may determine candidate clearing prices based on the candidate set of inputs and/or the history of clearing prices on the advertiser exchange. The engine may request and/or obtain a history of clearing prices of similar ad impressions on particular advertiser exchange(s), content provider(s), segment(s), and/or day part(s). The engine may obtain a history of clearing prices based on past experience, such as from a past ad campaign (e.g., test campaign), or data collected from a trial phase of an ad campaign. A clearing price may comprise an actual successful bid price, a minimal bid price that can be successful, and/or a CMV. A clearing price may be based on an actual, calculated or estimated value. In some embodiments, the engine and/or an advertiser may define an initial period and/or portion of an ad campaign budget for limiting the candidate set of inputs and/or the history of clearing prices for the determination of the candidate clearing prices.

The engine may determine candidate clearing prices using a decision-tree algorithm, such as the algorithm described above in connection with FIG. 3A. The engine may select, from the candidate set of inputs, candidate variables to process. The engine may determine which values of selected variables to split, extract, monitor and/or analyze. A RB feasibility module of the engine may, for example, make this determination based on a profile or distribution of past successful bids. The engine may determine candidate clearing prices based on an iterative and/or refinement process. A RB stopping module of the engine may identify, isolate and/or analyze measurements of statistical significance in determining or deciding when a solution (e.g., a CMV prediction) is achieved.

In some embodiments, the engine incorporates one or more processes or functions, e.g., watermarking, bid aggressiveness slider, reach goal type, and/or cross-agency and cross-advertiser pacing, in determining candidate clearing prices. The engine may, for example, use a bid aggressive slider function, and/or a reach goal specification, to adjust the candidate clearing prices that may be translated to more effective bidding values. In some embodiments, the engine determines candidate clearing prices that is not specific to an advertiser and/or ad campaign. In certain embodiments, the engine determines (e.g., in real time) candidate clearing prices that are realistic or reasonable in a marketplace for ad impressions.

In further details of (355), the engine may generate, based on the candidate clearing prices, a competitive market value prediction for the ad impression on the advertiser exchange. The engine may generate a CMV prediction at the ad exchange level, e.g., specific to a particular ad exchange or ad impression provider. In some embodiments, the engine may generate a CMV prediction across a plurality of ad exchanges and/or ad impression providers. The engine may generate a CMV prediction across one or more advertisers and/or ad campaigns. The engine may generate a CMV prediction in a particular ad impression market. The engine may generate a CMV prediction for a particular instant or period of time. The CMV prediction may include a value or description of market worth of the corresponding ad impression, which may be a single CMV value based on the candidate set of inputs. In some embodiments, the CMV prediction includes predicted clearing prices on bids.

The CMV prediction may comprise a distribution function of predicted clearing prices on an advertiser exchange. The competitive market value prediction may comprise a number of predicted clearing prices for bids, e.g., discrete values. The competitive market value prediction may comprise one or more continuous distributions of predicted clearing prices, which may be interpolated/extrapolated from descrete values. In some embodiments, the engine provides a function or formula that outputs a predicted clearing price based on user inputs and/or needs. For example, a user may desire to win a percentage (e.g., X %) of ad impressions available during a period (e.g., an initial watermark period). The engine may provide a predicted clearing price for a bid based on the CMV prediction, so that the bid is estimated to have a X % chance of winning a corresponding ad impression.

In some embodiments, the engine generates a suitable set of bid prices. The engine may generate the set of bid prices based on at least one of the following types of goals: cost per click (CPC), cost per lead (CPL), cost per sale (CPS), cost per action (CPA), return on investment (ROI), or winning a targeted portion of available ad impressions. The engine may dynamically incorporate new candidate set of inputs to generate an updated competitive market value prediction. In some embodiments, the engine may generate an updated competitive market value prediction for an ad impression during the availability period of the ad impression. The engine may generate an updated competitive market value prediction for an ad impression as new data (e.g., a new or updated candidate set of inputs) becomes available.

The engine may generate, based at least in part on the competitive market value prediction, a fair market value for the ad impression. The engine may generate the FMV in the context of a specific ad campaign and/or advertiser. For example, the engine may generate one or more fair market value bids for the ad impression in the context of a specific ad campaign. The engine may incorporate information from the candidate set of inputs in determining the FMV.

Figure 3C:
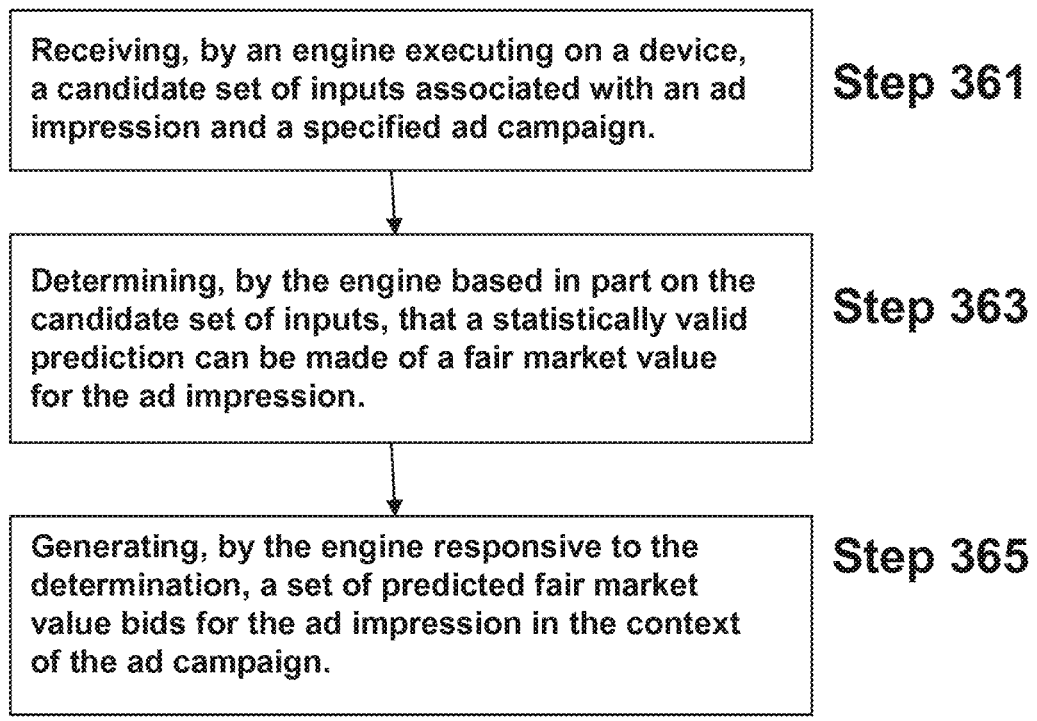
FIG. 3C is a flow diagram depicting an embodiment of a method for determining fair market values of an advertising impression.

Referring now to FIG. 3C, one embodiment of a method for determining fair market value bids for an ad impression is depicted. In brief overview, an engine executing on a device may receive a candidate set of inputs associated with an ad impression and a specified ad campaign (361). The engine may determine fair market values for an ad impression and a specified ad campaign. The engine may determine, based on the candidate set of inputs, that a statistically valid prediction can be made of a fair market value for the ad impression (363). The engine may generate, responsive to the determination, a set of predicted fair market value bids for the ad impression in the context of the ad campaign (365).

At (361), an engine executing on a device may receive a candidate set of inputs associated with an ad impression and a specified ad campaign. The engine may determine fair market values of an ad impression for a specified ad campaign. The engine may receive, incorporate and/or process any of the information described above, e.g., in connection with step 351 of FIG. 3B. For example, the engine may receive a candidate set of inputs comprising one or more of: a campaign goal of the advertiser, a budget of the advertiser's ad campaign, performance of the advertiser's ad campaign, and the spending pace for the budget. The engine may receive a candidate set of inputs including information about a specific ad campaign and/or advertiser. For example, the information may include constraints, goals and/or other attributes of the ad campaign and/or advertiser. Such information may be used to determine the FMV of an ad impression for the ad campaign and/or advertiser.

In some embodiments, the engine receives a candidate set of inputs comprising one or more high-performing ad impression characteristics and/or low-performing ad impression characteristics. In certain embodiments, these characteristics may be matched and/or weighed against an ad campaign's goals, constraints, preferences and/or performance. The engine may receive a candidate set of inputs comprising a CMV or a CMV prediction. The engine may receive a candidate set of inputs comprising predicted clearing prices on an advertiser exchange for an ad impression. For example, a LB component of the engine may receive the CMV from the RB component of the engine. The engine may begin to process the candidate set of inputs once the engine has accumulated enough data, for example, to achieve statistical significance.

In further details of (363), the engine may determine, based on the candidate set of inputs, that a statistically valid prediction can be made of a fair market value for the ad impression. The engine may execute a decision-tree algorithm to predict the FMV of an ad impression. The engine may collect, filter and/or select candidate variables, including media variables and/or user variables for processing using the algorithm. The engine may include a LB feasibility module that determines which values of selected variables to split, extract, monitor and/or analyze. The algorithm may perform the FMV prediction based on a statistically analysis of data such as historical clearing prices for bids, past performance of the corresponding ad campaign, actual ad spend rate, and/or target ad spend rate.

The algorithm may perform any form or type of iterative processing and/or calculation in an attempt to converge on a FMV prediction. In certain iterative cycles, additional variables may be included in the processing by the algorithm. Refinements to the prediction may be achieved with additional cycles of processing. In some embodiments, convergence to a FMV prediction may require a number of processing cycles. A LB stopping function of the engine may determine or decide when a solution (e.g., a FMV prediction) is achieved. The stopping function may determine if an incremental cycle of processing may offer little additional value. The stopping function may determine if a FMV prediction has achieved a predefined level of accuracy. The engine may determine that a statistically valid prediction can be made of a FMV for the ad impression based on the candidate set of inputs. For example, the engine may determine that the algorithm is converging or has converged on a prediction (e.g., after a predetermined period of time and/or number of processing cycles). The engine may determine that it has received or accumulated enough information (e.g., statistical and/or historical data) to process and/or provide the prediction. The engine may determine that it has received or accumulated enough information to perform a statistical analysis for the prediction.

At (365), the engine may generate, responsive to the determination, a set of predicted fair market value bids for the ad impression in the context of the ad campaign. In some embodiments, the engine generates a FMV for the ad impression. In some embodiments, the engine generates a plurality of FMVs, e.g., based on various selections from a bid aggressiveness scale. The engine may generate a series of FMV bids (e.g., bid prices based on the FMV) so that if the first bid fails, a subsequent bid may be attempted. The engine may generate a set of predicted FMV bids based on at least one of the following types of goals: cost per click (CPC), cost per lead (CPL), cost per sale (CPS), cost per action (CPA), return on investment (ROI), or winning a targeted portion of available ad impressions.

The engine may dynamically incorporate new candidate sets of inputs to generate an updated FMV prediction. The engine may generate an updated FMV prediction for an ad impression during the availability period of the ad impression. The engine may generate an updated FMV prediction for an ad impression as new data (e.g., a new or updated candidate set of inputs) becomes available. The engine may dynamically incorporate one or more new candidate sets of inputs to generate an updated set of predicted FMV bids for the ad impression.

In some embodiments, the engine, or a bidder in communication with the engine, may submit a bid for the ad impression. The bidder may determine the value of the bid, and/or submit the bid, based on the predicted fair market value. In some embodiments, the bidder may submit the bid if the engine determines that the bid is likely to win against another fair market value bid of another ad campaign. Such a determination on whether to bid may be referred to as a cross-campaign determination. For example, in some embodiments, the engine may determine not to make a bid from a first ad campaign, allowing a bid from a second ad campaign instead. One possible reason may be that the second campaign (from the same advertiser as the first campaign) may need the ad impression more than the first campaign in view of the second campaign's (under)performance Another reason may be that the predicted FMV bid for the second campaign may be higher that that of the first campaign. A bid at the lower FMV may unlikely succeed if the higher bid is submitted. In some embodiments, the engine optimizes bids across one or more ad campaigns and/or advertisers. In certain embodiments, the engine optimizes bids for an ad campaign and/or advertiser independent of other campaigns and/or advertisers, In some embodiments, the engine may compare the predicted FMV against a corresponding predicted CMV, in determining what price to bid, and/or whether to submit a bid. For example, if the FMV of an ad impression for a particular ad campaign is higher than the CMV, the engine may determine that the ad impression is more valuable to that ad campaign in comparison with the market value, and is worth bidding for. If the FMV of an ad impression for a particular ad campaign is lower than the CMV, the engine may determine that the ad impression's worth to the campaign is below the market value, and the likelihood of a successful bid at the FMV is low.

In some embodiments, a series of opportunities for an ad impression (e.g., from a particular publisher) may be available. The engine may use a watermark budget to predict and/or retest a FMV prediction for the ad impression. The engine may continually re-test ad impressions over the course of an ad campaign to recognize and/or capture changes in market behavior.

Figure 3D:
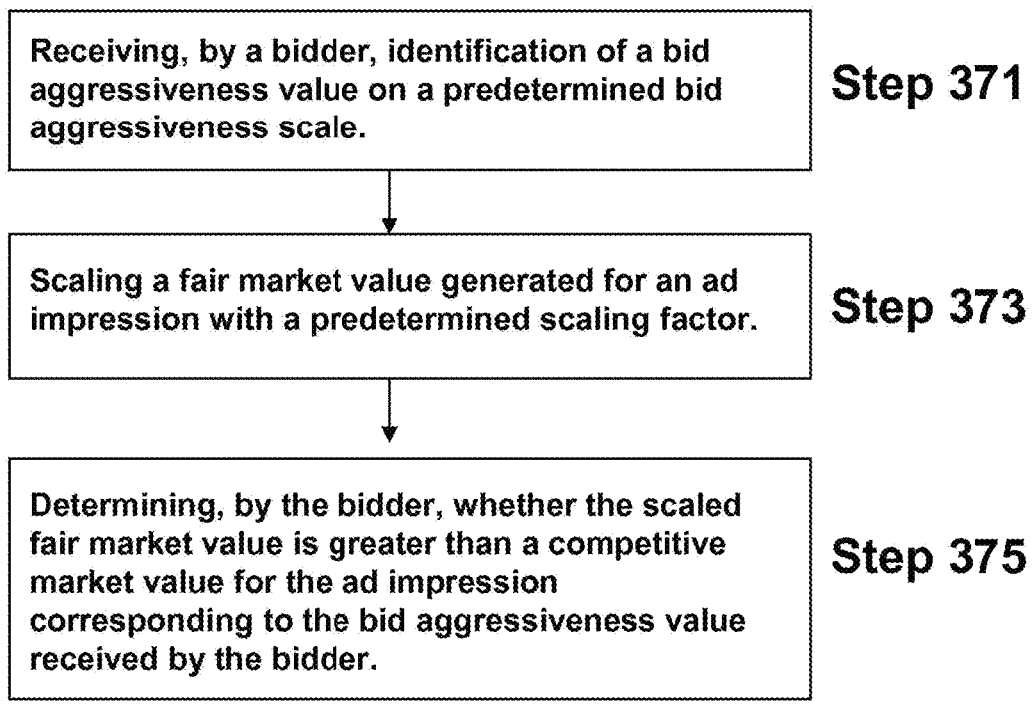
FIG. 3D is a flow diagram depicting an embodiment of a method for managing aggressiveness of bidding based on fair market value and competitive market value of an ad impression.

Referring now to FIG. 3D, one embodiment of a method for managing aggressiveness of bidding based on fair market value and competitive market value of an ad impression is depicted. In brief overview, a bidder may receive identification of a bid aggressiveness value on a predetermined bid aggressiveness scale (371). The bidder may scale a fair market value generated for an ad impression with a predetermined scaling factor (373). The bidder may determine whether the scaled fair market value is greater than a competitive market value for the ad impression corresponding to the bid aggressiveness value received by the bidder (375).

In further details of (371), a bidder may receive identification of a bid aggressiveness value on a predetermined bid aggressiveness scale. The bidder may comprise any embodiment of the bidder described above, e.g., in connection with FIGS. 2A-G. The bidder may receive identification of a bid aggressiveness value for influencing, adjusting, modulating, or otherwise modifying a CMV prediction, a FMV prediction, and/or a bid price. A DSP or ad campaign may, for example, select a bid aggressiveness value based on a reach goal type (e.g., as described above in connection with FIG. 3A). In some embodiments, the DSP and/or ad campaign selects the bid aggressiveness value based on at least one of the following types of goals: cost per click (CPC), cost per lead (CPL), cost per sale (CPS), cost per action (CPA), return on investment (ROI), or winning a targeted portion of available ad impressions. In certain embodiments, for example, in selecting a larger bid aggressiveness value, the engine may amplify the FMV and/or recommend a higher bid price in relation to the FMV and/or CMV.

In some embodiments, the bid aggressiveness scale may include an assigned value below which a bid using a corresponding CMV is expected to win less than 50% of the available ad impressions. Above the assigned value, a bid using a corresponding CMV may be expected to win more than 50% of the available ad impressions. Such an assigned value may be arbitrarily set within the scale. In some embodiments, the assigned values is set at or near the midpoint of the scale. In other embodiments, any other reference point (e.g., assigned value) may be set on the scale. The scale may be linear or non-linear in nature. In certain embodiments, the bid aggressiveness scale may include selections that inflate a bid above the CMV (e.g., more aggressive). In some embodiments, the bid aggressiveness scale may include selections that set a bid below the CMV (e.g., less aggressive).

At (373), the bidder may scale a fair market value generated for an ad impression with a predetermined scaling factor. The bidder may scale a fair market value generated for an ad impression with a scaling factor determined based on the bid aggressiveness value received or selected. For example, the bidder may scale a FMV by multiplying the FMV with an amplification factor (e.g., when the bid aggressiveness value received is greater than or equal to 50 or the assigned value described above). The bidder may scale a FMV by dividing the FMV with an amplification factor (e.g., when the bid aggressiveness value received is less than 50 or the assigned value described above).

The amplification factor may be provided by a scaling function of the DSP, which translates, by way of example, a 0 to 100 bid aggressiveness scale into a range of multiples, e.g., to $1/x$ at 0 (e.g., low end of scale), to 1 at 50 (or the assigned value), and to X at 100 (e.g., high end of scale), where X is a predetermined maximum amplification value. The bidder may determine that the scaling factor comprises a value less than 1 if the bid aggressiveness value received is less than the assigned value. The bidder may determine that the scaling factor includes a value that is more than 1 if the bid aggressiveness value received is more than the assigned value. Thus, in some of these embodiments, for bid aggressiveness slider values above the assigned value, the bidder may bid a value that is a multiple of 1 or more times the FMV or the CMV at the bid aggressiveness slider value, whichever is less. In some embodiments, for values below the assigned value, the bidder may bid a value that is a multiple of less than 1 times the FMV or the CMV at the bid aggressiveness slider value, whichever is more.

In some other embodiments, the scaling factor corresponding to the low end of the scale may not be $1/x$. For example, the scaling factor may be 1 or some other predetermined value instead, which may be independent of X. In some embodiments, the scaling factor may be always larger than 1 (or some predetermined value). The scaling factor may be capped at X or some other predetermined value. In certain embodiments, the translation function between the selected bid aggressiveness value and the scaling factor is a linear function. In other embodiments, the translation function is nonlinear.

In further details of (375), the bidder may determine whether the scaled fair market value is greater than a competitive market value for the ad impression corresponding to the bid aggressiveness value received by the bidder. Responsive to scaling the FMV with the scaling factor, the bidder may compare the scaled FMV against a corresponding CMV. The corresponding CMV may be determined as a CMV predicted at the bid aggressiveness value received. The bidder may determine a bid value based on the comparison. The bidder may determine a bid value based also in part on the bid aggressiveness value received.

By way of illustration, and not intended to be limiting in any way, the bidder may select, as the fair market value bid, the greater of the scaled fair market value and the competitive market value corresponding to the received bid aggressiveness value, if the bid aggressiveness value received is less than the assigned value. In some embodiments, the bidder may select, as the fair market value bid, the lesser of the scaled fair market value and the competitive market value corresponding to the received bid aggressiveness value, if the bid aggressiveness value received is more than the assigned value.

In another illustrative embodiment, if the bid aggressiveness value is greater than or equal to the assigned value (e.g., 50), the bidder may select the lesser of: (a) the predicted FMV value multiplied by an amplification factor, or (b) the greater of the FMV or CMV at the bid aggressiveness value. In certain embodiments, if the bid aggressiveness value is less than the assigned value (e.g., 50), then the bidder may select the greater of: (a) the predicted FMV value divided by an amplification factor, or (b) the lesser of the FMV or CMV at the bid aggressiveness value.

In some embodiments, setting the bid aggressiveness slider value to Y (e.g., 75) may result in setting a bid price that is expected to win a corresponding portion (e.g., 75%) of the available impressions. The bidder may dynamically update the bid price against a current selection of the bid aggressiveness slider value. The engine may further dynamically update the FMV and/or CMV of the corresponding as impression, so that the bidder may determine an updated bid price to submit.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the invention has been particularly shown and described with reference to specific embodiments, it should be understood by those skilled in the art that various changes in form and detail may be made therein without departing from the spirit and scope of the invention as defined by the following claims.

What is claimed:

1. A system for determining to place a bid for an ad impression opportunity among a plurality of ad impression opportunities across a plurality of exchanges, the system comprising:

an interface comprising a first data transmission interface configured to receive data relating to a first ad impression opportunity from a first exchange and a second data transmission interface configured to receive data relating to a second ad impression opportunity from a second exchange;

one or more computer readable storage devices configured to store a plurality of computer executable instructions; and one or more hardware computer processors in connection with the one or more computer readable storage devices and configured to execute the plurality of computer executable instructions in order to cause the system to:

receive one or more parameters of an ad campaign of an advertiser;

normalize the data relating to the first ad impression opportunity and the data relating to the second ad impression opportunity, wherein the normalization comprises:

accessing the interface comprising the first data transmission interface and the second data transmission interface; and translating historical data received from the first data transmission interface and historical data from the second data transmission interface, wherein the historical data comprises historical clearing prices for the first ad impression opportunity and the second ad impression opportunity;

determine a first historical market value of the first ad impression opportunity, wherein the first historical market value is determined based at least in part on the historical clearing prices for the first ad impression opportunity;

determine a second historical market value of the second ad impression opportunity, wherein the second historical market value is determined based at least in part on the historical clearing prices for the second ad impression opportunity;

generate a first fair market value of the first ad impression opportunity, wherein the first fair market value is determined based at least in part the one or more parameters of the ad campaign;

generate a second fair market value of the second ad impression opportunity, wherein the second fair market value is determined based at least in part on the one or more parameters of the ad campaign;

compare the first historical market value to the first fair market value;

determine not to bid on the first ad impression opportunity when the first historical market value is greater than a threshold value above the first fair market value;

adjust the determined second historical market value based at least in part on one or more additional inputs;

determine a difference between the determined second historical market value and the adjusted second historical market value;

repeatedly adjust the adjusted second historical market value if the determined difference is above a predetermined threshold level;

finalize the adjusted second historical market value if the determined difference is at or below the predetermined threshold level; and determine to bid on the second ad impression opportunity when the finalized second historical market value is not greater than a threshold value than the second fair market value.

2. The system of claim 1, wherein the system is further caused to generate a bid price for the second ad impression opportunity based at least in part on the finalized second historical market value.

3. The system of claim 1, wherein the system is further caused to receive an aggressiveness value from the advertiser, wherein the aggressiveness value is representative of a level of aggressiveness of the advertiser for bidding on the plurality of ad impression opportunities.

4. The system of claim 3, wherein the bid price for the second ad impression opportunity is generated based at least in part on the aggressiveness value received from the advertiser.

5. The system of claim 1, wherein the system is further caused to continuously update the determined first historical market value of the first ad impression opportunity during an availability period of the first ad impression opportunity.

6. The system of claim 1, wherein the system is further caused to:
dynamically generate a plurality of bid prices for the second ad impression opportunity based at least in part on the finalized second historical market value; and
place a plurality of bids for the second ad impression opportunity on the second exchange based at least in part on the dynamically generated plurality of bid prices.

7. The system of claim 1, wherein the first exchange and the second exchange use different data transmission protocols.

8. The system of claim 1, wherein the one or more parameters of the ad campaign comprises one or more goals or one or more constraints of the ad campaign.

9. The system of claim 8, wherein the one or more goals of the ad campaign comprises one or more of cost per click, cost per lead, cost per sale, cost per action, return on investment, or winning a targeted portion of available ad impression opportunities.

10. The system of claim 8, wherein the one or more constraints of the ad campaign comprises one or more of a geographic constraint, temporal constraint, frequency bidding constraint, frequency bidding constraint, budget spend per placement constraint, or exchange constraint.

11. A computer-implemented method for determining to place a bid on behalf of an advertiser for an ad impression opportunity among a plurality of ad impression opportunities across a plurality of exchanges, the method comprising:
receiving, by a computer system, one or more parameters of an ad campaign of an advertiser;
receiving, by a first data transmission interface of an interface of the computer system from a first exchange, data relating to a first ad impression opportunity, wherein the data relating to the first ad impression opportunity comprises one or more historical clearing prices for the first ad impression opportunity;
receiving, by a second data transmission interface of the interface of the computer system from a second exchange, data relating to a second ad impression opportunity, wherein the data relating to the second ad impression opportunity comprises one or more historical clearing prices for the second ad impression opportunity;
normalizing, by the computer system, the data relating to the first ad impression opportunity and the data relating to the second ad impression opportunity, wherein the normalizing comprises:
accessing the interface comprising the first data transmission interface and the second data transmission interface; and
translating the data relating to one or more historical clearing prices for the first ad impression opportunity and the data relating to one or more historical clearing prices for the second ad impression opportunity;
determining, by the computer system, a first historical market value of the first ad impression opportunity, wherein the first historical market value is determined based at least in part on the one or more historical clearing prices for the first ad impression opportunity;
determining, by the computer system, a second historical market value of the second ad impression opportunity, wherein the second historical market value of the second ad impression opportunity is determined based at least in part on the one or more historical clearing prices for the second ad impression opportunity;
generating, by the computer system, a first fair market value of the first ad impression opportunity, wherein the first fair market value is determined based at least in part on the one or more parameters of the ad campaign;
generating, by the computer system, a second fair market value of the second ad impression opportunity, wherein the second fair market value is determined based at least in part on the one or more parameters of the ad campaign;
comparing, by the computer system, the first historical market value to the first fair market value;
determining, by the computer system, not to bid on the first ad impression opportunity when the first historical market value is greater than a threshold value above the first fair market value;
adjusting, by the computer system, the determined second historical market value based at least in part on one or more additional inputs;
determining, by the computer system, a difference between the determined second historical market value and the adjusted second historical market value;
repeatedly adjusting, by the computer system, the adjusted second historical market value if the determined difference is above a predetermined threshold level;
finalizing, by the computer system, the adjusted second historical market value if the determined difference is below the predetermined threshold level; and
determining, by the computer system, to bid on the second ad impression opportunity when the finalized second historical market value is not greater than a threshold value above the second fair market value,
wherein the computer system comprises a computer processor and an electronic storage medium.

12. The computer-implemented method of claim 11, further comprising generating, by the computer system, a bid price for the second ad impression opportunity based at least in part on the finalized second historical market value.

13. The computer-implemented method of claim 11, further comprising receiving, by the computer system, an aggressiveness value from the advertiser, wherein the aggressiveness value is representative of a level of aggressiveness of the advertiser for bidding on the plurality of ad impression opportunities.

14. The computer-implemented method of claim 13, wherein the bid price for the second ad impression opportunity is generated based at least in part on the aggressiveness value received from the advertiser.

15. The computer-implemented method of claim 11, further comprising continuously updating, by the computer system, the determined first historical market value of the first ad impression opportunity during an availability period of the first ad impression opportunity.

16. The computer-implemented method of claim 11, further comprising:
dynamically generating, by the computer system, a plurality of bid prices for the second ad impression opportunity based at least in part on the finalized second historical market value; and placing, by the computer system, a plurality of bids for the second ad impression opportunity on the second exchange based at least in part on the dynamically generated plurality of bid prices.

17. The computer-implemented method of claim 11, wherein the first exchange and the second exchange use different data transmission protocols.

18. The computer-implemented method of claim 11, wherein the one or more parameters of the ad campaign comprises one or more goals or one or more constraints of the ad campaign.

19. The computer-implemented method of claim 18, wherein the one or more goals of the ad campaign comprises one or more of cost per click, cost per lead, cost per sale, cost per action, return on investment, or winning a targeted portion of available ad impression opportunities.

20. The computer-implemented method of claim 18, wherein the one or more constraints of the ad campaign comprises one or more of a geographic constraint, temporal constraint, frequency bidding constraint, frequency bidding constraint, budget spend per placement constraint, or exchange constraint.

* * * * *